US009063380B2

(12) United States Patent
Miyachi et al.

(10) Patent No.: US 9,063,380 B2
(45) Date of Patent: Jun. 23, 2015

(54) METHOD FOR MANUFACTURING LIQUID CRYSTAL DISPLAY DEVICE

(75) Inventors: Koichi Miyachi, Osaka (JP); Isamu Miyake, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/241,463

(22) PCT Filed: Aug. 1, 2012

(86) PCT No.: PCT/JP2012/069549
§ 371 (c)(1),
(2), (4) Date: Feb. 27, 2014

(87) PCT Pub. No.: WO2013/031461
PCT Pub. Date: Mar. 7, 2013

(65) Prior Publication Data
US 2014/0227929 A1    Aug. 14, 2014

(30) Foreign Application Priority Data

Aug. 29, 2011 (JP) .................................. 2011-186446

(51) Int. Cl.
G02F 1/1337 (2006.01)
(52) U.S. Cl.
CPC ............. *G02F 1/133788* (2013.01); *G02F 2001/133738* (2013.01)
(58) Field of Classification Search
CPC .................................................. G02F 1/1337
USPC ..................... 445/24; 349/123–125
See application file for complete search history.

(56) References Cited

U.S. PATENT DOCUMENTS 6,177,972 B1    1/2001   Held et al.
2003/0086044 A1   5/2003   Inoue et al.
(Continued)

FOREIGN PATENT DOCUMENTS

JP   2004-070185 A   3/2004
JP   2004-286984 A   10/2004
(Continued)

OTHER PUBLICATIONS

Official Communication issued in International Patent Application No. PCT/JP2012/069549, mailed on Sep. 11, 2012.
(Continued)

*Primary Examiner* — Mary Ellen Bowman
(74) *Attorney, Agent, or Firm* — Keating & Bennett, LLP

(57) ABSTRACT

The present invention provides a method for manufacturing a liquid crystal display device, which hardly causes display unevenness in joining parts in which mutually neighboring exposure regions are overlapped upon carrying out a photo-alignment treatment for forming a horizontal alignment film. The method for manufacturing a liquid crystal display device of the present invention includes a step of forming a horizontal alignment film by carrying out a photo-alignment treatment of irradiating a photo-alignment film material applied to at least one substrate of a pair of substrates with polarized light, wherein the photo-alignment treatment is carried out by exposure to a plurality of regions of one substrate surface; two neighboring regions among the plurality of regions to be exposed include an overlapped part; an irradiation amount of the polarized light to the overlapped part is gradually lowered in one of the two neighboring regions toward the other of the two neighboring regions; and the overlapped part of the two neighboring regions has a width of 20 mm or wider.

7 Claims, 22 Drawing Sheets

(56) References Cited

U.S. PATENT DOCUMENTS

| | | |
|---|---|---|
| 2005/0116200 A1 | 6/2005 | Nakanishi et al. |
| 2005/0136196 A1 | 6/2005 | Kataoka |
| 2005/0253988 A1 | 11/2005 | Inoue et al. |
| 2009/0046221 A1 | 2/2009 | Miyachi |
| 2009/0103011 A1 | 4/2009 | Bernatz et al. |
| 2009/0109392 A1 | 4/2009 | Hsieh et al. |
| 2009/0141215 A1 | 6/2009 | Bremer et al. |
| 2009/0269515 A1 | 10/2009 | Kataoka |
| 2009/0324853 A1 | 12/2009 | Bernatz et al. |
| 2010/0225864 A1 | 9/2010 | Inoue et al. |
| 2011/0037686 A1 | 2/2011 | Inoue et al. |
| 2011/0045410 A1 | 2/2011 | Inoue et al. |
| 2011/0090429 A1 | 4/2011 | Miyachi |
| 2011/0134380 A1 | 6/2011 | Inoue et al. |
| 2011/0229825 A1 | 9/2011 | Inoue et al. |
| 2011/0310338 A1 | 12/2011 | Inoue et al. |
| 2011/0311918 A1 | 12/2011 | Inoue et al. |
| 2012/0038851 A1 | 2/2012 | Miyachi |
| 2012/0287372 A1 | 11/2012 | Miyachi |

FOREIGN PATENT DOCUMENTS

| | | |
|---|---|---|
| JP | 2005-181582 A | 7/2005 |
| JP | 2007-092000 A | 4/2007 |
| JP | 4175826 B2 | 11/2008 |
| JP | 4237977 B2 | 3/2009 |
| JP | 2009-102639 A | 5/2009 |
| JP | 2009-104119 A | 5/2009 |
| JP | 2009-132718 A | 6/2009 |
| JP | 2009-265308 A | 11/2009 |
| JP | 2010-033093 A | 2/2010 |
| WO | 20061043485 A1 | 4/2006 |
| WO | 2007/086474 A1 | 8/2007 |

OTHER PUBLICATIONS

Kikuchi et al., "Polymer-stabilized liquid crystal blue phases", Nature Materials, vol. 1, Sep. 2002, pp. 64-68.

Nagatake et al., "Reduction of EO Hysteresis of Photo-Aligned IPS-LCDs with Polymer Stabilized Method", Proceedings of The Japanese Liquid Crystal Society Annual Meetings, 2010, 2b02, 2 pages.

Nagatake et al., "Hysteresis Reduction in EO Characteristics of Photo-Aligned IPS-LCDs with Polymer-Surface-Stabilized Method", International Display Workshops, 2010, pp. 89-92.

Voltage (AC) non-application portion

Voltage (AC) application portion

Voltage (AC) non-application portion

Voltage (AC) application portion the rays or the like; and perform light scattering switching by using the matching and non-matching of refractive indices between the liquid crystal and the polymer. In addition, examples of the other liquid crystal display elements include polymer-stabilized ferroelectrics liquid crystal (FLC) phase (for example, refer to Patent Literature 10), and polymer-stabilized optically compensated bend (OCB) (for example, refer to Non Patent Literature 1).

METHOD FOR MANUFACTURING LIQUID CRYSTAL DISPLAY DEVICE

TECHNICAL FIELD

The present invention relates to a method for manufacturing a liquid crystal display device. More specifically, the present invention relates to a method for manufacturing a liquid crystal display device in which a polymer layer for improving properties is formed on a horizontal alignment film formed by a photo-alignment treatment.

BACKGROUND ART

A liquid crystal display (LCD) device is a display device that controls the alignment of birefringent liquid crystal molecules to control the transmission/shielding of light (on/off of display). Examples of display modes of LCD include a vertical alignment (VA) mode in which liquid crystal molecules having negative anisotropy of dielectric constant are aligned vertically to a substrate surface; an in-plane switching (IPS) mode and a fringe field switching (FES) mode, in which liquid crystal molecules having positive or negative anisotropy of dielectric constant are aligned horizontally to a substrate surface to apply a horizontal electric field to a liquid crystal layer.

Among these, in a multi-domain vertical alignment (MVA) mode in which liquid crystal molecules having negative anisotropy of dielectric constant are used and a rib or a slit of an electrode is provided as an alignment regulating structure, a liquid crystal alignment direction during voltage application can be controlled in plural directions without subjecting an alignment film to a rubbing treatment, and thus viewing angle characteristics are superior. However, in an MVA-LCD of the related art, an upper side of a rib or an upper side of a slit is the boundary of alignment division of liquid crystal molecules, the transmittance during white display is low, dark lines are observed in the display, and thus there is room for improvement.

In contrast, as a method for obtaining a high-luminance and high-speed response LCD, alignment stabilization techniques using a polymer (hereinafter, also referred to as "polymer sustained (PS) technique") have been suggested (for example, refer to Patent Literatures 1 to 8). Among these, in pre-tilt angle imparting techniques using a polymer (hereinafter, also referred to as "polymer sustained alignment (PSA) technique"), polymerizable components such as polymerizable monomers and oligomers are mixed to obtain a liquid crystal composition; the liquid crystal composition is sealed between substrates; and the monomers are polymerized to form a polymer in a state where liquid crystal molecules are tilted by applying a voltage between the substrates. As a result, the liquid crystal molecules have a certain pre-tilt angle even after the voltage application is stopped, and thus the alignment direction of the liquid crystal molecules can be regulated to be uniform. The monomers are selected from materials which are polymerizable by heat, light (ultraviolet rays), or the like. In addition, the liquid crystal composition may contain a polymerization initiator for initiating the polymerization of monomers (for example, refer to Patent Literature 4).

Examples of other liquid crystal display elements using a polymerizable monomer include polymer dispersed liquid crystal (PDLC) and polymer network liquid crystal (PNLC) (for example, refer to Patent Literature 9). These elements include a polymer which is formed by adding a polymerizable monomer to liquid crystal and irradiating the mixture with ultraviolet rays or the like; and perform light scattering switching by using the matching and non-matching of refractive indices between the liquid crystal and the polymer. In addition, examples of the other liquid crystal display elements include polymer-stabilized ferroelectrics liquid crystal (FLC) phase (for example, refer to Patent Literature 10), and polymer-stabilized optically compensated bend (OCB) (for example, refer to Non Patent Literature 1).

Meanwhile, in recent years, as a technique for obtaining superior viewing angle characteristics, a photo-alignment technique is investigated in which the liquid crystal alignment direction during voltage application can be controlled in plural directions without subjecting an alignment film to a rubbing treatment and thus superior viewing angle characteristics can be obtained. The photo-alignment technique is a technique in which a photoactive material is used to form an alignment film; and the formed film is irradiated with light rays such as ultraviolet rays to impart an alignment regulating force to the alignment film (for example, refer to Patent Literature 11).

Further, in the case of employing the photo-alignment technique, investigations are made on a liquid crystal display device of a VAIN mode for realizing display with excellent viewing angle characteristics by forming two or more domains with different alignment directions of liquid crystal molecules in one pixel region (for example, refer to Patent Literature 12). Patent Literature 12 discloses a means for dividing an exposure region in one substrate into a plurality of regions, and adjusting exposure amount in the joining parts of the regions while paying attention to the fact that exposure cannot be carried out all at once through one process particularly in a case where a liquid crystal display device is large in size.

Recently, when the photo-alignment technique is used in combination with the polymer stabilization techniques using a polymer, a research on a method of suppressing hysteresis has been disclosed (for example, refer to Non Patent Literatures 2 and 3). Non Patent Literatures 2 and 3 disclose a configuration of adjusting the concentration of a monomer which is mixed with liquid crystal in an IPS mode cell in which one substrate is subjected to a rubbing treatment and the other substrate is subjected to a photo-alignment treatment.

CITATION LIST

Patent Literature

Patent Literature 1: Japanese Patent No. 4175826
Patent Literature 2: Japanese Patent No. 4237977
Patent Literature 3: JP-A 2005-181582
Patent Literature 4: JP-A 2004-286984
Patent Literature 5: JP-A 2009-102639
Patent Literature 6: JP-A 2009-132718
Patent Literature 7: JP-A 2010-33093
Patent Literature 8: U.S. Pat. No. 6,177,972
Patent Literature 9: JP-A 2004-70185
Patent Literature 10: JP-A 2007-92000
Patent Literature 11: WO 2006/043485
Patent Literature 12: WO 2007/086474

Non Patent Literature

Non Patent Literature 1: H. Kikuchi, et al., Nature Materials, 1, pp. 64 to 68, 2002
Non-Patent Literature 2: Nagatake et al., Proceedings of The Japanese Liquid Crystal Society Annual Meetings 2010, "Reduction of EO Hysteresis of Photo-Aligned IPS-LCDs with Polymer Stabilized Method", 2010. 9

Non Patent Literature 3: Y. Nagatake, et al., ITE and SID, "Hysteresis Reduction in EO Characteristic of Photo-Aligned IPS-LCDs with Polymer-Surface-Stabilized Method", IDW '10, 89-92, LCT p. 2-5, 2010. 12

SUMMARY OF INVENTION

Technical Problem

As illustrated in Patent Literature 12, in the case of realizing a photo-alignment treatment for a large size substrate, it is necessary to carry out the treatment while dividing one substrate into a plurality of exposure regions in terms of the size of a light source and the apparatus size. However, based on the investigations carried out by the present inventors, in the case of division exposure for forming a horizontal alignment film, it was found that unevenness in the joining parts may not be sufficiently solved only by simply using a means for adjusting the exposure amount for the joining parts of a plurality of exposure regions when a conventional vertical alignment film was formed.

The present invention has been made in consideration of such circumstances, and an object thereof is to provide a method for manufacturing a liquid crystal display device, which hardly causes display unevenness in joining parts in which mutually neighboring exposure regions are overlapped upon carrying out a photo-alignment treatment for forming a horizontal alignment film.

Solution to Problem

In the case of forming a horizontal alignment film by carrying out a photo-alignment treatment for dividing an exposure region into a plurality of regions, the present inventors made various investigations on conditions for eliminating joining parts among the plurality of exposure regions and paid attention to a point that it is necessary to calculate an optimum value in consideration of the limit of the precision of polarizing plate installation in an exposure apparatus and the limit of the precision of bonding of a polarizing plate to a liquid crystal display panel.

As a result of thorough investigation, it was found that display unevenness in the joining parts was made hardly visible by adjusting the width of the joining parts to 20 mm or wider when the exposure region was divided into a plurality of regions and joining parts were formed in the respective regions. Hereinafter, the results of the investigation will be described in detail.

FIG. 1 is a perspective view schematically illustrating the process for carrying out a photo-alignment treatment to a substrate surface to which a horizontal alignment film material is applied. When the photo-alignment treatment is carried out while forming joining regions, for example, as illustrated in FIG. 1, it is preferable to emit light to the surface of a substrate 14 through a polarizing plate 12 and an illuminance adjustment plate 13 from a light source 11. The light emitted from the light source 11 becomes polarized light at the time of passing through the polarizing plate 12 and the illuminance intensity of light applied to the surface of the substrate 14 is adjusted by the illuminance adjustment plate 13. The illuminance adjustment plate is a member capable of chanting the intensity of light transmitted depending on a region, and its both end parts are contrived to lower the intensity of light transmitted (hereinafter, also referred to as gray tone region). The gray tone regions are configured so as to lower the intensity of light transmitted toward the terminals of the illuminance adjustment plate 13 by contrivance of, for example, lessening the number of slits, narrowing the area of slits, making the thickness of a light shielding member thin, or the like. The gray tone regions are arranged so as to overlap with the portions to be a joining part in the neighboring exposure regions. Specifically, the region surrounded by the a line and the b line is a region to be a joining part in FIG. 1, a region overlapping with a gray tone region.

FIG. 2 and FIG. 3 are a schematic view and a graph illustrating the irradiation intensity of light in an exposure region. FIG. 2 illustrates first time exposure, and FIG. 3 illustrates second time exposure. The ranges illustrated in FIG. 2 and FIG. 3 represent the same region and the range illustrated by a double-headed arrow in FIG. 2 is a first time exposure region and the range illustrated by a double-headed arrow in FIG. 3 is a second time exposure region. Herein, scanning exposure in which one or both of a light source and a substrate is/are transferred to one direction is assumed. The direction shown with the thick arrow in the drawings is the scanning direction.

Adjustment is performed in a manner such that, as illustrated in the graph of FIG. 2, the irradiation intensity in the joining region is gradually lowered toward the b point from the a point in the first time exposure, and as illustrated in the graph of FIG. 3, the irradiation intensity is gradually increased toward the b point from the a point in the second time exposure. The intensity of light transmitted through a region where no gray tone region is formed in the illuminance adjustment plate is even. The variation of the irradiation intensity between the a point and the b point is based on a sine function. This makes no clear point of change of the irradiation intensity, and hardly causes generation of display unevenness.

First, investigations are made, assuming a test screen illustrated in FIG. 4. T1 is a region exposed at first time and T2 is a region exposed at second time. T1 and T2 are partially overlapped with each other, and the overlapped region of T1 and T2 (the region surrounded by two dotted lines in FIG. 4) is a joining region.

T1 and T2 were set so as to have different luminance from each other. The width of the joining region was defined as L mm. The value of luminance T in a position P is represented by the following formula, and the luminance in the overlapped region of T1 and T2 (joining region) was regarded to be changed smoothly.

$$T(P)=(T2-T1)/(T2+T1)\times 2\times \sin((P/L\times 90°))$$

P is an arbitrary value in a range from 0 to L.

The reason for employing the sine function is that the differential coefficient is 0 at the both ends and T(P) is an monotonous increase, and thus the luminance can be changed smoothly. A test was carried out by simulatively displaying an image based on such a test screen on a 32 inch liquid crystal television.

Specifically, each of the display screen with an L value changed by changing the values of T1 and T2 is observed by 36 panelists, and the number of people who can detect the boundary of T1 and T2 is investigated to determine good (not detected) or poor (detected) in accordance with the threshold of 60%.

FIG. 5 is a graph illustrating the result of the above-mentioned investigation. As a result of the investigation, it was found that the variation should be suppressed to 3.8% or lower in a case where the joining width is 20 mm; the variation should be suppressed to 8.7% or lower in a case where the joining width is 45 mm; and the variation should be suppressed to 16.2% or lower in a case where the joining width is 77 mm. A curve in FIG. 5 is obtained by plotting these results in a graph and linking the respective points. That is, a relation of the joining width and the variation in the detection limit can be read from the curve in FIG. 5, and the range above the curve shows poor results and the range under the curve shows good results.

FIG. 6 is a graph illustrating a relation of the angular difference between the alignment direction and the axial direction of a polarizing plate and the contrast ratio. FIG. 7 is a graph illustrating the variation (%) of the contrast ratio based on the angular difference between the alignment direction and the axial direction of a polarizing plate calculated in accordance with FIG. 6. Based on the investigations made by the present inventors, the installation accuracy of the axial direction of a polarizing plate in an exposure apparatus was limited to ±0.1°. The bonding accuracy of a polarizing plate to a liquid crystal display was limited to ±0.1°. Accordingly, it is necessary to assume that the angular difference between the alignment direction and the axial direction of a polarizing plate is ±0.2°. According to FIG. 7, the variation of the contrast ratio is 3.8% when the angular difference between the alignment direction and the axial direction of a polarizing plate is 0.2°. As a result, it is understood that the overlapping width of joining parts in irradiation regions needed to sufficiently lower the display unevenness is 20 mm or wider. Consequently, the present inventors have arrived at being capable of splendidly soling the above-mentioned problems, and have completed the present invention.

That is, one aspect of the present invention is a method for manufacturing a liquid crystal display device including a step of forming a horizontal alignment film by carrying out a photo-alignment treatment of irradiating a photo-alignment film material applied to at least one substrate of a pair of substrates with polarized light, wherein the photo-alignment treatment is carried out by exposure to a plurality of regions of one substrate surface, two neighboring regions among the plurality of regions to be exposed include an overlapped part, an irradiation amount of the polarized light to the overlapped part is gradually lowered in one of the two neighboring regions toward the other of the two neighboring regions, and the overlapped part of the two neighboring regions has a width of 20 mm or wider.

The configuration of the method for manufacturing a liquid crystal display device is not especially limited by other components as long as it essentially includes such components. Hereinafter, the method for manufacturing a liquid crystal display device and preferable methods thereof will be described in detail. In addition, methods performed by combining two or more of preferable methods as the method for manufacturing a liquid crystal display device described below are also included as a preferable method for manufacturing a liquid crystal display device.

The method for manufacturing a liquid crystal display device includes a step of forming a horizontal alignment film by carrying out a photo-alignment treatment of irradiating a photo-alignment film material applied to at least one substrate of a pair of substrates with polarized light. Preferably a horizontal alignment film material is applied to both substrates of the pair of substrates. The photo-alignment film is a polymer film which has the properties of obtaining anisotropy and an alignment regulating force to liquid crystal when being irradiated with polarized light or non-polarized light. In the present invention, as light to be used for the photo-alignment treatment, polarized light is used. A material activated by light irradiation is used as the photo-alignment film material.

It is preferable that the photo-alignment material contain at least one chemical structure selected from a group consisting of terphenyl derivatives, naphthalene derivatives, phenanthrene derivatives, tetracene derivatives, spiropyran derivatives, spiroperimidine derivatives, viologen derivatives, diarylethene derivatives, anthraquinone derivatives, azobenzene derivatives, cinnamoyl derivatives, chalcone derivatives, cinnamate derivatives, coumarin derivatives, stilbene derivatives, and anthracene derivatives. A benzene ring contained in these derivatives may be a heterocyclic ring. Herein, "derivatives" means compounds substituted with a specified atom or functional group; and compounds in which a monovalent or divalent or higher functional group is incorporated into a molecular structure. These derivatives may be present in a molecular structure of a main chain of a polymer or in a molecular structure of a side chain of a polymer; and may be a monomer or an oligomer. When a monomer or oligomer including such a photoactive functional group (preferably, 3% by weight or greater) is contained in the photo-alignment film material, a polymer constituting the photo-alignment film may be photoinactive. In terms of heat resistance, the polymer constituting the photo-alignment film is preferably polysiloxane, polyamide acid, or polyimide.

The photo-alignment film material may be a polymer alone or a mixture containing additional molecules together with a polymer as long as it has the above-described properties. For example, a low-molecular-weight compound such as an additive or a photoinactive polymer may further be added to a polymer including a photoalignable functional group. For example, an additive including a photoalignable functional group may be added to a photoinactive polymer. The photo-alignment film material is selected from materials which cause photodissociation, photoisomerization or photodimerization. Normally, as compared to photodissociation, photoisomerization and photodimerization can perform alignment with light with a longer wavelength and a smaller irradiation amount and thus are superior in mass production.

That is, it is preferable that the material forming the photo-alignment film includes either or both of a photoisomerizable functional group and a photodimerizable functional group. Representative examples of the materials which cause photoisomerization and photodimerization include azobenzene derivatives, cinnamoyl derivatives, chalcone derivatives, cinnamate derivatives, coumarin derivatives, diarylethene derivatives, stilbene derivatives, and anthracene derivatives. Representative examples of the materials which cause photodissociation include materials containing a cyclobutane skeleton. A benzene ring contained in these photoreactive functional groups may be a heterocyclic ring.

In addition, it is more preferable that the photoisomerizable functional group or the photodimerizable functional group be a cinnamate group or a derivative thereof. The cinnamate group is excellent particularly in reactivity at the time of executing the photo-alignment treatment.

The alignment film formed by carrying out the step of irradiating the photo-alignment film material with light is a horizontal alignment film. The horizontal alignment film refers to a film which aligns liquid crystal molecules adjacent to the horizontal alignment film substantially horizontally to a surface of the horizontal alignment film. The alignment regulating force by the horizontal alignment film is determined mainly by the kinds of the photo-alignment film material (photofunctional group), and the alignment direction of liquid crystal molecules, the degree of a pre-tilt angle and the like can be adjusted by the kind of light, the irradiation time of light, the irradiation intensity of light, the kind of a photo-functional group, and the like. Examples of a liquid crystal display device produced by the method for manufacturing a liquid crystal display device include the IPS mode, the FFS mode, the OCB mode, a twisted nematic (TN) mode, a super twisted nematic (STN) mode, the FLC mode, an anti-Ferroelectric (AFLC) mode, the PDLC mode, and a polymer network liquid crystal (PNLC) mode. Among these, the IPS mode, or the FFS mode is more preferable because the desired alignment can be achieved by one step of polarized light irradiation from the front surface of a substrate and thus the process is simple and mass productivity is superior.

In the alignment mode, in order to improve viewing angle characteristics, it is preferable that at least one substrate of the pair of substrates includes a multidomain structure. The multidomain structure refers to a structure in which there are plural regions including different alignment forms (for example, bend directions in the OCB mode or twist directions in the TN and STN mode) or different alignment directions of liquid crystal molecules during either or both voltage application and non-voltage application. In order to obtain a multidomain structure, it is necessary that either or both processes including a process of actively patterning an electrode into an appropriate form; and a process of irradiating a photoactive material with light using a photo mask or the like be performed.

The photo-alignment treatment is carried out by exposure to a plurality of regions of one substrate surface, two neighboring regions among the plurality of regions to be exposed include an overlapped part, an irradiation amount of the polarized light to the overlapped part is gradually lowered in one of the two neighboring regions toward the other of the two neighboring regions. In the above verification test, a sine function is employed, but the tendency of the irradiation amount is the same as above, and in the present invention, the variation of the irradiation amount in the overlapped part of the two neighboring regions may satisfy, for example, a linear function as long as the tendency of the irradiation amount of the respective polarized light in the overlapped part of the two neighboring regions satisfies the above conditions. However, in terms of attainment of more smooth variation, it is preferable that the variation of the irradiation amount in the overlapped part of the two neighboring regions satisfy a sin function. This makes no clear point of change of the irradiation intensity, and hardly causes generation of display unevenness.

The overlapped part of the two neighboring regions has a width of 20 mm or wider. As described above, display unevenness in the joining regions is made hardly visible even if successive exposure is carried out, that is, exposure is carried out a plurality of times, for a horizontal alignment film while forming partially overlapped parts by setting such conditions. In terms of prevention of display unevenness, as the width of the overlapped part of the two neighboring regions is wider, the better result can be achieved.

The overlapped part of the two neighboring regions is preferable to have a width of 65 mm or narrower. As described above (as is understood from FIG. 5), in consideration of a decrease of display unevenness in joining regions, the display unevenness in joining regions is made hardly generated by widening the overlapped part of the two neighboring regions as much as possible. However, to unnecessarily widen the width of the overlapped part of the two neighboring regions is undesirable because (1) the vainness in the exposure apparatus configuration is significant and the apparatus cost becomes high; (2) a risk of lower productivity and a risk of the probability of a decrease in yield are generated due to an increase of the times of exposure in the case of exposure with a single light source; (3) a risk of occurrence of unevenness is increased due to an increase in the number of light sources (the number of overlapped parts) in a case where a plurality of light sources are arranged; and the like. From such a viewpoint, it is desirable to narrow the overlapped parts of neighboring exposure regions as much as possible.

Based on the investigations made by the present inventors, the installation accuracy of the axial direction of a polarizing plate in an exposure apparatus is within at worst ±0.2°. The accuracy of bonding a polarizing plate is within at worst ±0.2°. Accordingly, the angular difference between the alignment direction and the axial direction of a polarizing plate can be within at least ±0.4°. According to FIG. 7, the variation of the contrast ratio in the case of ±0.4° is 13.5%, and according to FIG. 5, in a case where the variation of the contrast ratio is 13.5%, the joining width proper to sufficiently eliminate the display unevenness is 65 mm. Consequently, the overlapped width is sufficient to be 65 mm at maximum, and in consideration of the above-mentioned disadvantages, it is concluded that the width of 65 mm or narrower is more preferable.

The method for manufacturing a liquid crystal display device is preferable to include a step of forming a polymer layer for controlling alignment of liquid crystal molecules adjacent thereto on the horizontal alignment film by irradiating a liquid crystal composition containing a liquid crystal material and a monomer and being injected between the pair of substrates with light to polymerize the monomer. Hereinafter, the reason for this will be described in detail.

The current photo-alignment technique is usually introduced for mass-production of TVs using a vertical alignment film for the VA mode and the like; and has not yet been introduced for mass-production of TVs using a horizontal alignment film for the IPS mode and the like. The reason is that, when a horizontal alignment film is used, image sticking occurs to a large degree in liquid crystal display. Image sticking is the phenomenon in which, when the same amount of voltage is continuously applied to a part of liquid crystal cell for a certain time and then the entire display is changed to another one, luminance appears to be different between portions to which a voltage is continuously applied and portions to which a voltage is not applied.

FIG. 8 is a diagram schematically illustrating a state of image sticking in a liquid crystal cell of an IPS mode which is manufactured by performing a photo-alignment treatment. As illustrated in FIG. 8, there is a large difference in luminance between a voltage (AC) application portion and a voltage (AC) non-application portion, and it is found that image sticking occurs to an extremely large degree in the voltage (AC) application portion.

Therefore, in order to prepare a liquid crystal cell of the IPS mode obtained by using a photo-alignment treatment, the present inventors investigated the introduction of a polymer stabilization (PS) process of adding a polymerizable monomer to liquid crystal and polymerizing the polymerizable monomer with heat or light to form a polymer layer on the interface with a liquid crystal layer. FIG. 9 is a diagram schematically illustrating a state of image sticking in a liquid crystal cell of an IPS mode which is manufactured by introducing a photo-alignment treatment and adopting the PS process. As illustrated in FIG. 9, there is no difference in luminance between a voltage (AC) application portion and a voltage (AC) non-application portion, and it is found that image sticking is reduced in the voltage (AC) application portion. As described above, by adding the PS process to a method of the related art, image sticking is significantly reduced.

The present inventors have investigated in various ways the reason why image sticking occurs to a large degree particularly in a liquid crystal cell of the IPS mode, and have found that there is a difference in the mechanism of image sticking between a liquid crystal cell of the IPS mode and a liquid crystal cell of the VA mode. Thus, in the VA mode, image sticking occurs because the tilt in a polar angle direction remains (is memorized); whereas, in the IPS mode, image sticking occurs because the alignment in an azimuth direction remains (is memorized) and an electric double layer is formed. It was found that these phenomena are caused by a material used for a photo-alignment film.

In addition, the present inventors have further thoroughly investigated and found that the improvement caused by the PS process is particularly effective when an alignment film formed of a photoactive material is used. For example, it was found that, when an alignment film formed of a photoinactive material is subjected to a rubbing treatment or is not subjected any alignment treatment, the improvement caused by the PS process cannot be obtained.

According to the investigation by the present inventors, the reason why the combination of the alignment film formed of a photoactive material with the PS process is preferable is as follows. FIG. 10 is a diagram for comparison schematically illustrating a polymerization state of a polymerizable monomer when an alignment film formed of a photoinactive material is subjected to the PS process, and FIG. 11 is a diagram for comparison schematically illustrating a polymerization state of a polymerizable monomer when an alignment film formed of a photoactive material is subjected to the PS process. As illustrated in FIGS. 10 and 11, in the PS process, a pair of substrates and a liquid crystal composition with which a gap between the pair of substrates is filled are irradiated with light such as ultraviolet rays; the chain polymerization such as radical polymerization of polymerizable monomers 33 and 43 in a liquid crystal layer starts; and a formed polymer is deposited on surfaces of alignment films 32 and 42 on the side of the liquid crystal layer 30 to form a polymer layer (hereinafter, also referred to as "PS layer") for controlling the alignment of liquid crystal molecules.

When the alignment film 42 is photoinactive, as illustrated in FIG. 10, polymerizable monomers 43a in the liquid crystal layer 30 which are excited by light irradiation are uniformly generated in the liquid crystal layer 30. Excited polymerizable monomers 43b are photopolymerized, and polymer layers are formed by phase separation on the interfaces between the alignment film 42 and the liquid crystal layer 30. That is, in the PS process, there is a process in which the polymerizable monomers 43b excited in the bulk are photopolymerized and move to the interfaces between the alignment film 42 and the liquid crystal layer 30.

On the other hand, when the alignment film 32 is photoactive, as illustrated in FIG. 11, a larger amount of polymerizable monomers 33b in the excited state are formed. The reason is that the alignment film 32 absorbs light when being irradiated with light and the excitation energy thereof is transferred to polymerizable monomers 33a. Due to this excitation energy, the polymerizable monomers 33a adjacent to the alignment film 32 are easily changed to the polymerizable monomers 33b in the excited state. That is, the polymerizable monomers 33a in the liquid crystal layer which are excited by light irradiation are concentrated on the vicinity of the interfaces between the alignment film 32 and the liquid crystal layer 30, and a larger amount of the polymerizable monomers 33a are present thereon. Therefore, when the alignment film 32 is photoactive, a process in which the excited polymerizable monomers 33b are photopolymerized and move to the interfaces between the alignment film 32 and the liquid crystal layer 30 is negligible. Therefore, a polymerization rate and a rate of forming a polymer layer are improved, and thus a PS layer having a stable alignment regulating force can be formed.

In addition, as a result of investigation, the present inventors found that the image sticking reduction effect by the PS layer is particularly effective for a horizontal alignment film rather than a vertical alignment film. The reason is considered to be as follows. FIG. 12 is a diagram schematically illustrating a state of a vertical alignment film when polymerizable monomers are polymerized. FIG. 13 is a diagram schematically illustrating a state of a horizontal alignment film when polymerizable monomers are polymerized.

When an alignment film is a vertical alignment film as illustrated in FIG. 12, photoactive groups 52 included in the vertical alignment film are in indirect contact with liquid crystal molecules 54 and polymerizable monomers 53 through hydrophobic groups 55. Therefore, the transfer of the excitation energy from the photoactive groups 52 to the polymerizable monomers 53 is difficult.

On the other hand, when an alignment film is a horizontal alignment film as illustrated in FIG. 13, photoactive groups 62 included in the horizontal alignment film are in direct contact with liquid crystal molecules 64 and polymerizable monomers 63. Therefore, the transfer of the excitation energy from the photoactive groups 62 to the polymerizable monomers 63 is easy. Therefore, a polymerization rate and a rate of forming a polymer layer are improved, and thus a PS layer having a stable alignment regulating force can be formed.

Accordingly, when the PS process is performed in a case where an alignment film is formed of a photoactive material and the alignment film is a horizontal alignment film, the transfer of the excitation energy is significantly improved and image sticking can be reduced to a large degree. Consequently, a liquid crystal display device with lowered image sticking and excellent display characteristics can be obtained.

A polymerizable functional group of the monomer is preferable to be an acrylate group, a methacrylate group, a vinyl group, a vinyloxy group, or an epoxy group. The monomer is preferably a monomer which starts polymerization (photopolymerization) by light irradiation or a monomer which starts polymerization (thermal polymerization) by heating. That is, the polymer layer is preferable to be formed by photopolymerization or to be formed by thermal polymerization. In particular, photopolymerization is preferable because polymerization can be easily initiated at normal temperature. It is preferable that light used for the photopolymerization is either or both of ultraviolet rays and visible light.

The type of polymerization for forming the polymer layer is not particularly limited, and examples thereof include "step-growth polymerization" in which bifunctional monomers are polymerized stepwise while forming a new bond; and "chain polymerization" in which monomers are sequentially bonded to active species generated from a small amount of catalyst (for example, an initiator) and are grown in a chain reaction. Examples of the step-growth polymerization include polycondensation and polyaddition. Examples of the chain polymerization include radical polymerization and ionic polymerization (for example, anionic polymerization and cationic polymerization).

The polymer layer can be formed on a horizontal alignment film to stabilize the alignment regulating force of the horizontal alignment film. As a result, image sticking in display is significantly reduced and thus display quality can be significantly improved. In addition, when monomers are polymerized to form a polymer layer in a state where liquid crystal molecules are aligned at a pre-tilt angle by applying a threshold or higher voltage to a liquid crystal layer, the polymer layer are formed to include a structure in which liquid crystal molecules are aligned at a pre-tilt angle.

The monomer is preferable to be rod-like molecules in which an aromatic ring is present in the skeleton and the aromatic ring is linear. In the case of rod-like molecules, a structure similar to that of liquid crystal molecules is formed, and it is advantageous for the monomer to be dissolved easily in liquid crystal. Examples of the monomer including a skeleton to be rod-like molecules include biphenyl-based monomers, naphthalene-based monomers, phenanthrene-based monomers, and anthracene-based monomers. A part or all of hydrogen atoms included in the monomer may be substituted with a halogen atom, an alkyl group, or an alkoxy group. A part or all of hydrogen atoms included in the alkyl, or alkoxy group may be substituted with a halogen atom.

The monomer is preferable to be a monomer having function of a polymerization initiator to be polymerized by light irradiation. If an un-reacted monomer and a substance easy to bear electric charge like a polymerization initiator remain in the liquid crystal layer, ionic impurities are generated due to the effect of a back light unit in a common use state after completion or the effect of aging process for inspection after assembly, and it may probably result in image sticking or display unevenness in liquid crystal display. If a monomer having function of a polymerization initiator is used, since the monomer having function of a polymerization initiator itself becomes a component for forming the polymer layer, the monomer does not remain in the liquid crystal layer as an impurity after completion of polymerization reaction. Examples of a monomer that can be the monomer having function of a polymerization initiator include those including, as a polymerizable functional group, a methacryloyloxy group, an acryloyloxy group, a vinyloxy group, an acryloylamino group, or a methacryloylamino group. These polymerizable functional groups spontaneously generate radicals by ultraviolet rays (light with a wavelength within a range from 300 to 380 nm), and thus can start polymerization even without a polymerization initiator. A part or all of hydrogen atoms included in the polymerizable functional group may be substituted with a halogen atom, an alkyl group, or an alkoxy group. A part or all of hydrogen atoms included in the alkyl, or alkoxy group may be substituted with a halogen atom.

Further, when the size of the polymer produced in the PS process is too large, a polymer network structure including huge molecules may be formed not in the alignment film surface but in the entire liquid crystal layer, and as a result, the immobilization of liquid crystal alignment as bulk may be caused and actual application voltage to liquid crystal may be lowered, and it may result in shift of a V-T characteristic to high voltage side. If the concentration of a polymerization initiator is made high, the number of starting points of polymerization can be increased, and thus the size of the polymer produced by light irradiation can be made small, but as described above, remaining of the polymerization initiator in liquid crystal may possibly lead to a problem of image sticking or the like.

On the other hand, the monomer having function of a polymerization initiator can improves the density of the reaction starting points without using a polymerization initiator, and oligomer-like substances in which the polymer size is small are easily formed immediately after light irradiation, and the number of their production can be increased. The oligomer-like substances thus produced are quickly deposited, as a polymer layer, on an alignment film surface based on the precipitation effect due to a solubility decrease in the liquid crystal layer.

As the monomer having function of a polymerization initiator, an acrylate monomer, a diacrylate monomer, and the like having no photopolymerization initiation function may be used in combination, and this can adjust the photopolymerization rate. The adjustment of the photopolymerization rate can be one of effective means in the case of suppressing polymer network production.

The monomer is preferable to be a monomer which starts polymerization by irradiation with visible light. Unlike ultraviolet rays, visible light can decrease damages on the liquid crystal layer and the alignment film. Examples of such a monomer include benzyl-based monomers, benzoin ether-based monomers, acetophenone-based monomers, benzyl ketal-based monomers, and ketone-based monomers, which generate radicals by photocleavage or hydrogen removal. These monomers include a polymerizable functional group, and examples thereof include a methacryloyloxy group, an acryloyloxy group, a vinyloxy group, an acryloylamino group, and a methacryloylamino group. That is, the monomer is preferable to cause photocleavage reaction or hydrogen removal reaction by irradiation with ultraviolet rays or visible light.

The electrode is preferably a transparent electrode. As an electrode material in the present invention, all of light shielding materials such as aluminum and translucent materials such as indium tin oxide (ITO) and indium zinc oxide (IZO) can be used, and for example, when one of the pair of substrates includes a color filter, it is necessary that the irradiation with ultraviolet rays for polymerizing the monomer be performed on the other substrate not including a color filter, and in such as case, if the electrode included in the other substrate has a light shielding property, it results in inefficiency of the polymerization of the monomer.

The liquid crystal material preferably contains liquid crystal molecules including, in a molecular structure thereof, a multiple bond other than conjugated double bonds of a benzene ring. This is because, as described above, the multiple bond of liquid crystal molecules themselves can be activated by light, and the liquid crystal material can function as a carrier for transferring the activation energy, radicals, and the like. That is, when liquid crystal is photoactive or functions as a carrier for transferring radicals and the like, a polymerization rate of polymerizable monomers and a rate of forming a PS layer are improved and thus a stable PS layer is formed.

The liquid crystal molecules may have either positive anisotropy of dielectric constant (positive type) or negative anisotropy of dielectric constant (negative type). It is preferable that the liquid crystal molecules be nematic liquid crystal molecules having a high symmetric property in the liquid crystal layer. Examples of a skeleton of the liquid crystal molecules include a structure in which two ring structures and groups bonded to the ring structures are linearly bonded to each other. The multiple bond does not contain conjugated double bonds of a benzene ring. This is because the benzene ring has low reactivity. The liquid crystal molecule may include conjugated double bonds of a benzene ring, that is, the conjugated double bonds be not excluded from it; as long as it essentially has a multiple bond other than conjugated double bonds of a benzene ring. In addition, the liquid crystal molecules may be a mixture of plural kinds thereof. In order to secure the reliability, to improve the response speed, and to adjust the liquid crystal phase temperature range, the elastic constant, the anisotropy of dielectric constant, and the refractive index anisotropy, a liquid crystal material may be a mixture of plural kinds of liquid crystal molecules.

It is preferable that the multiple bond be a double bond, and it is more preferable that the double bond be contained in an ester group or an alkenyl group. As the multiple bond, a double bond has higher reactivity than that of a triple bond. The multiple bond may be a triple bond. In this case, it is preferable that the triple bond be contained in a cyano group. Furthermore, it is preferable that the liquid crystal molecules contain two or more kinds of multiple bonds.

Advantageous Effects of Invention

According to the present invention, there is provided a liquid crystal display device in which display unevenness in joining regions is hardly caused even if successive exposure is carried out at the time of a photo-alignment treatment for the surface to which a horizontal alignment film material is applied.

DESCRIPTION OF EMBODIMENTS

Figure 1:
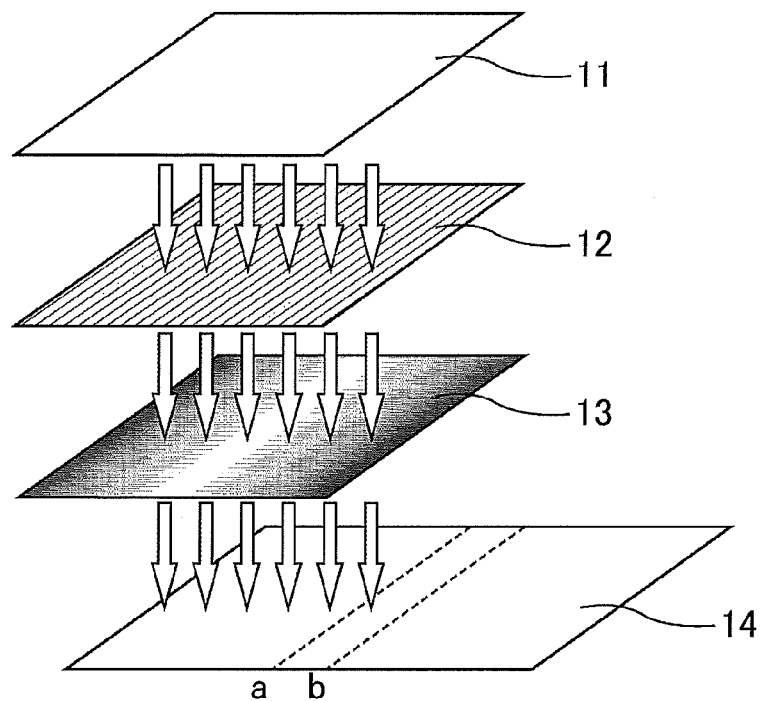
FIG. 1 is a perspective view schematically illustrating the process for carrying out a photo-alignment treatment to a substrate surface to which a horizontal alignment film material is applied.
Figure 2:
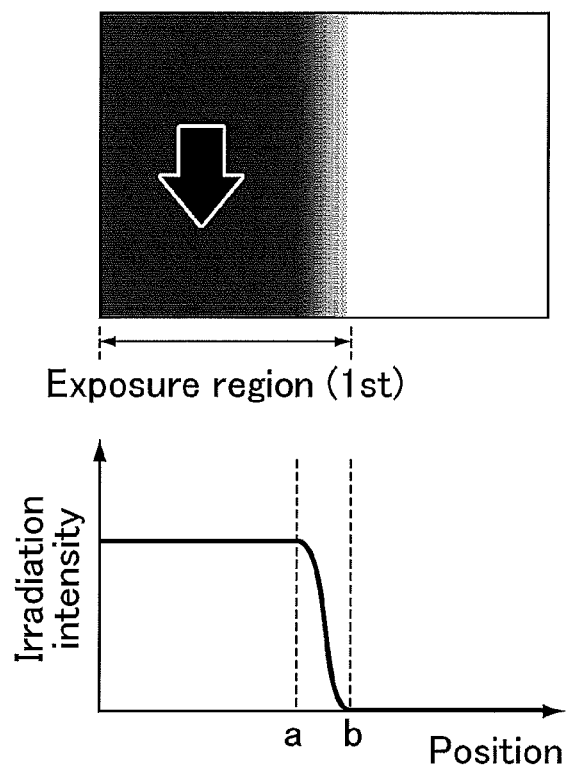
FIG. 2 is a schematic view and a graph illustrating the irradiation intensity of light in an exposure region (1st).
Figure 3:
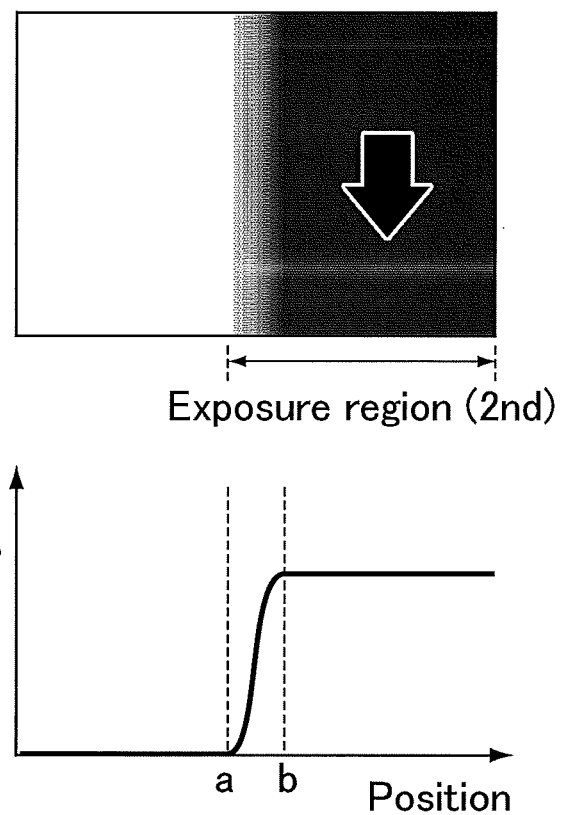
FIG. 3 is a schematic view and a graph illustrating the irradiation intensity of light in an exposure region (2nd).
Figure 4:
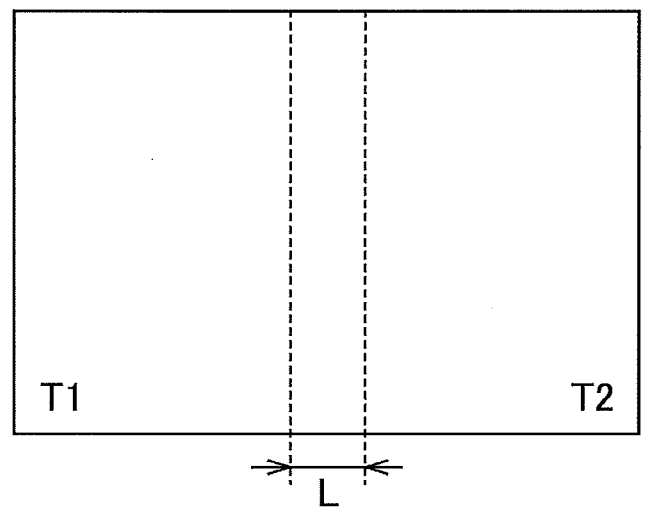
FIG. 4 is a view schematically illustrating a test screen on which the present inventors made investigations.
Figure 5:
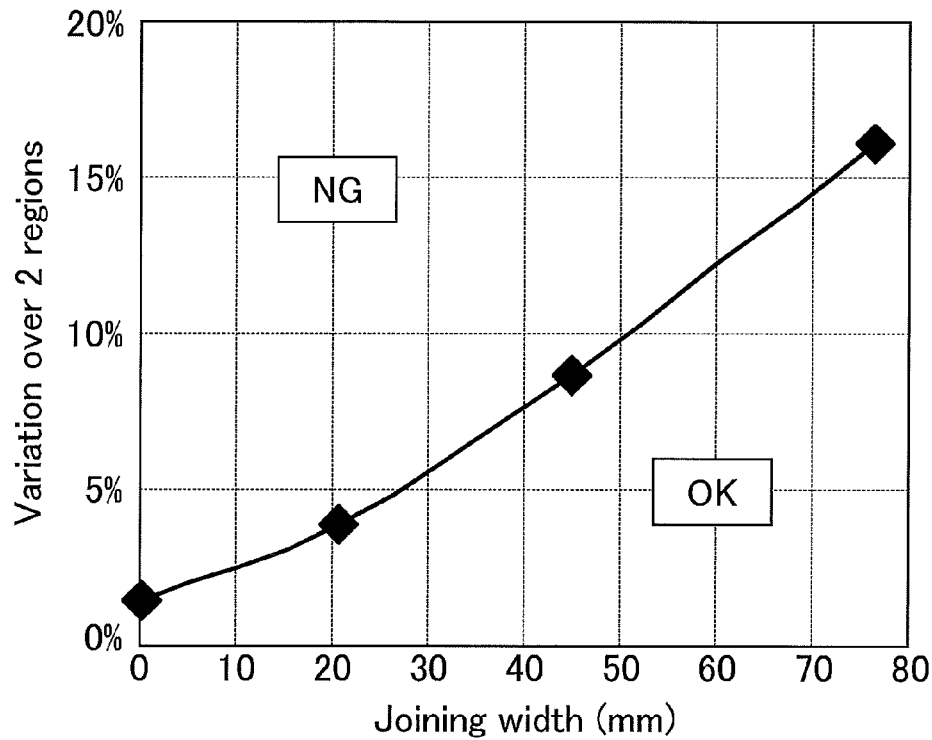
FIG. 5 is a graph illustrating the results of the investigations made by the present inventors.
Figure 6:
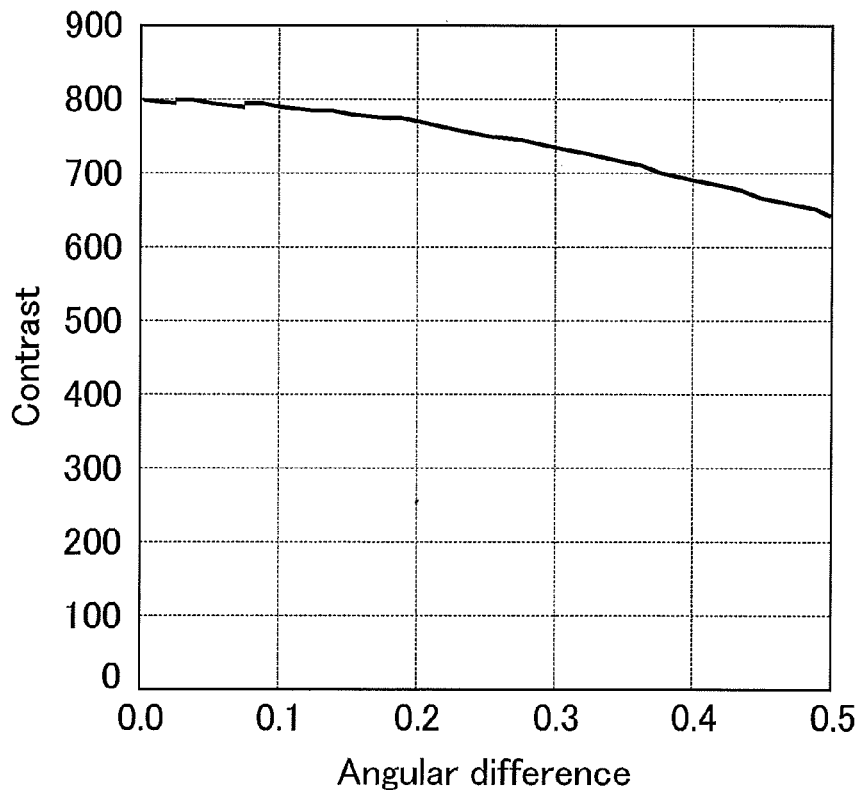
FIG. 6 is a graph illustrating a relation of the angular difference between the alignment direction and the axial direction of a polarizing plate and the contrast ratio.
Figure 7:
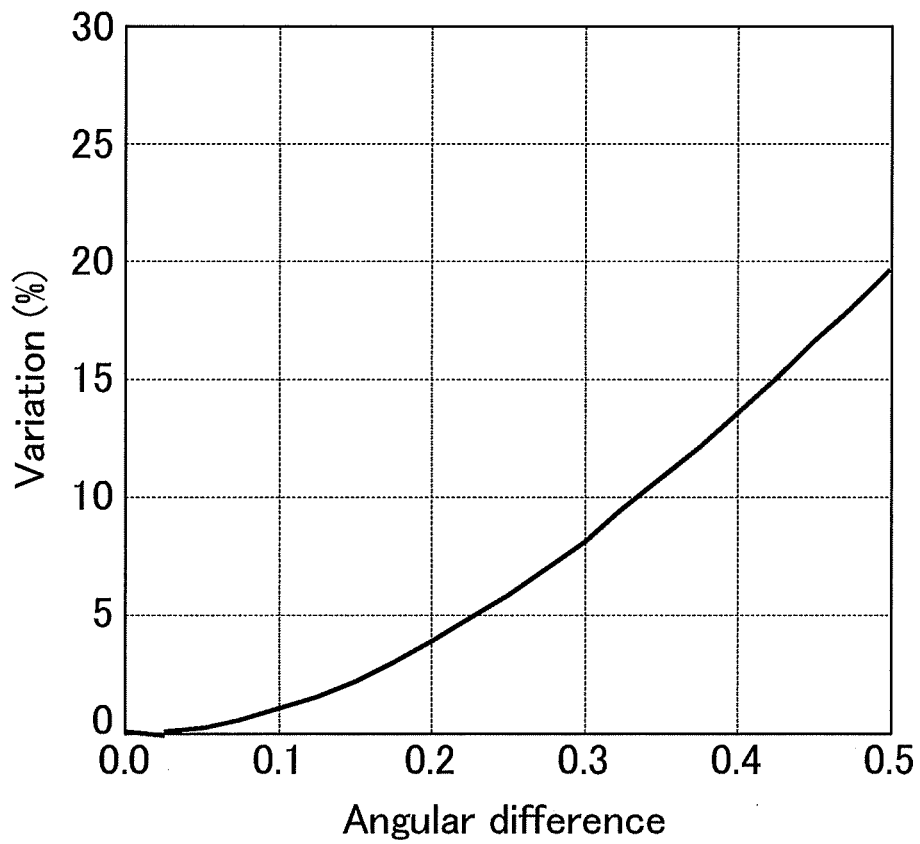
FIG. 7 is a graph illustrating the variation (%) of the contrast ratio based on the angular difference between the alignment direction and the axial direction of a polarizing plate calculated in accordance with FIG. 6.
Figure 8:
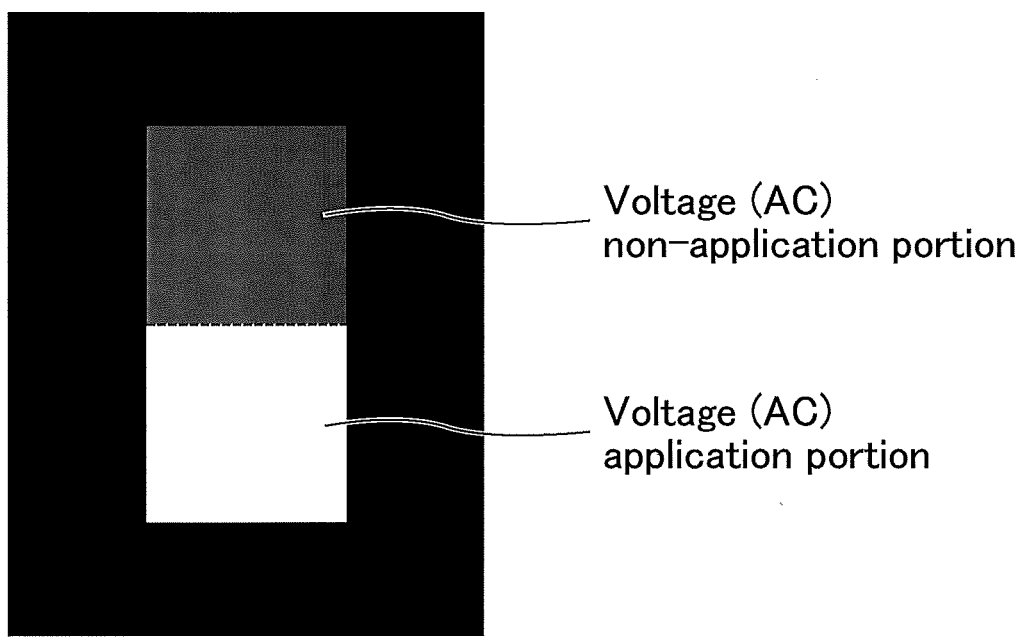
FIG. 8 is a diagram schematically illustrating a state of image sticking in a liquid crystal cell of an IPS mode which is manufactured by performing a photo-alignment treatment.
Figure 9:
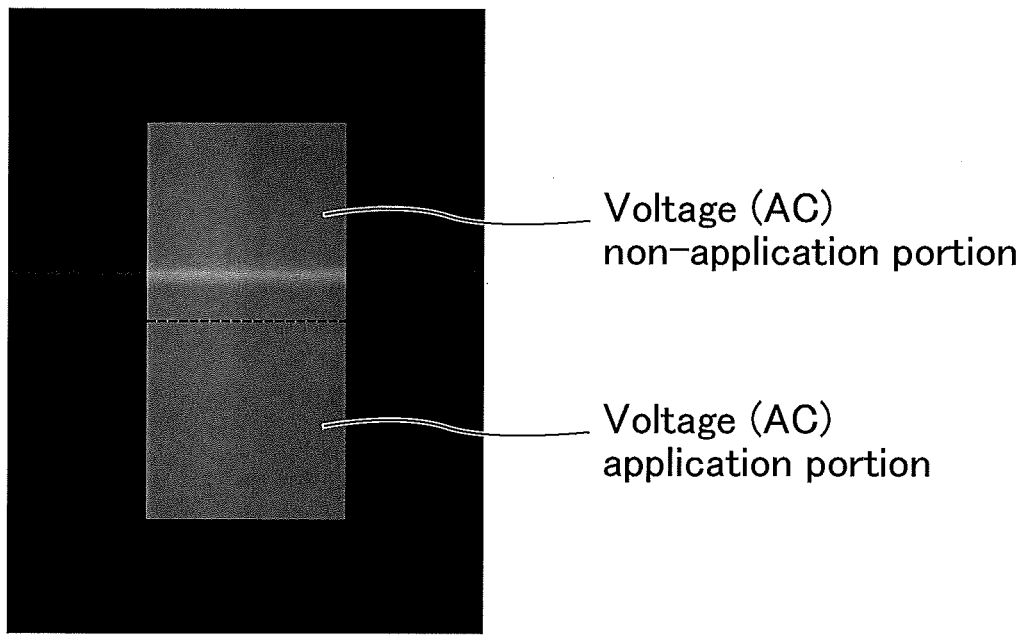
FIG. 9 is a diagram schematically illustrating a state of image sticking in a liquid crystal cell of an IPS mode which is manufactured by introducing a photo-alignment treatment and adopting the PS process.
Figure 10:
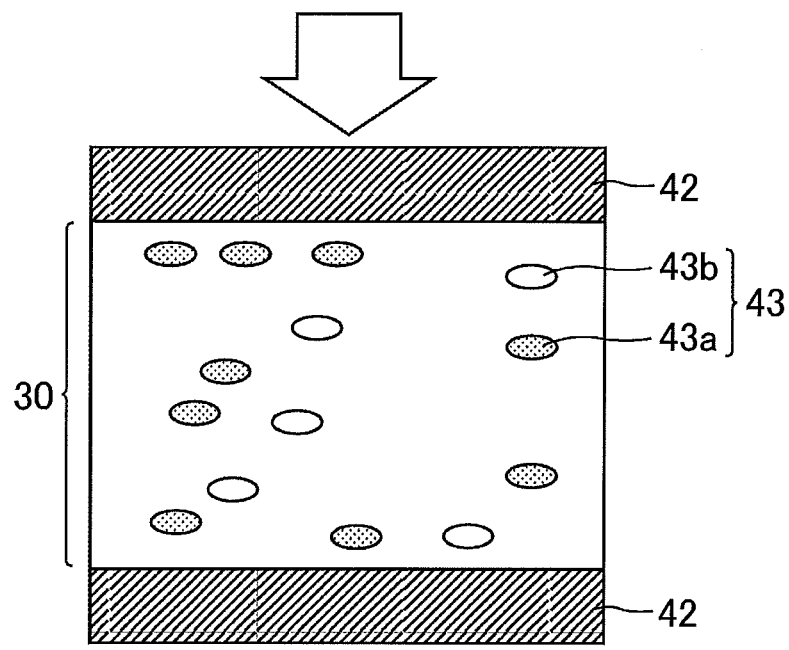
FIG. 10 is a diagram for comparison schematically illustrating a polymerization state of a polymerizable monomer when an alignment film formed of a photoinactive material is subjected to the PS process.
Figure 11:
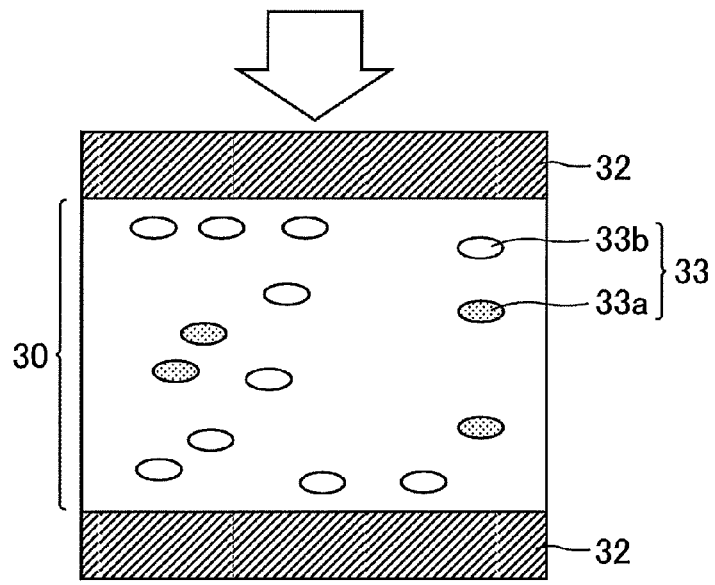
FIG. 11 is a diagram for comparison schematically illustrating a polymerization state of a polymerizable monomer when an alignment film formed of a photoactive material is subjected to the PS process.
Figure 12:
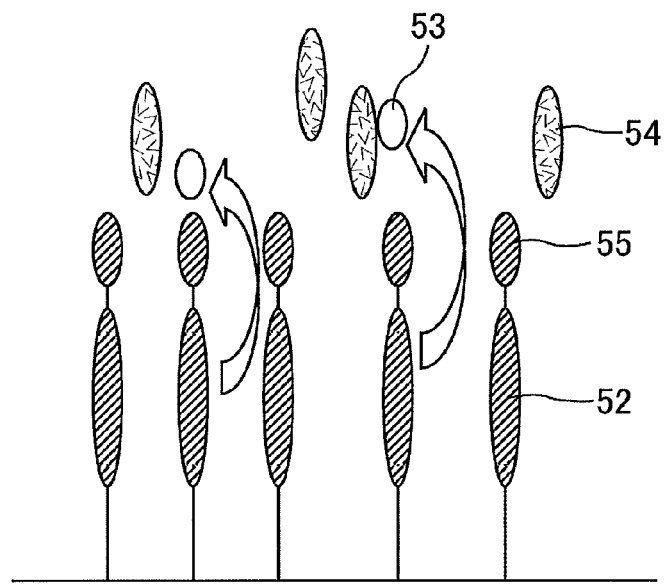
FIG. 12 is a diagram schematically illustrating a state of a vertical alignment film when polymerizable monomers are polymerized.
Figure 13:
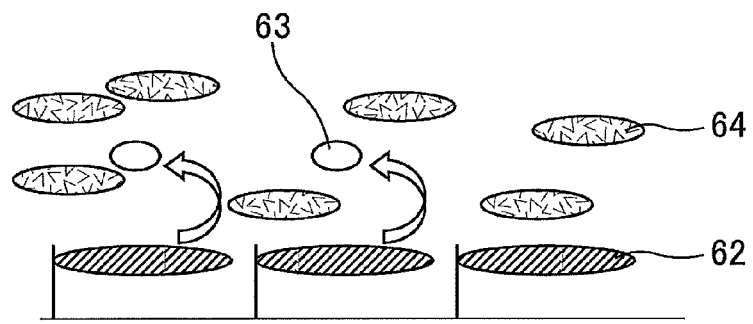
FIG. 13 is a diagram schematically illustrating a state of a horizontal alignment film when polymerizable monomers are polymerized.

The present invention will be mentioned in more detail referring to the drawings in the following embodiments, but is not limited to these embodiments.

Embodiment 1

Hereinafter, a method for manufacturing a liquid crystal display device according to Embodiment 1 will be described in detail. A liquid crystal display device manufactured by the method for manufacturing a liquid crystal display device according to Embodiment 1 is suitably used for a TV panel, a digital signage, a medical monitor, an electronic book, a PC monitor, a tablet terminal panel, a portable terminal panel, or the like.

Figure 14:
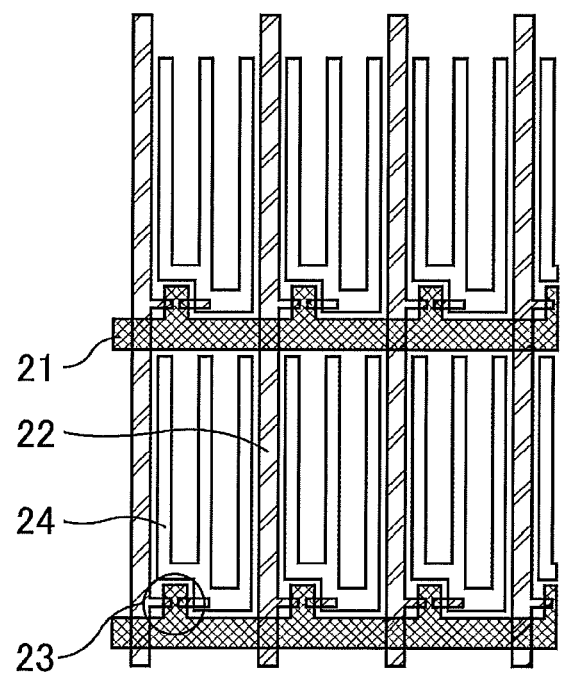
FIG. 14 is a plane view schematically illustrating a TFT substrate in Embodiment 1.

Before execution of a photo-alignment treatment, first, a pair of substrates, which are a TFT substrate and a counter substrate, to interpose a liquid crystal layer are prepared. FIG. 14 is a plane view schematically illustrating a TFT substrate in Embodiment 1 and FIG. 15 is a plane view schematically illustrating a counter substrate in Embodiment 1.

As illustrated in FIG. 14, for example, a substrate obtained by arranging a scanning signal line 21, a data signal line 22, a TFT 23, and a pixel electrode 24 on a glass substrate through an insulating film is used as a TFT substrate. The scanning signal line 21 and the data signal line 22 are arranged in a manner of crossing each other and connected to the respective electrodes of the TFT (thin film transistor) 23. When scanning signals as pulses supplied at prescribed timing are applied to the TFT 23, data signals supplied at the timing from the data signal line 22 are supplied to the pixel electrode 24. A plurality of the pixel electrodes 24 are arranged in a matrix state. In the case of the IPS mode or the FFS mode, the pixel electrodes 24 form a comb electrode as illustrated in FIG. 14, but it is not particularly limited in the case of other modes.

Figure 15:
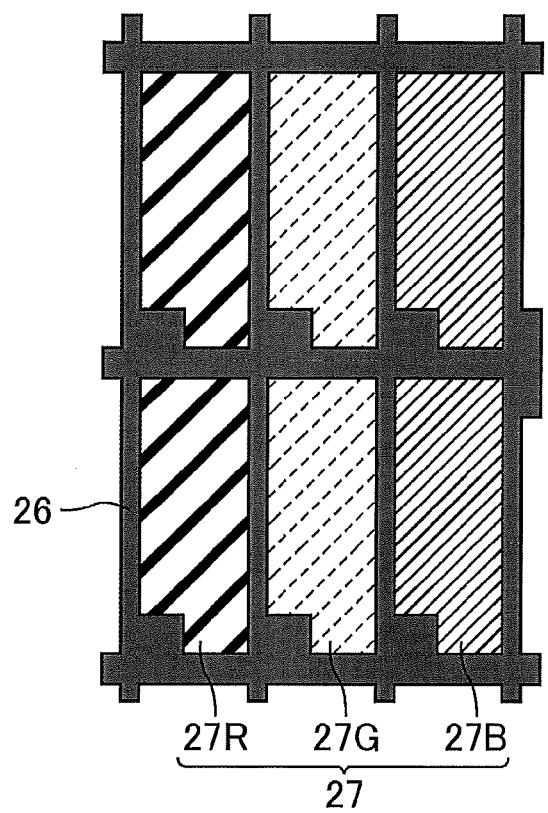
FIG. 15 is a plane view schematically illustrating a counter substrate in Embodiment 1.

As illustrated in FIG. 15, for example, a substrate obtained by arranging a BM (black matrix) 26 and a colored layer (color filter) 27 containing a red (R) colored layer 27R, a blue (B) colored layer 27B, and a green (G) colored layer 27G on a glass substrate is used as a counter substrate. The BM 26 is formed in a lattice-like state so as to be superimposed with the scanning signal line 21 and the data signal line 22 on the TFT substrate, and the color filter 27 is formed in the regions divided by the BM 26. In Embodiment 1, stripe arrangement in which the same colored layers are arranged in the same rows.

Additionally, although not illustrated in FIG. 14 and FIG. 15, a common electrode is formed in the TFT substrate and/or the counter substrate besides the pixel electrode. The common electrode is a comb electrode in the case of the IPS mode and a plane electrode in the case of the FFS mode.

Next, a solution containing a photo-alignment film material is applied to the surface of each substrate by a spin cast method or the like, and thereafter, the applied solution is baked at, for example, 180° C. for 60 minutes to form a horizontal alignment film. Examples of the photo-alignment film material include resins containing a photosensitive group. More specifically, preferred is a polymer such as polyimide, polyamic acid, polymaleimide, polyvinyl, and polysiloxane, including a photosensitive group such as an azobenzene group including an azo group (—N=N—) (the following chemical formula (1)), a stilbene group (the following chemical formula (2)), a 4-chalcone group (the following chemical formula (3)), a 4'-chalcone group (the following chemical formula (4)), a coumarin group (the following chemical formula (5)), a cinnamoyl group (the following chemical formula (6)), or a cinnamate group (the following chemical formula (7)). The photosensitive groups represented by the following chemical formulae (1) to (7) are those which cause crosslinking reaction (including dimerization), isomerization, photorealignment, or the like by irradiation with light (preferably ultraviolet rays), and these groups can effectively narrow the dispersion of the pre-tilt angle in a plane of an alignment film as compared to a photodissociation type photo-alignment film material. Additionally, the photosensitive groups represented by following chemical formulae (1) to (7) include structures formed by bonding a substituent group to a benzene ring. Further, the cinnamate group (the following chemical formula (7)) obtained by further bonding an oxygen atom to the carbonyl group of the cinnamoyl group represented by the following chemical formula (6) has particularly high reactivity and can be horizontally aligned with low irradiation energy. Preferable examples of the substituent group for a benzene ring are a fluorine atom, an alkyl group, an alkoxy group, a benzyl group, a phenoxy group, a benzoyl group, a benzoate group, a benzoyloxy group or their derivatives, and it is made possible to improve electric characteristics and alignment stability. In the case of low irradiation energy, it is advantageous in terms of suppression of deterioration advancement of other members such as color filter. Therefore, a compound containing a cinnamate group is more preferable as the photo-alignment film material. The baking temperature and baking time for forming an alignment film, and the thickness of a photo-alignment film are not particularly limited, and may be set properly.

[Chem. 1]

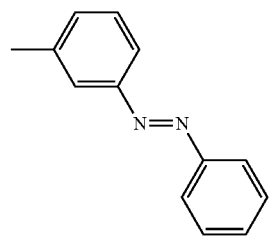

(1)

[Chem. 2]

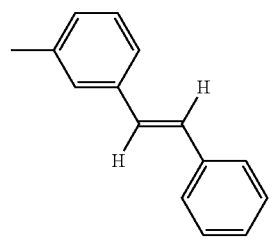

(2)

-continued

[Chem. 3]

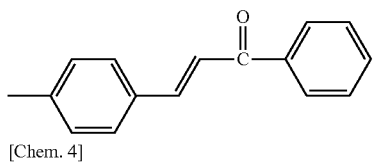

(3)

[Chem. 4]

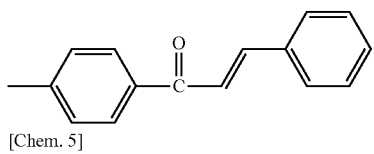

(4)

[Chem. 5]

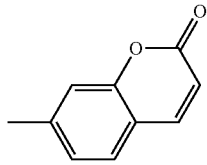

(5)

[Chem. 6]

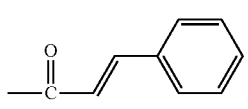

(6)

[Chem. 7]

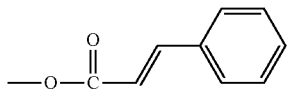

(7)

Figure 16:
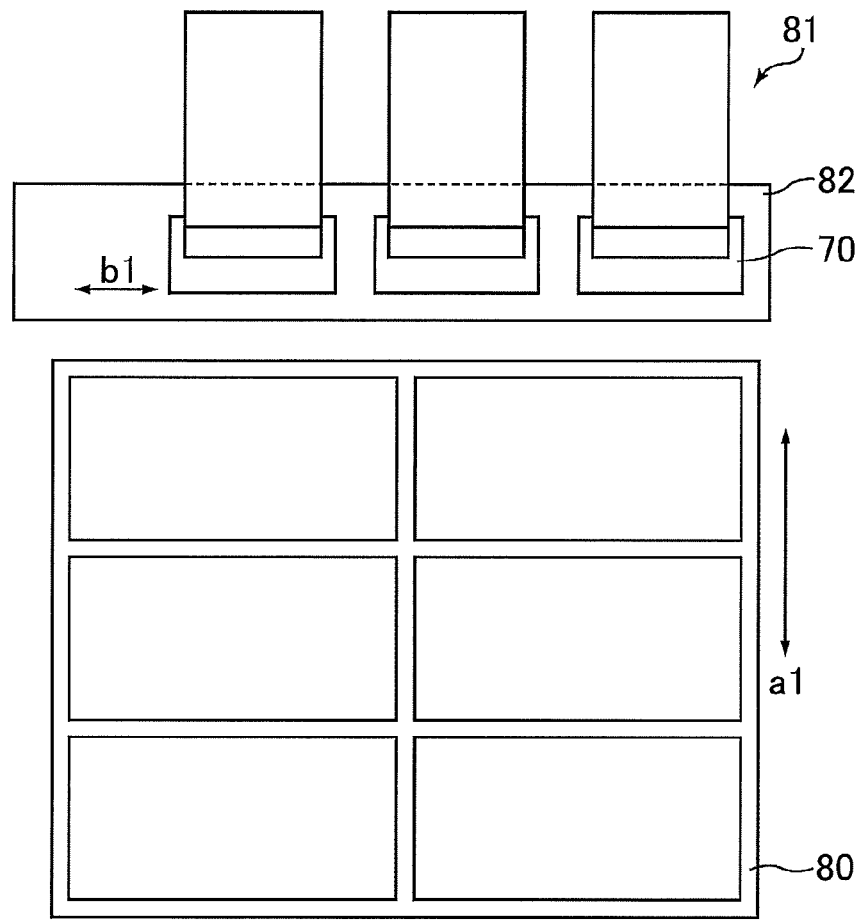
FIG. 16 is a plane view schematically illustrating an exposure apparatus employed in Embodiment 1.
Figure 17:
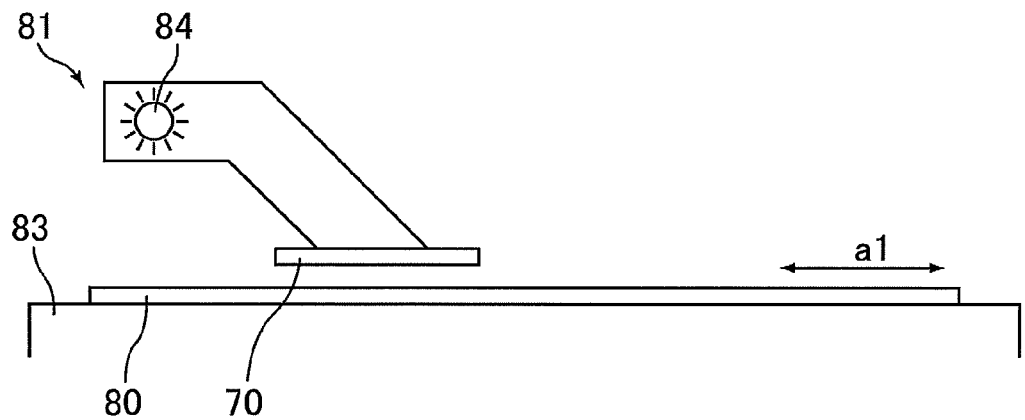
FIG. 17 is a cross-sectional view schematically illustrating an exposure apparatus employed in Embodiment 1.

Next, an exposure apparatus to be employed in Embodiment 1 will be described. FIG. 16 is a plane view schematically illustrating an exposure apparatus employed in Embodiment 1. FIG. 17 is a cross-sectional view schematically illustrating an exposure apparatus employed in Embodiment 1.

As illustrated in FIG. 16 and FIG. 17, the exposure apparatus to be employed in Embodiment 1 is a one-stage type exposure apparatus and includes an exposure stage 82 including a plurality of exposure heads 81 and a table 83 for placing a substrate (mother glass) 80 and transferring the substrate to a prescribed direction. The substrate 80 is divided into a plurality of regions corresponding to the panel size. The exposure apparatus may include a means for transferring only the exposure stage 82 or the table 83 for placing the substrate 80 or a transfer means for transferring both of the table 83 for placing a substrate 80 and the exposure stage 82.

The plurality of exposure heads 81 are arranged at intervals from one another along a direction b1 perpendicular to a transfer direction (scanning direction) a1 of the substrate 80. The respective exposure heads 81 are supported in a state of being capable of moving to the directional or b1 along a plane parallel to a surface of the substrate 80 to be irradiated.

Each of the exposure heads 81 includes a light source 84 for emitting ultraviolet rays, a photo mask 70, and optical members such as a polarization filter and an optical lens installed between the light source 84 and the photo mask 70, and is configured so as to irradiate the surface of the substrate 80 with polarized ultraviolet rays through the photo mask 70. The respective optical members can convert ultraviolet rays emitted from the light source to a desired state. The light source 84 may be properly selected depending on an object to be irradiated, and may be alight source emitting visible light.

Figure 18:
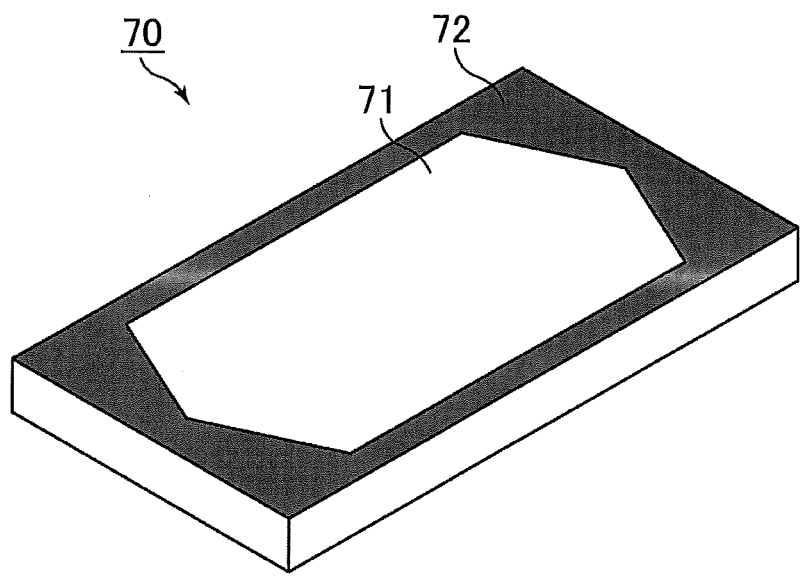
FIG. 18 is a perspective view schematically illustrating a photo mask included in an exposure apparatus employed in Embodiment 1.
Figure 19:
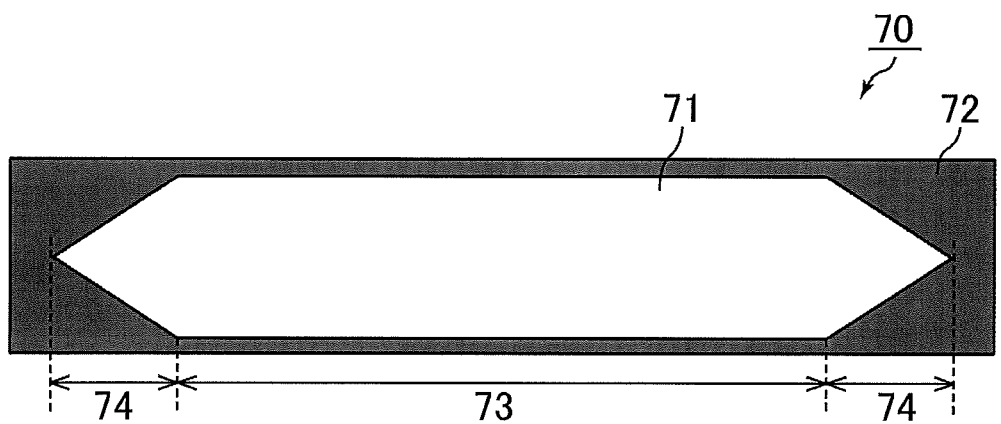
FIG. 19 is a plane view schematically illustrating a photo mask employed in Embodiment 1.

Next, the structure of a photo mask (illuminance adjustment plate) will be described in detail. FIG. 18 is a perspective view schematically illustrating a photo mask included in an exposure apparatus employed in Embodiment 1. FIG. 19 is a plane view schematically illustrating a photo mask employed in Embodiment 1. For example, the photo mask 70 may be a plate-like member which includes, as illustrated in FIG. 18, a transparent substrate made of silica glass or the like and a light shielding member patterned on the transparent substrate. The portion where the light shielding member is positioned becomes a light shielding part 72 and the portion surrounded with the light shielding part 72 becomes a light transmission part 71. The light transmission part 71 has a slit-like shape with tapered both ends. The shape of the light transmission part 71 of the photo mask 70 has an axially symmetric shape on a line bisecting the light transmission part 71 of the photo mask 70 up and down as a boundary line, and an axially symmetric shape on a line bisecting the light transmission part 71 of the photo mask 70 right and left as a boundary line.

More specifically, as illustrated in FIG. 19, the light transmission part 71 of the photo mask 70 has a main region 73 and a sub region 74. The width of the main region 73 is even, but the width of the sub region 74 is narrowed as being apart from the main region 73. Accordingly, the amount of light transmitted through the sub region 74 is lower than the amount of light transmitted through the main region 73. The light transmission part 71 is not limited to a member with a light transmission property, and may be an opening penetrating the transparent substrate.

Figure 20:
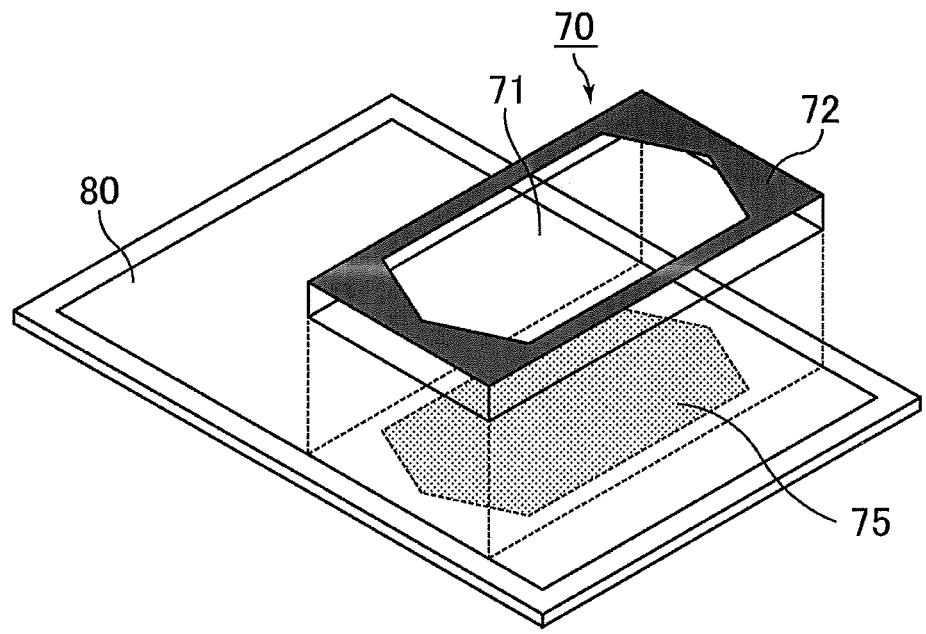
FIG. 20 is a view schematically illustrating a state of executing exposure to a substrate surface in Embodiment 1.

FIG. 20 is a view schematically illustrating a state of executing exposure to a substrate surface in Embodiment 1. When the substrate 80 passes under the photo mask 70, as illustrated in FIG. 20, a region 75 of the surface of the substrate 80 corresponding to the shape of the light transmission part 71 of the photo mask 70 is exposed to the light.

Figure 21:
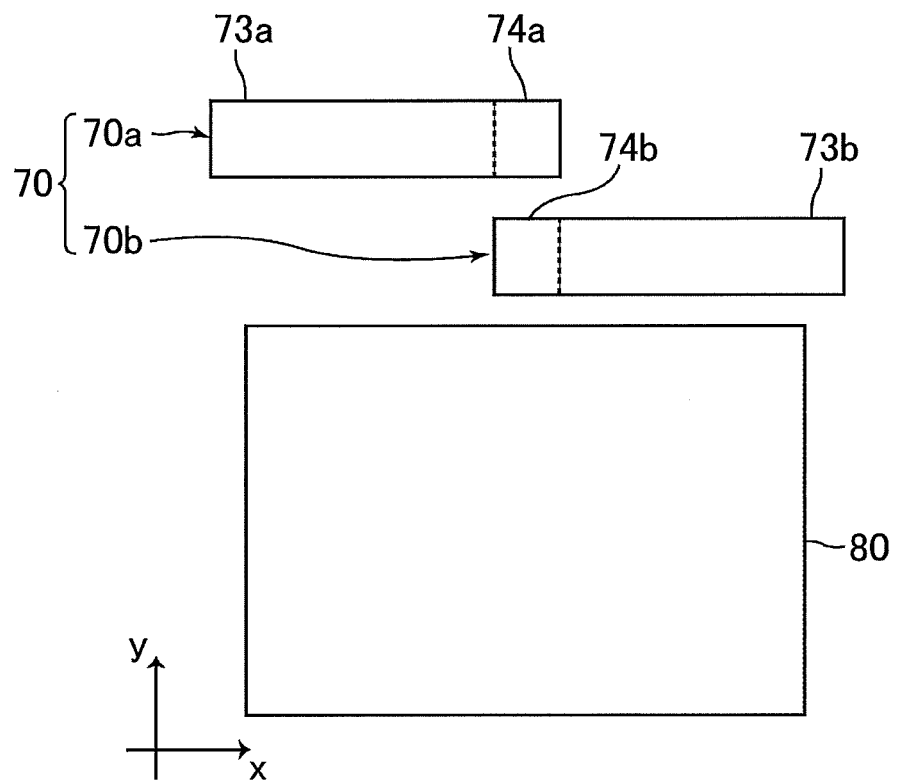
FIG. 21 is a plane view schematically illustrating a state of executing a photo-alignment treatment to a substrate surface through an illuminance adjustment plate in Embodiment 1.

Next, an exposure method for an alignment film will be described. FIG. 21 is a plane view schematically illustrating a state of executing a photo-alignment treatment to a substrate surface through an illuminance adjustment plate in Embodiment 1. At the time of the photo-alignment treatment in Embodiment 1, exposure is carried out by, for example, a scanning (scan) method through the photo mask (illuminance adjustment plate) 70. Since being excellent in the stability of irradiation amount in the plane of the substrate, the scanning exposure can effectively suppress dispersion of properties of an alignment film such as the alignment direction and pre-tilt angle imparting property. As a result, a photo-alignment film which aligns liquid crystal molecules adjacent to the substrate surface substantially horizontally (0 to 2° to the substrate surface) can be formed on the substrate surface.

First, a first photo mask 70a provided with a light transmission part including a main region 73a and a sub region 74a with different transmittance and a second photo mask 70b provided with a light transmission part including a main region 73b and a sub region 74b with different transmittance are prepared.

Next, as illustrated in FIG. 21, the photo masks 70a and 70b are arranged in a manner such that the sub regions 74a and 74b are the same positions as in the x-axis direction and shifted from each other in the y-axis direction.

A light source is arranged above the photo masks 70a and 70b, and the light source and the photo masks 70a and 70b are integrally transferred linearly or the substrate 80 is transferred linearly while the light source or the photo masks 70a and 70b is/are fixed. An image detection camera is provided beside the photo masks 70a and 70b, and reads bus wiring such as a data signal line or a scanning signal line, and can transfer the substrate 80 in a following manner.

Figure 22:
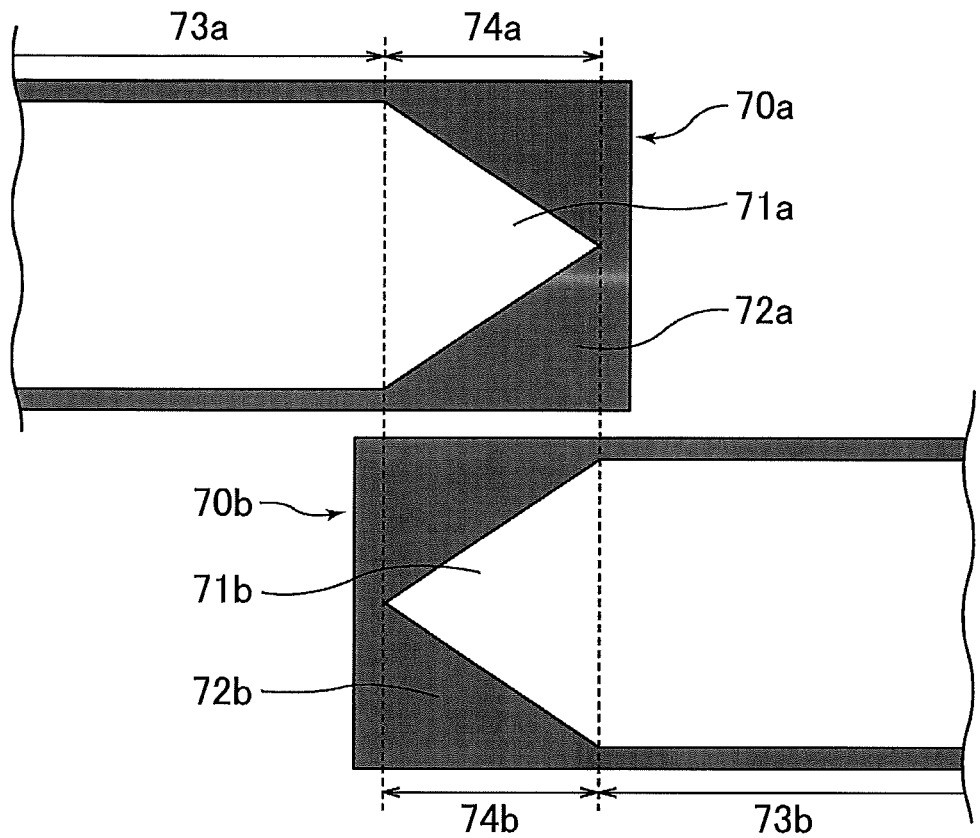
FIG. 22 is a plane view schematically illustrating a photo mask (illuminance adjustment plate) employed in Embodiment 1.

FIG. 22 is a plane view schematically illustrating a photo mask (illuminance adjustment plate) employed in Embodiment 1. The exposure apparatus employed in Embodiment 1 includes two photo masks (the first photo mask 70a and the second photo mask 70b) shifted from each other in the x-axis direction and the y-axis direction. The portions where the light shielding members are positioned become light shielding parts 72a and 72b, and the portions surrounded with the light shielding parts 72a and 72b become light transmission parts 71a and 71b. The light transmission parts 71a and 71b have a slit-like shape with tapered both ends. The light transmission part 71a of the first photo mask 70a includes a linear main region 73a with even width and a sub region 74a with gradually narrowed width of the light transmission part 71a toward the tip end of the photo mask 70a. The light transmission part 71b of the second photo mask 70b includes a linear main region 73b with even width and a sub region 74b with gradually narrowed width toward the tip end of the photo mask 70b.

The shapes of the sub regions 74a and 74b constituting both end parts of the light transmission parts 71a and 71b of the photo masks 70a and 70b will be described in detail. The outer edges of the sub regions 74a and 74b are constituted by first and second straight lines extended in the side opposed to the main regions 73a and 73b from both terminals of the boundaries between the main regions 73a and 73b and the sub regions 74a and 74b. These first and second straight lines are extended in the slanting directions to the straight lines constituting the outer edges of the main regions 73a and 73b, and have mutually different angles. The first and second straight lines cross each other on a line bisecting the main regions 73a and 73b up and down. That is, the outer edges of the subregions 74a and 74b are constituted by two straight lines having a variation in accordance with a linear function.

The size (area) of the sub region 74a of the light transmission part 71a of the photo mask 70a and the size (area) of the sub region 74b of the light transmission part 71b of the photo mask 70b are respectively the same. Further, the shape of the sub region 74a of the light transmission part 71a and the shape of the sub region 74b of the light transmission part 71b are axially symmetric on the boundary line in the case where these photo masks 70a and 70b are arranged side by side. This makes it possible to average the irradiation amount of light applied through the respective sub regions 74a and 74b, and to hardly cause display unevenness.

Figure 23:
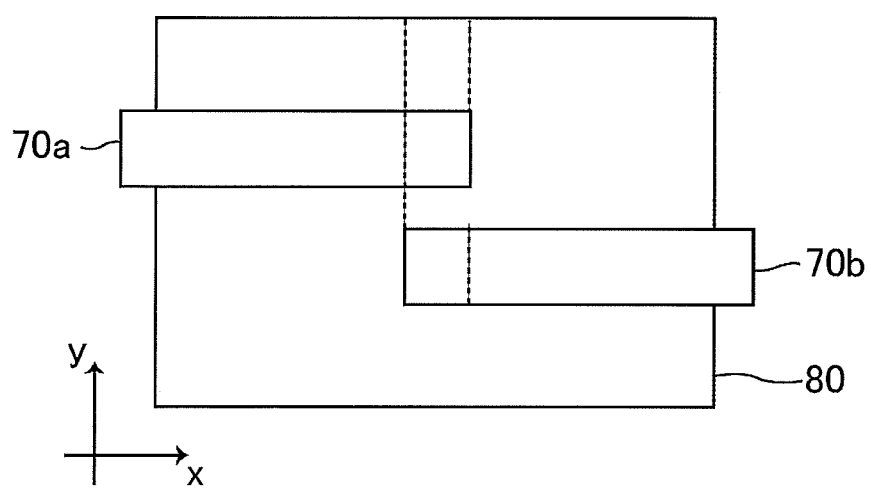
FIG. 23 is a plane view schematically illustrating a state of actually carrying out scanning exposure to a substrate surface in Embodiment 1.
Figure 24:
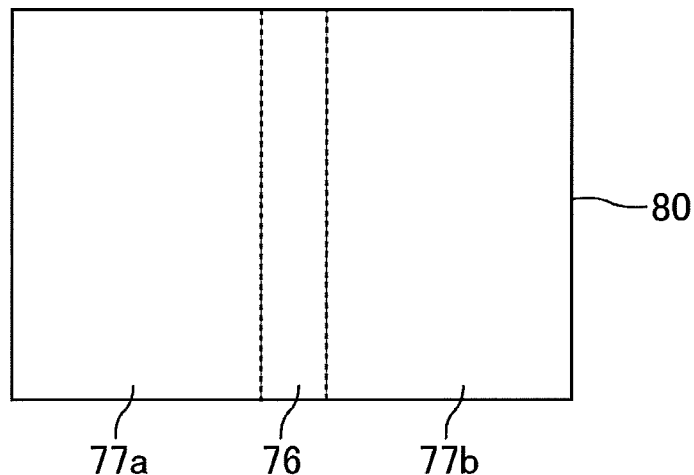
FIG. 24 is a plane view schematically illustrating respective exposure regions after scanning exposure.

FIG. 23 is a plane view schematically illustrating a state of actually carrying out scanning exposure to a substrate surface in Embodiment 1. FIG. 24 is a plane view schematically illustrating respective exposure regions after scanning exposure. First, positioning of the photo masks 70a and 70b is carried out, and thereafter the alignment film formed on the substrate 80 is exposed from one end to the other end by polarized ultraviolet rays through the photo masks 70a and 70b while the substrate 80 is transferred to the +y direction. At this time, the substrate 80 is transferred in a manner such that the extension direction of the data signal line or the scanning signal line and the longitudinal direction of the slits of the photo masks 70a and 70b are along each other. Further, the polarized ultraviolet rays are applied to the substrate surface from the normal direction. A constant gap (proximity gap) is formed between the photo masks 70a and 70b and the substrate 80. This makes it possible to transfer the substrate 80 smoothly and to prevent the photo masks 70a and 70b from being contact with the substrate 80 even if the photo masks 70a and 70b are sagged owing to self-weight. This can allow a photo-alignment treatment to perform at one time for an area in a range where the treatment cannot be completed with one photo mask.

The substrate subjected to the photo-alignment treatment by such a process is provided with an exposure region 77a (first exposure) which is scan exposed through the main region of the photo mask, an exposure region 77b (second exposure) which is scan exposed through the main region of the photo mask, a sub region of the photo mask, and a joining region 76 which is scan exposed through the sub region of the photo mask, as illustrated in FIG. 24. In the joining region 76, exposure is carried out twice through the sub region, but since these exposure treatments are gradually decreased from one of two neighboring exposure regions toward the other side of the two neighboring exposure regions, and thus the light exposure amount is averaged and the display unevenness can be hardly caused.

Figure 25:
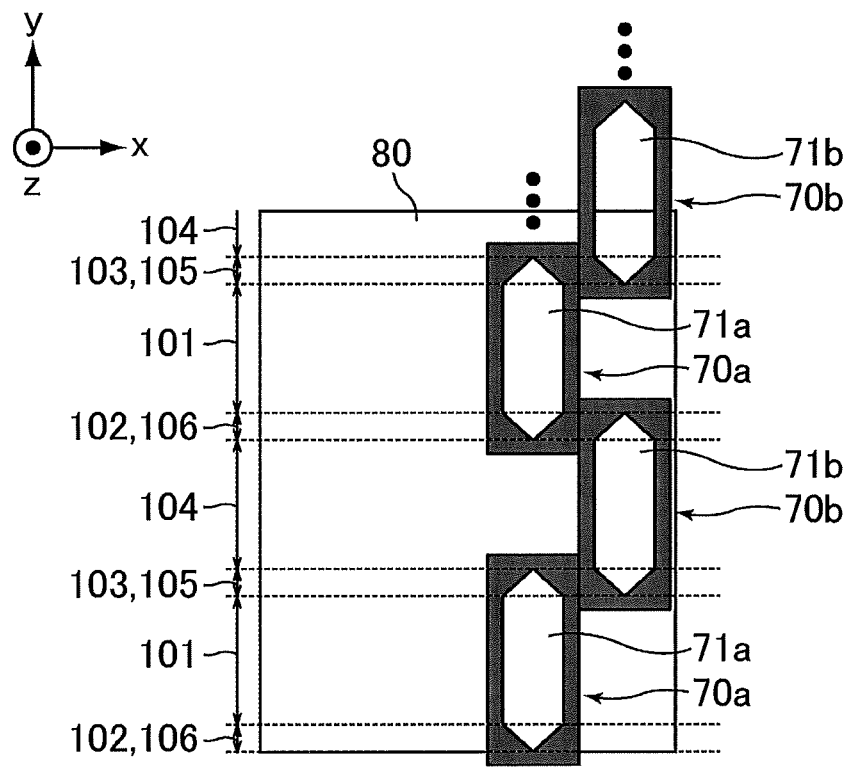
FIG. 25 is a plane view schematically illustrating a state of carrying out exposure to a TFT substrate surface in Embodiment 1.

Next, a specific exposure method for the mother glass substrate will be described. In Embodiment 1, a one time exposure method simultaneously using a plurality of photo masks is employed. Herein, the case of executing scanning exposure by transferring a substrate but not photo masks will be described. Additionally, the case of transferring a substrate in a manner such that the lengthwise direction of the data signal line is the same as the scanning direction will be described. FIG. 25 is a plane view schematically illustrating a state of carrying out exposure to a TFT substrate surface in Embodiment 1. As illustrated in FIG. 25, both shapes of the light transmission parts 71a and 71b of the photo masks 70a and 70b to be used for exposure are slits tapered in both ends. Masks are arranged in a manner such that the longitudinal directions of the light transmission parts are coincident with the lengthwise direction of the scanning signal line, that is, perpendicular to the lengthwise direction of the data signal line. The photo masks 70a and 70b have different length by the length equal to addition of each one main region and each one sub region of the light transmission parts 71a and 71b of the photo masks 70a and 70b in the +y axis direction.

As illustrated in FIG. 25, polarized ultraviolet rays are applied from one end to the other end of a region of the substrate 80 to which a photo-alignment film material is applied through the photo masks 70a and 70b while the substrate 80 is transferred at a constant speed in the +x axis direction. Consequently, a first region 101 exposed through the main region of the light transmission part of the photo mask 70a, and a second region 102 and a third region 103 exposed through the sub region of the light transmission part of the photo mask 70a are formed. Further, a fourth region 104 exposed through a main region of the light transmission part of the photo mask 70b, and a fifth region 105 and a sixth region 106 exposed through the subregion of the light transmission part of the photo mask 70b are simultaneously formed. The regions exposed through the third region 103 and the fifth region 105 are overlapped with each other, and this overlapped region become a joining region. The regions exposed through the second region 102 and the sixth region 106 are also overlapped with each other, and this overlapped region become a joining region. The width of each of the joining regions is 20 mm or wider and 65 mm or narrower. As described above, the boundary in the joining regions can be made vague and occurrence of alignment unevenness can be suppressed by preparing two photo masks including a sub region tapered toward the terminal.

The above steps are carried out respectively for the mother glass substrate including TFT substrate configuration and the mother glass substrate including counter substrate configuration to complete the photo-alignment treatment for the respective substrates. In Embodiment 1, since at least four photo masks are used at one time, the exposure is extremely efficient, and the photo-alignment treatment can be completed by one step in a shortest manner.

Embodiment 2

A manufacturing method according to Embodiment 2 is the same as that of Embodiment 1, except that the shape of a light transmission part of a photo mask to be used is different from that in Embodiment 1.

Figure 26:
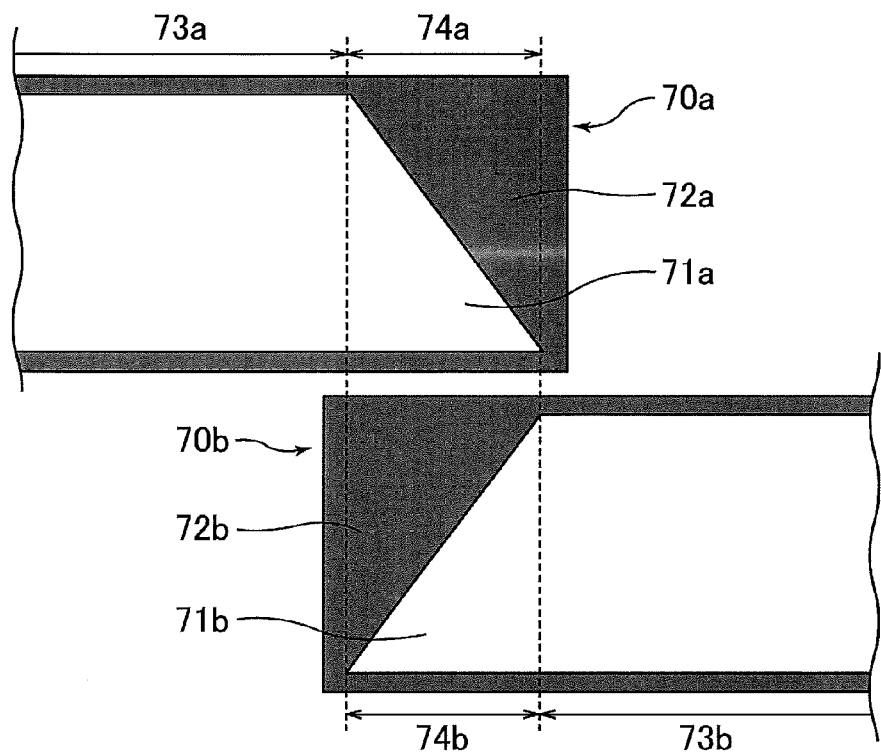
FIG. 26 is a plane view schematically illustrating a photo mask (illuminance adjustment plate) employed in Embodiment 2.

FIG. 26 is a plane view schematically illustrating a photo mask (illuminance adjustment plate) employed in Embodiment 2. The shapes of the sub regions 74a and 74b constituting both end parts of the light transmission parts 71a and 71b of the photo masks 70a and 70b will be described in detail. The outer edges of the subregions 74a and 74b are constituted by first and second straight lines extended in the side opposed to the main regions 73a and 73b from both terminals of the boundaries between the main regions 73a and 73b and the sub regions 74a and 74b. The first straight line is extended in parallel to straight lines constituting the outer edges of the main regions 73a and 73b, and the second straight line is extended in a slanting direction to straight lines constituting the outer edges of the main regions 73a and 73b. The first and the second straight lines cross each other on an extension line of the straight lines constituting the outer edges of the main regions. That is, in Embodiment 2, the outer edges of the sub regions 74a and 74b are constituted by two straight lines having a variation in accordance with a linear function.

The size (area) of the sub region 74a of the light transmission part 71a of the photo mask 70a and the size (area) of the sub region 74b of the light transmission part 71b of the photo mask 70b are respectively approximately the same. Further, the shape of the sub region 73a of the light transmission part 71a and the shape of the sub region 73b of the light transmission part 71b are axially symmetric on the boundary line in the case where these photo masks 70a and 70b are arranged side by side. This makes it possible to average the irradiation amount of light applied through the respective subregions 73a and 73b, and to hardly cause display unevenness.

Figure 27:
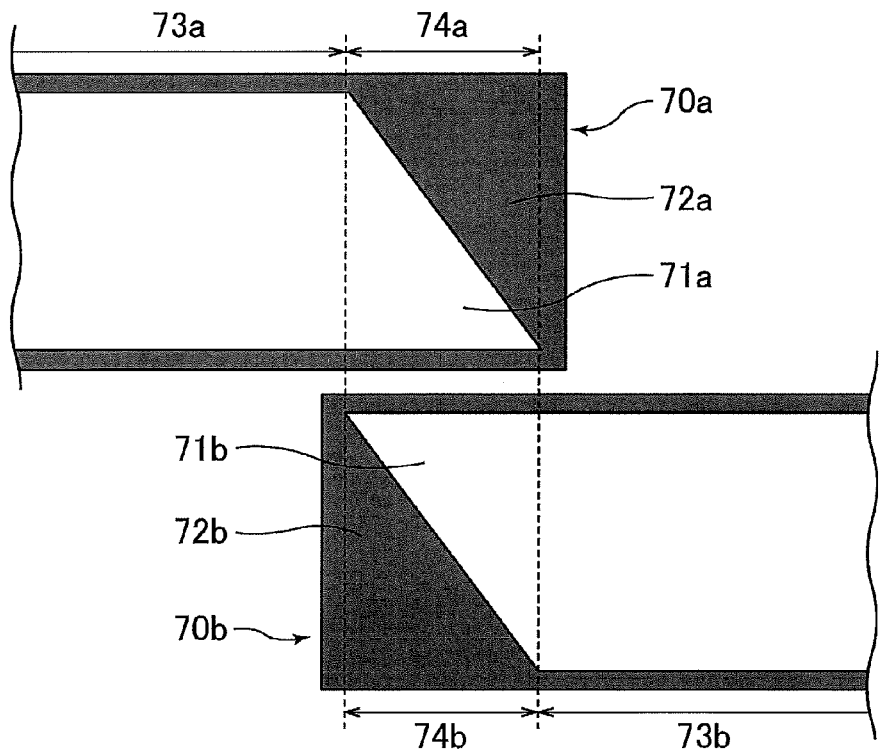
FIG. 27 is a plane view schematically illustrating a photo mask (illuminance adjustment plate) employed in Embodiment 2 (first modified example).
Figure 28:
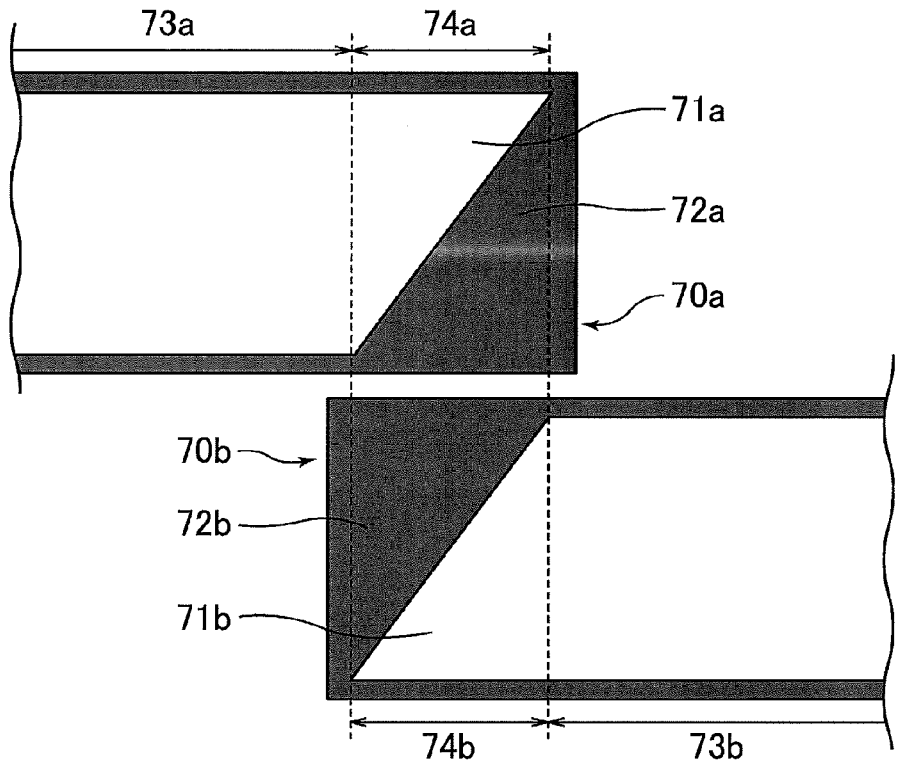
FIG. 28 is a plane view schematically illustrating a photo mask (illuminance adjustment plate) employed in Embodiment 2 (second modified example).
Figure 29:
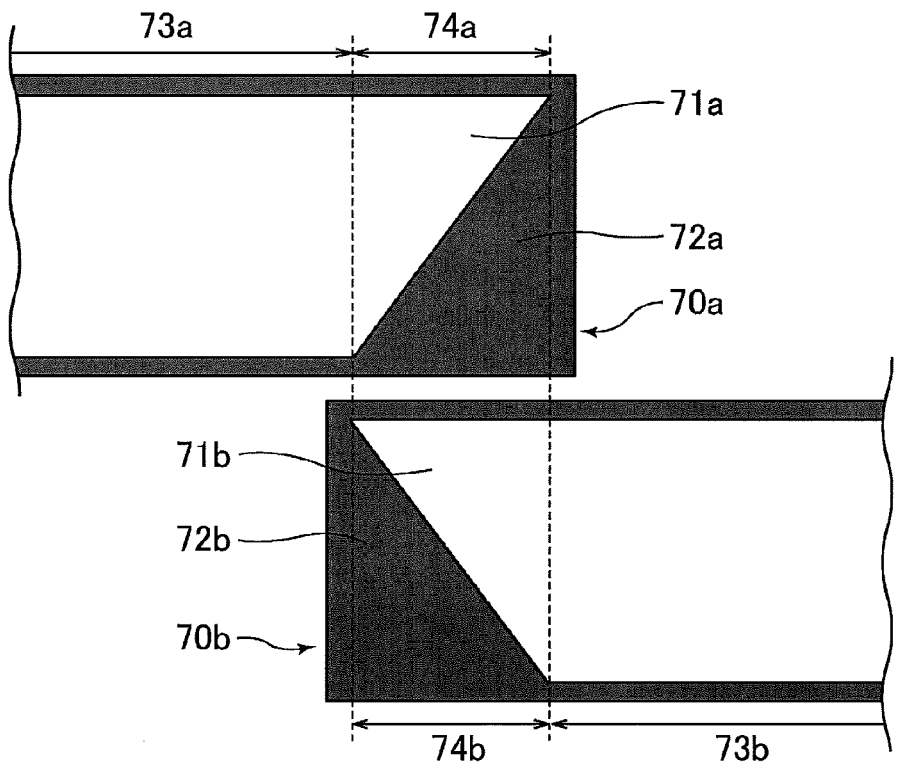
FIG. 29 is a plane view schematically illustrating a photo mask (illuminance adjustment plate) employed in Embodiment 2 (third modified example).

Additionally, the shape of the light transmission part 71a of the first photo mask 70a and the shape of the light transmission part 71b of the second photo mask 70b in Embodiment 2 are unnecessary to be axially symmetric, and may be, for example, the shape illustrated in FIG. 27 (first modified example of Embodiment 2), the shape illustrated in FIG. 28 (second modified example of Embodiment 2), or the shape illustrated in FIG. 29 (third modified example of Embodiment 2). The size (area) of the sub region 74a of the light transmission part 71a of the photo mask 70a and the size (area) of the sub region 74b of the light transmission part 71b of the photo mask 70b are respectively approximately the same also in the first to third modified examples.

Embodiment 3

A manufacturing method according to Embodiment 3 is the same as that of Embodiment 1, except that the shape of a light transmission part of a photo mask to be used is different from that in Embodiment 1.

Figure 30:
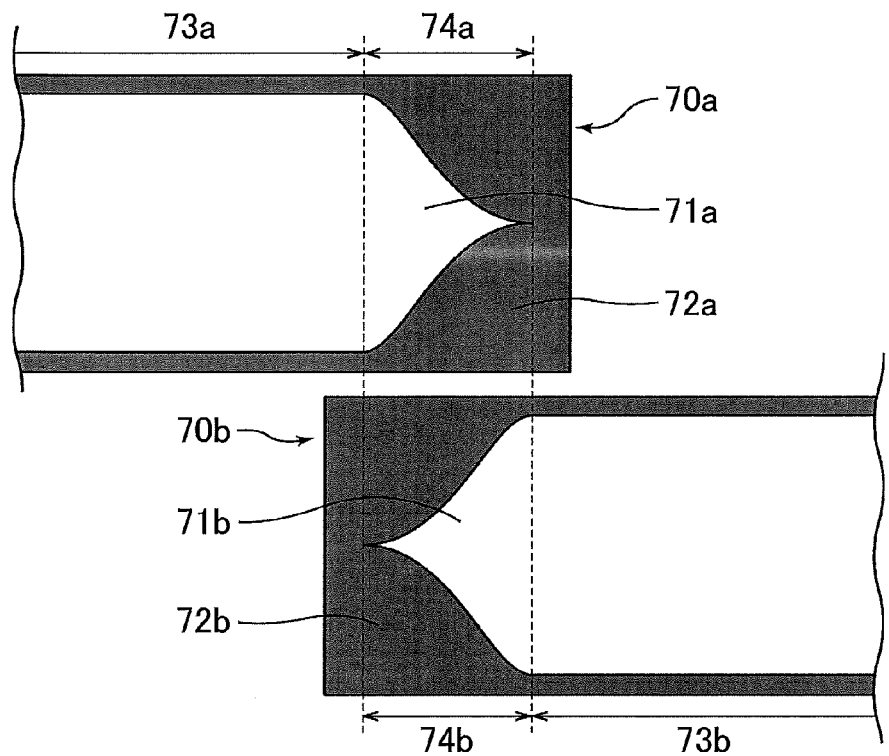
FIG. 30 is a plane view schematically illustrating a photo mask (illuminance adjustment plate) employed in Embodiment 3.

FIG. 30 is a plane view schematically illustrating a photo mask (illuminance adjustment plate) employed in Embodiment 3. The shapes of the sub regions 74a and 74b constituting both end parts of the light transmission parts 71a and 71b of the photo masks 70a and 70b will be described in detail. The outer edges of the subregions 74a and 74b are constituted by first and second curved lines extended in the side opposed to the main regions 73a and 73b from both terminals of the boundaries between the main regions 73a and 73b and the sub regions 74a and 74b. The variation of the first and second curved lines is in accordance with a sine function. The first and second curved lines cross each other on a line bisecting the main regions 73a and 73b up and down. That is, the outer edges of the sub regions 74a and 74b are constituted by two curved lines having a variation in accordance with a sine function.

The size (area) of the sub region 74a of the light transmission part 71a of the photo mask 70a and the size (area) of the sub region 74b of the light transmission part 71b of the photo mask 70b are respectively approximately the same. Further, the shape of the sub region 74a of the light transmission part 71a and the shape of the sub region 74b of the light transmission part 71b are axially symmetric on the boundary line in the case where these photo masks 70a and 70b are arranged side by side. This makes it possible to average the irradiation amount of light applied through the respective subregions 74a and 74b, and to hardly cause display unevenness. Particularly in Embodiment 3, curved lines in accordance with a sine function are employed as the lines constituting the outer edges of the sub regions, and the change is smooth as compared to that in Embodiment 1 or Embodiment 2 in which straight lines in accordance with a linear function are employed as the lines constituting the outer edges of the sub region, and thus the display unevenness in the joining region can be more suppressed.

Embodiment 4

A manufacturing method according to Embodiment 4 is the same as that of Embodiment 1, except that the shape of a light transmission part of a photo mask to be used is different from that in Embodiment 1.

Figure 31:
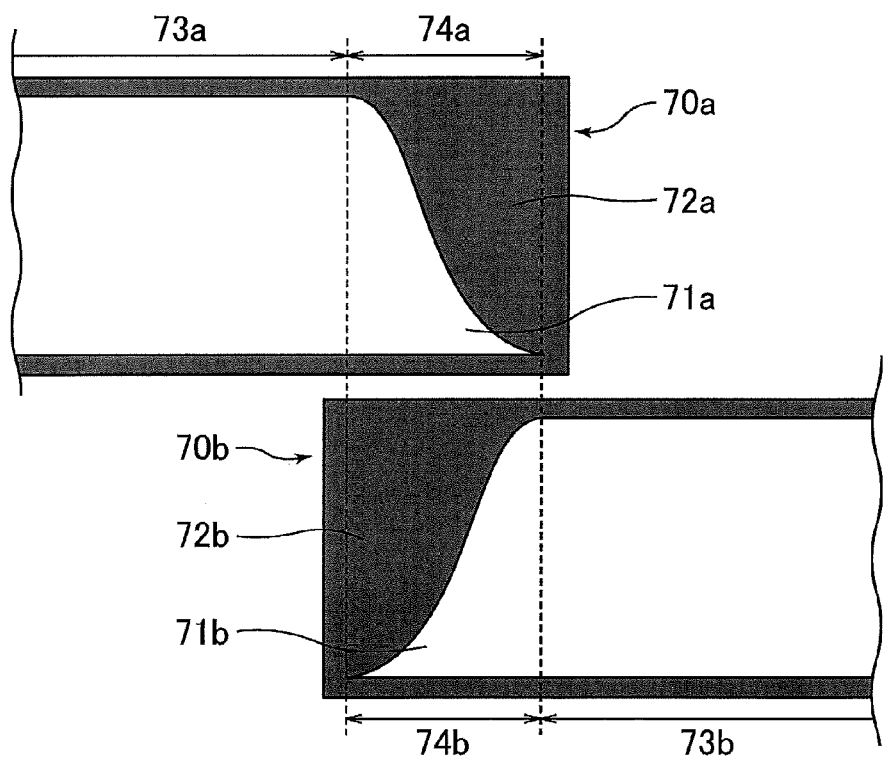
FIG. 31 is a plane view schematically illustrating a photo mask (illuminance adjustment plate) employed in Embodiment 4.

FIG. 31 is a plane view schematically illustrating a photo mask (illuminance adjustment plate) employed in Embodiment 4. The shapes of the sub regions 74a and 74b constituting both end parts of the light transmission parts 71a and 71b of the photo masks 70a and 70b will be described in detail. The outer edges of the sub regions 74a and 74b are constituted by a straight line and a curved line extended in the side opposed to the main regions 73a and 73b from both terminals of the boundaries between the main regions 73a and 73b and the sub regions 74a and 74b.

The straight line is extended in parallel to straight lines constituting the outer edges of the main regions 73a and 73b, and the curved line is extended in a slanting direction to straight lines constituting the outer edges of the main regions 73a and 73b. The straight line and curved line cross each other on an extension line of the straight lines constituting the outer edges of the main regions. That is, in Embodiment 4, the sub regions 74a and 74b are configured by the straight line having a variation in accordance with a linear function and the curved line having a variation in accordance with a sine function.

The size (area) of the sub region 74a of the light transmission part 71a of the photo mask 70a and the size (area) of the sub region 74b of the light transmission part 71b of the photo mask 70b are respectively approximately the same. Further, the shape of the sub region 74a of the light transmission part 71a and the shape of the sub region 74b of the light transmission part 71b are axially symmetric on the boundary line in the case where these photo masks 70a and 70b are arranged side by side. This makes it possible to average the irradiation amount of light applied through the respective subregions 74a and 74b, and to hardly cause display unevenness. Particularly in Embodiment 4, curved lines in accordance with a sine function are employed as the lines constituting the outer edges of the sub regions, and the change is smooth as compared to that in Embodiment 1 or Embodiment 2 in which straight lines in accordance with a linear function are employed as the lines constituting the outer edges of the sub region, and thus the display unevenness in the joining region can be more suppressed.

Figure 32:
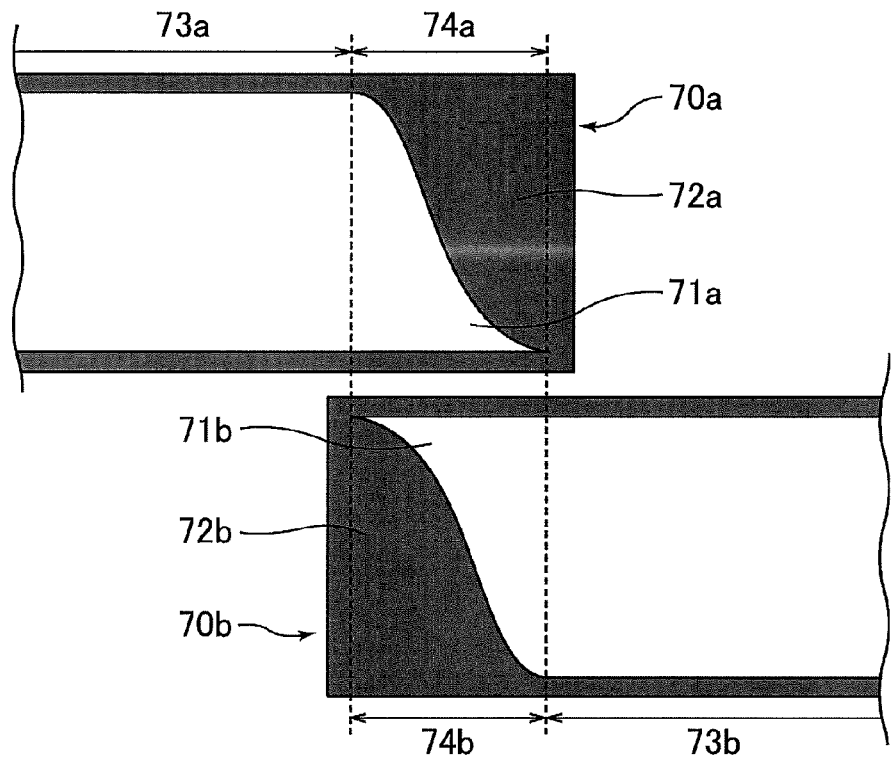
FIG. 32 is a plane view schematically illustrating a photo mask (illuminance adjustment plate) employed in Embodiment 4 (first modified example).
Figure 33:
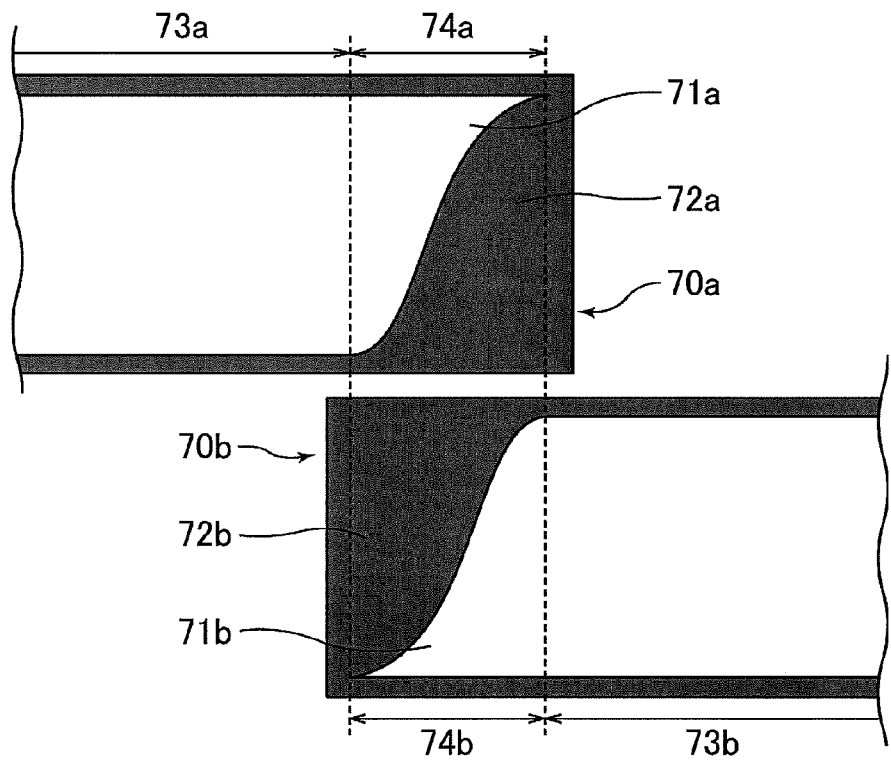
FIG. 33 is a plane view schematically illustrating a photo mask (illuminance adjustment plate) employed in Embodiment 4 (second modified example).
Figure 34:
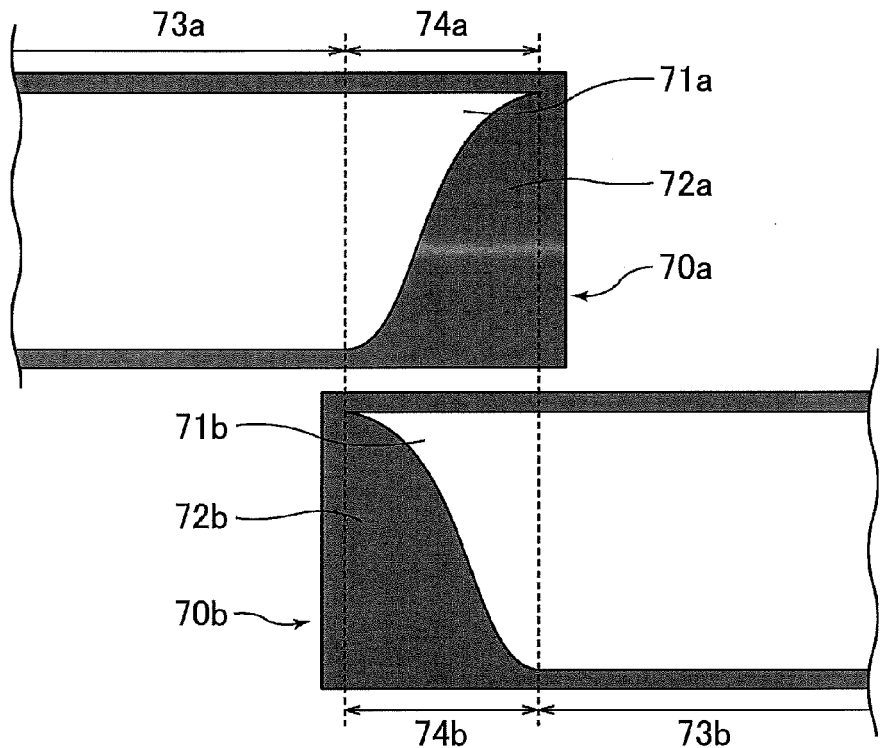
FIG. 34 is a plane view schematically illustrating a photo mask (illuminance adjustment plate) employed in Embodiment 4 (third modified example).

Additionally, the shape of the light transmission part 71a of the first photo mask 70a and the shape of the light transmission part 71b of the second photo mask 70b in Embodiment 4 are unnecessary to be axially symmetric, and may be, for example, the shape illustrated in FIG. 32 (first modified example of Embodiment 4), the shape illustrated in FIG. 33 (second modified example of Embodiment 4), or the shape illustrated in FIG. 34 (third modified example of Embodiment 4). The size (area) of the sub region 74a of the light transmission part 71a of the photo mask 70a and the size (area) of the sub region 74b of the light transmission part 71b of the photo mask 70b are approximately the same, respectively also in the first to third modified examples.

Embodiment 5

A manufacturing method according to Embodiment 5 is the same as that of Embodiment 1, except that the shape of a light transmission part of a photo mask to be used is different from that in Embodiment 1.

Figure 35:
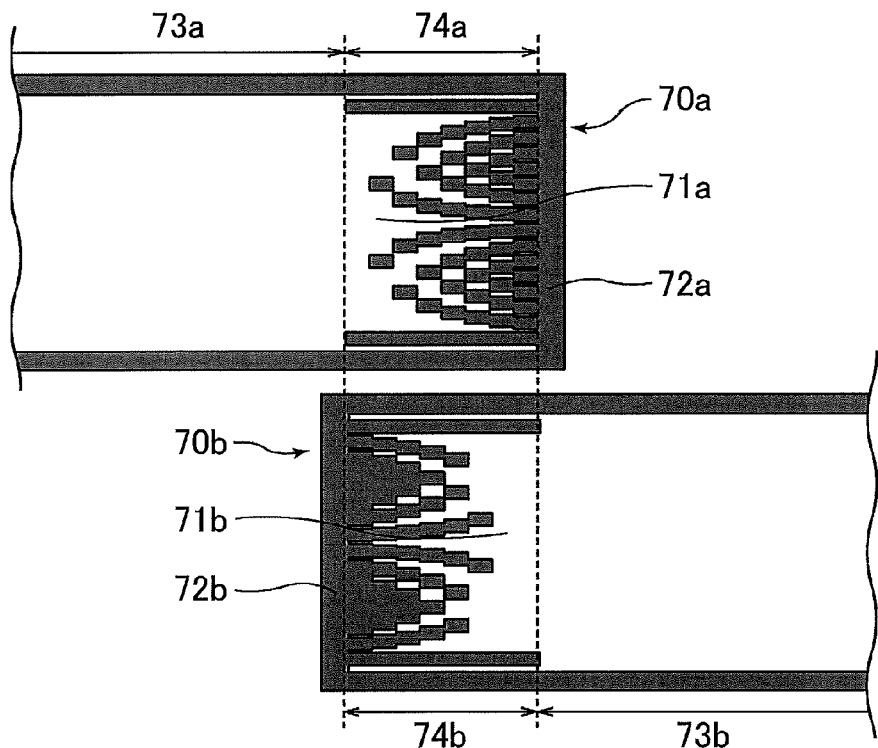
FIG. 35 is a plane view schematically illustrating a photo mask (illuminance adjustment plate) employed in Embodiment 5.

FIG. 35 is a plane view schematically illustrating a photo mask (illuminance adjustment plate) employed in Embodiment 5. The shapes of the sub regions 74a and 74b constituting both end parts of the light transmission parts 71a and 71b of the photo masks 70a and 70b will be described in detail. In Embodiment 5, the sub regions 74a and 74b of the photo masks 70a and 70b are divided into a plurality of dots, and the difference of the transmittance of the main regions 73a and 73b and that of the subregions 74a and 74b is adjusted in accordance with the number and size of the light shielding parts and light transmission parts corresponding to the respective dots. The dot pattern can be formed at the time of patterning thorough the light shielding member on a transparent substrate.

The sizes of the respective dots constituting the light transmission parts 71a and 71b are made so sufficiently small as to be not resolved. That is, in Embodiment 5, an exposure region is not formed by projection of the shapes of the slits unlike the case illustrated in FIG. 20. Specifically, the size is preferably 2 μm or shorter square. The shapes of the respective dots are not limited strictly. In Embodiment 5, resolution is made easy by executing scanning exposure. The respective dots constituting the light transmission parts among these dots are gradually decreased in the number and/or size as they are more apart from the main region, and on the other hand, the respective dots constituting the light shielding parts are gradually increased in the number and/or size as they are more apart from the main region. FIG. 35 schematically illustrates the arrangement points of the respective dots, but specific arrangement points of the respective dots are not particularly limited.

The size (area) of the sub region 74a of the light transmission part 71a of the photo mask 70a and the size (area) of the sub region 74b of the light transmission part 71b of the photo mask 70b are respectively approximately the same. Further, the shape of the sub region 74a of the light transmission part 71a and the shape of the sub region 74b of the light transmission part 71b are axially symmetric on the boundary line in the case where these photo masks 70a and 70b are arranged side by side. This makes it possible to average the irradiation amount of light applied through the respective sub regions 74a and 74b, and to hardly cause display unevenness.

Embodiment 6

A manufacturing method according to Embodiment 6 is the same as that of Embodiment 1, except that the shape of a light transmission part of a photo mask to be used is different from that in Embodiment 1.

Figure 36:
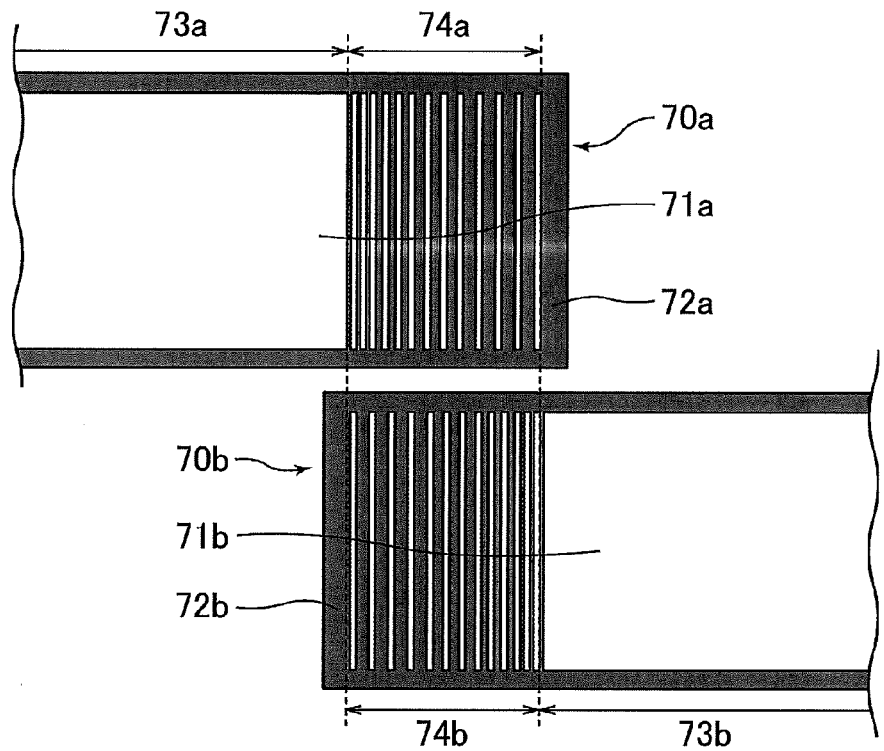
FIG. 36 is a plane view schematically illustrating a photo mask (illuminance adjustment plate) employed in Embodiment 6.

FIG. 36 is a plane view schematically illustrating a photo mask (illuminance adjustment plate) employed in Embodiment 6. The shapes of the sub regions 74a and 74b constituting both end parts of the light transmission parts 71a and 71b of the photo masks 70a and 70b will be described in detail. In Embodiment 6, the subregions of the photo masks are divided into a plurality of strips, and the difference of the transmittance of the main regions 73a and 73b and that of the sub regions 74a and 74b is adjusted in accordance with the number and size of the light shielding parts and light transmission parts corresponding to the respective strips. The strip pattern can be formed at the time of patterning thorough the light shielding member on a transparent substrate.

The transverse widths of the respective strips constituting the light transmission parts are made so sufficiently narrow as to be not resolved. That is, in Embodiment 6, an exposure region is not formed by projection of the shapes of the slits unlike the case illustrated in FIG. 20. Specifically, the width is preferably 2 μm or narrower. The shapes of the respective strips are not limited strictly. In Embodiment 6, resolution is not made easy even if scanning exposure is carried out unlike in Embodiment 5. The respective strips constituting the light transmission parts among these strips are gradually decreased in the number and/or size toward the side opposed to the main region, and on the other hand, the respective strips constituting the light shielding parts are gradually increased in the number and/or size toward the side opposed to the main region. FIG. 36 schematically illustrates the arrangement points of the respective strips, but specific arrangement points of the respective dots are not particularly limited.

The size (area) of the sub region 74a of the light transmission part 71a of the photo mask 70a and the size (area) of the sub region 74b of the light transmission part 71b of the photo mask 70b are respectively approximately the same. Further, the shape of the sub region 74a of the light transmission part 71a and the shape of the sub region 74b of the light transmission part 71b are axially symmetric on the boundary line in the case where these photo masks 70a and 70b are arranged side by side. This makes it possible to average the irradiation amount of light applied through the respective subregions 74a and 74b, and to hardly cause display unevenness.

Embodiment 7

A manufacturing method according to Embodiment 7 is the same as that of Embodiment 1, except that the configuration of a photo mask to be used is different from that in Embodiment 1.

Figure 37:
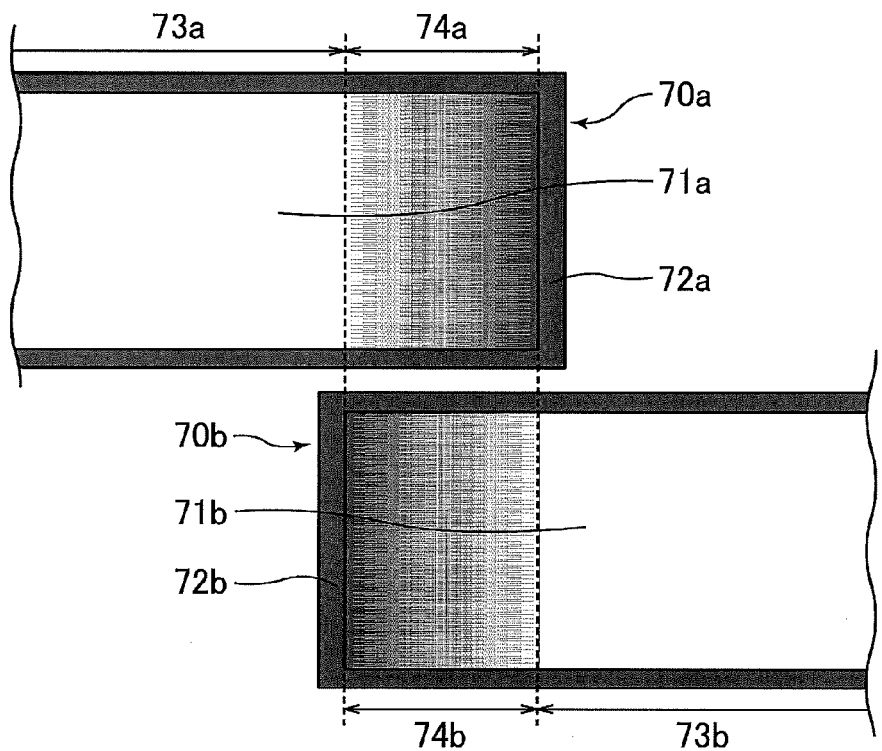
FIG. 37 is a plane view schematically illustrating a photo mask (illuminance adjustment plate) employed in Embodiment 7.

FIG. 37 is a plane view schematically illustrating a photo mask (illuminance adjustment plate) employed in Embodiment 7. The shapes of the sub regions 74a and 74b constituting both end parts of the light transmission parts 71a and 71b of photo masks 70a and 70b will be described in detail. In Embodiment 7, a semi-transmissive film capable of adjusting the light transmission amount is attached to a sub region of a photo mask. The difference of the transmittance between the main regions 73a and 73b and the sub regions 74a and 74b is adjusted by the difference of the lightness of the semi-transmissive film. In terms of the production cost and the difficulty of adjustment of the lightness variation, the semi-transmissive film is inferior to the means for adjustment with the widths of slits in Embodiments 1 to 4, but is advantageous since it makes patterning unnecessary and is easily manufactured by attaching the semi-transmissive film on a transparent substrate.

The transmittance in a sub region is gradually decreased toward the side opposed to a main region. However, the transmittance change in the sub region 74a of the light transmission part 71a of the photo mask 70a and the transmittance change in the sub region 74b of the light transmission part 71b of the photo mask 70b are respectively approximately the same. This makes it possible to average the irradiation amount of light applied through the respective sub regions 74a and 74b, and to hardly cause display unevenness.

Embodiment 8

Embodiment 8 is the same as Embodiment 1, except that at least two photo masks are simultaneously used to repeat the same process, not simultaneously using four photo masks as in Embodiment 1. In Embodiment 8, photo masks which are similar to those used in Embodiments 2 to 7 and their modified examples may be used.

Figure 38:
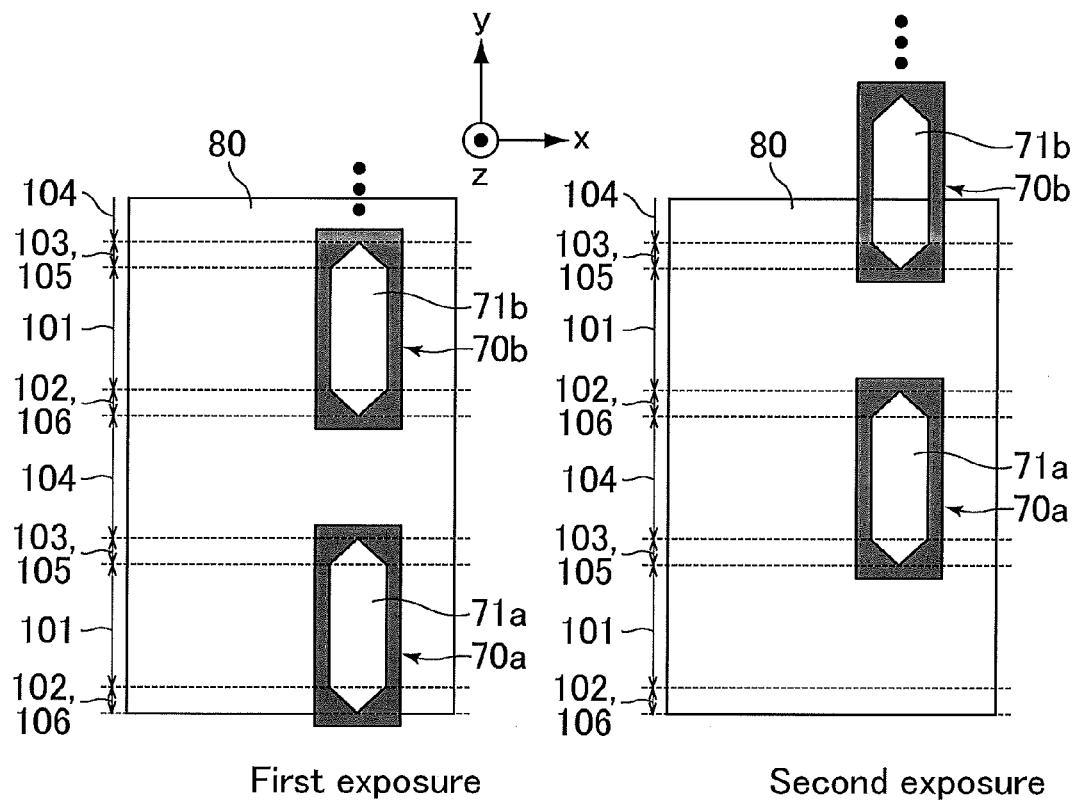
FIG. 38 is a plane view schematically illustrating a state of carrying out exposure to a TFT substrate surface in Embodiment 8.

FIG. 38 is a plane view schematically illustrating a state of carrying out exposure to a TFT substrate surface in Embodiment 8. As illustrated in FIG. 38, both shapes of the light transmission parts 71a and 71b of the photo masks 70a and 70b to be used for exposure are slits tapered in both ends. Masks are arranged in a manner such that the longitudinal directions of the light transmission parts 71a and 71b are coincident with the lengthwise direction of the scanning signal line, that is, perpendicular to the lengthwise direction of the data signal line. The photo masks 70a and 70b are arranged at an interval by the length equal to addition of each one main region and each one sub region of the light transmission parts 71a and 71b of the photo masks 70a and 70b in the +y axis direction.

As illustrated in FIG. 38, polarized ultraviolet rays are applied from one end to the other end of a region of the substrate 80 to which a photo-alignment film material is applied through the photomasks 70a and 70b while the substrate 80 is transferred at a constant speed in the +x axis direction (first exposure). As a result of the first exposure, exposure is carried out in a manner such that a first region 101 is exposed through the main region of the light transmission part of the first photo mask 70a, and a second region 102 and a third region 103 are exposed through the sub region of the light transmission part of the photo mask 70a. Consequently, the first region 101 exposed through the main region of the light transmission part of the second photo mask 70b, and the second region 102 and the third region 103 exposed through the sub region of the light transmission part of the photo mask 70b are formed.

On completion of the first exposure, the substrate 80 is transferred to the −x axis direction, and turned back to the position in front of the exposure stage (starting point). Then, each exposure head is transferred by the length of one exposure head in the +y axis direction; that is, by the length equal to addition of each one main region and each one sub region of the light transmission parts 71a and 71b of the photo masks 70a and 70b.

As illustrated in FIG. 38, in the same manner as in the first exposure, polarized ultraviolet rays are applied from one end to the other end of a region of the substrate 80 to which a photo-alignment film material is applied through the photo masks 70a and 70b while the substrate 80 is transferred at a constant speed in the +x axis direction (second exposure). At this time, the substrate 80 is transferred to the direction perpendicular to the longitudinal direction of the light transmission parts 71a and 71b of the photo masks 70a and 70b. As a result of the second exposure, a fourth region 104 exposed through the main region of the light transmission part 71a of the first photo mask 70a, and a fifth region 105 and a sixth region 106 exposed through the sub region of the light transmission part 71b of the photo mask 70b are formed. Further, the fourth region 104 exposed through the main region of the light transmission part 71b of the second photo mask 70b, and the fifth region 105 and the sixth region 106 exposed through the sub region of the light transmission part 71b of the photo mask 70b are formed.

By the first exposure and the second exposure, the regions exposed through the third region 103 and the fifth region 105 are overlapped with each other, and this overlapped region become a joining region. The regions exposed through the second region 102 and the sixth region 106 are also overlapped with each other, and this overlapped region become a joining region. The width of each of the joining regions is 20 mm or wider and 65 mm or narrower. As described above, the boundary in the joining regions can be made vague and occurrence of alignment unevenness can be suppressed by preparing two photo masks including a subregion tapered toward the terminal and carrying out exposure a plurality of times.

The above steps are carried out respectively for the mother glass substrate including TFT substrate configuration and the mother glass substrate including counter substrate configuration to complete the photo-alignment treatment for the respective substrates. In Embodiment 8, since two photo masks are used at one time, the exposure is efficient, and the photo-alignment treatment can be completed by two steps in a shortest manner.

Herein, the case of an exposure apparatus including one stage is described, but the exposure apparatus may include a plurality of stages. For example, in a case where it is necessary to repeat exposure two times, two stages in total may be given to the first exposure and the second exposure.

Embodiment 9

Embodiment 9 is the same as Embodiment 1, except that at least one photo mask is used to repeat the same process, not simultaneously using four photo masks as in Embodiment 1. In Embodiment 9, photo masks which are similar to those used in Embodiments 2 to 7 and their modified examples may be used.

Figure 39:
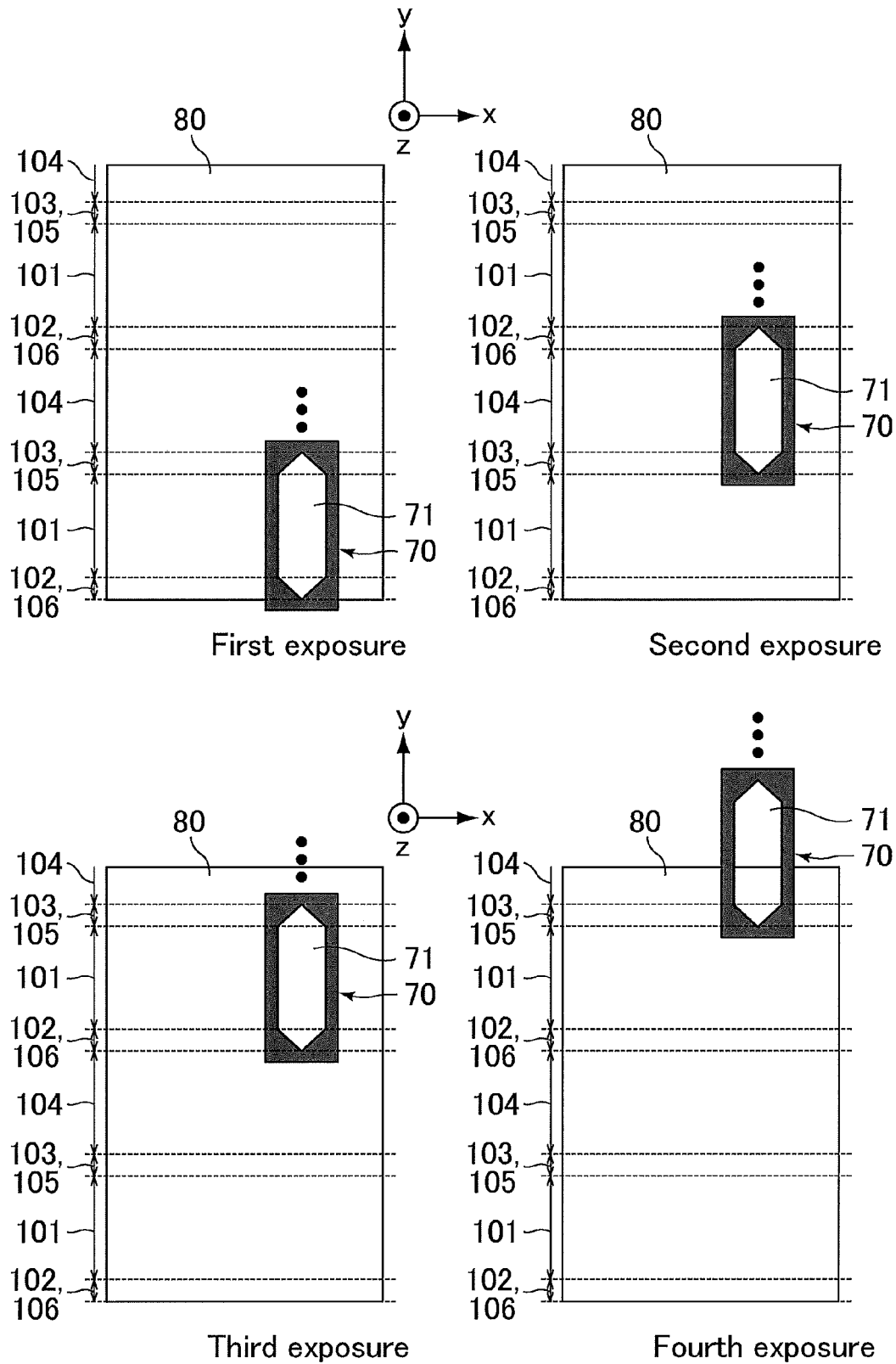
FIG. 39 is a plane view schematically illustrating a state of carrying out exposure to a TFT substrate surface in Embodiment 9.

FIG. 39 is a plane view schematically illustrating a state of carrying out exposure to a TFT substrate surface in Embodiment 9. As illustrated in FIG. 39, the shape of a light transmission part 71 of a photo mask 70 to be used for exposure is a slit tapered in both ends. A mask is arranged in a manner such that the longitudinal directions of the light transmission part is coincident with the lengthwise direction of the scanning signal line, that is, perpendicular to the lengthwise direction of the data signal line. The photo mask 70 is arranged at an interval by the length equal to addition of each one main region and each one sub region of the light transmission part of the photo mask 70 in the +y axis direction.

As illustrated in FIG. 39, polarized ultraviolet rays are applied from one end to the other end of a region of the substrate 80 to which a photo-alignment film material is applied through the photo mask 70 while the substrate 80 is transferred at a constant speed in the +x axis direction (first exposure). As a result of the first exposure, a first region 101 exposed through the main region of the light transmission part 71 of the photo mask 70, and a second region 102 and a third region 103 exposed through the sub region of the light transmission part 71 of the photo mask 70 are formed.

On completion of second exposure, the substrate 80 is transferred to the −x axis direction, and turned back to the position in front of the exposure stage (starting point). Then, each exposure head is transferred by the length of one exposure head in the +y axis direction; that is, by the length equal to addition of each one main region and each one sub region of the light transmission part 71 of the photo mask 70.

As illustrated in FIG. 39, in the same manner as in the first exposure, polarized ultraviolet rays are applied from one end to the other end of a region of the substrate 80 to which a photo-alignment film material is applied through the photo mask 70 while the substrate 80 is transferred at a constant speed in the +x axis direction (second exposure). At this time, the substrate 80 is transferred to the direction perpendicular to the longitudinal direction of the light transmission part 71 of the photo mask 70. As a result of the second exposure, a fourth region 104 exposed through the main region of the light transmission part 71 of the photo mask 70, and a fifth region 105 and a sixth region 106 exposed through the sub region of the light transmission part 71 of the photo mask 70 are formed.

By the first exposure and the second exposure, the regions exposed through the third region 103 and the fifth region 105 are overlapped with each other, and this overlapped region constitutes a joining region. The regions exposed through the second region 102 and the sixth region 106 are also overlapped with each other, and this overlapped region constitutes a joining region. The width of each of the joining regions is 20 mm or wider and 65 mm or narrower. As described above, the boundary in the joining regions can be made vague and occurrence of alignment unevenness can be suppressed by preparing two photo masks including a sub region tapered toward the terminal and carrying out exposure a plurality of times.

A third exposure and a fourth exposure are repeated in the same manner as in the first exposure and the second exposure to entirely expose the substrate 80, and thus the photo-alignment treatment in Embodiment 9 is completed.

The above steps are carried out respectively for the mother glass substrate including TFT substrate configuration and the mother glass substrate including counter substrate configuration to complete the photo-alignment treatment for the respective substrates. In Embodiment 9, one photo mask is used, and therefore an excellent effect can be exerted as in other embodiments in terms of suppression of occurrence of alignment unevenness in the joining region, although the working time is prolonged.

Herein, the case of an exposure apparatus including one stage is described, but the exposure apparatus may include a plurality of stages. For example, in a case where it is necessary to repeat exposure four times, four stages in total may be given to the first exposure, the second exposure, the third exposure, and the fourth exposure.

Hereinafter, the characteristics of a liquid crystal display device manufactured by the manufacturing methods of Embodiments 1 to 9 will be described in detail.

Figure 40:
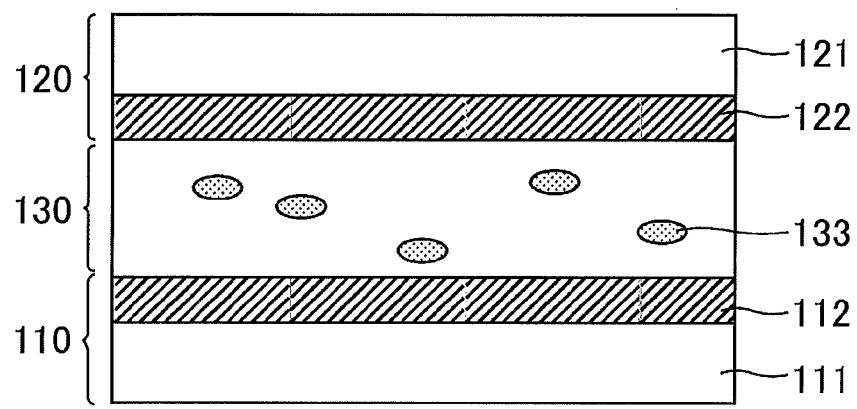
FIG. 40 is a cross-sectional view schematically illustrating a liquid crystal display device manufactured by the manufacturing method of Embodiments 1 to 9 and showing before a PS polymerization process.
Figure 41:
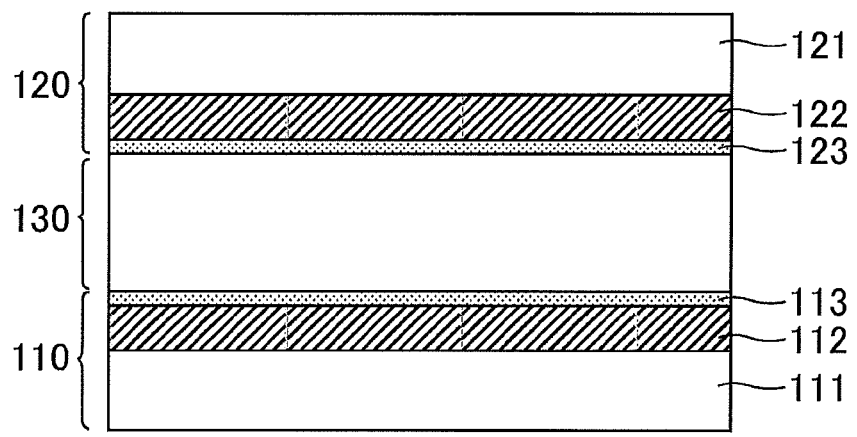
FIG. 41 is a cross-sectional view schematically illustrating a liquid crystal display device manufactured by the manufacturing method of Embodiments 1 to 9 and showing after a PS polymerization process.

FIG. 40 and FIG. 41 are cross-sectional views schematically illustrating a liquid crystal display device manufactured by the manufacturing method of Embodiments 1 to 9. FIG. 40 shows the liquid crystal display device before a PS polymerization process, and FIG. 41 shows the liquid crystal display device after a PS polymerization process. As illustrated in FIG. 40 and FIG. 41, the liquid crystal display device includes an array substrate 110, a color filter substrate 120, and a liquid crystal layer 130 that is interposed between a pair of substrates consisting of the array substrate 110 and the color filter substrate 120. The array substrate 110 includes an insulating transparent substrate 111 that is formed of glass or the like; and various kinds of wirings, pixel electrodes, TFTs, and the like that are formed on the transparent substrate 111. The color filter substrate 120 includes an insulating transparent substrate 121 that is formed of glass or the like; and color filters, black matrixes, and a common electrode that are formed on the transparent substrate 121. For example, in the IPS mode, an electrode is formed in only the array substrate 110. However, in the other modes, as necessary, an electrode is formed in both the array substrate 110 and the color filter substrate 120.

The array substrate 110 includes a horizontal alignment film 112 and the color filter substrate 120 also includes a horizontal alignment film 122. The horizontal alignment films 112 and 122 are films containing polyimide, polyamide, polyvinyl, polysiloxane, and the like as a main component. By providing the horizontal alignment films 112 and 122, liquid crystal molecules can be aligned in a certain direction. The horizontal alignment films 112 and 122 are formed of a photoactive material. For example, a material which includes a compound containing the above-described photoactive functional group may be used.

As illustrated in FIG. 40, before the PS polymerization process, there are polymerizable monomers 3 in the liquid crystal layer 130. Through the PS polymerization process, the polymerization of the polymerizable monomers 133 starts. As illustrated in FIG. 41, PS layers 113 and 123 are formed on the horizontal alignment films 112 and 122, and thus the stability of the alignment regulating force of the horizontal alignment films 112 and 122 is improved.

The PS layers 113 and 123 can be formed by injecting a liquid crystal composition containing a liquid crystal material and the polymerizable monomers into a gap between the array substrate 110 and the color filter substrate 120; and irradiating the liquid crystal layer 130 with a certain amount of light or applying heat thereto to polymerize the polymerizable monomers 133. At this time, by performing the polymerization in a state where no voltage is applied or in a state where a voltage lower than the threshold voltage is applied to the liquid crystal layer 130, the PS layers 113 and 123 capable of retaining the initial alignment of liquid crystal molecules are formed. Therefore, the PS layers 113 and 123 can be obtained with higher alignment stability. As necessary, a polymerization initiator may be added to the liquid crystal composition.

Examples of the polymerizable monomer 133 which can be used in Embodiments 1 to 9 include monomers which include a monofunctional or polyfunctional polymerizable group containing at least one kind of ring structure. Examples of such monomers include compounds represented by the following chemical formula (8).

[Chem. 8]

$$P^1\text{—}S_p^1\text{—}R^2\text{-}A^1\text{-}(Z\text{-}A^2)_n\text{-}R^1 \qquad (8)$$

(In the formula, $R^1$ represents a —$R^2$—$Sp^1$—$P^1$ group, a hydrogen atom, a halogen atom, a —CN group, an —$NO_2$ group, an —NCO group, an —NCS group, an —OCN group, an —SCN group, an —$SF_5$ group, or a linear or branched alkyl group having 1 to 12 carbon atoms;

$P^1$ represents a polymerizable group;

$Sp^1$ represents a linear, branched, or cyclic alkylene or alkyleneoxy group having 1 to 6 carbon atoms or a direct bond;

a hydrogen atom included in $R^1$ may be substituted with a fluorine atom or a chlorine atom;

as long as an oxygen atom and a sulfur atom are not adjacent to each other, a —$CH_2$— group included in $R^1$ may be substituted with an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—OCO— group, or an —OCO—CH=CH— group.

R$^2$ represents an —O— group, an —S— group, an —NH— group, a —CO— group, a —COO— group, an —COO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—OCO— group, an —OCO—CH=CH— group, or a direct bond;

A$^1$ and A$^2$ are the same as or different from each other and each independently represents a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

a —CH$_2$— group included in A$^1$ and A$^2$ may be substituted with an —O— group or an —S— group as long as they are not adjacent to each other;

a hydrogen atom included in A$^1$ and A$^2$ may be substituted with a fluorine atom, a chlorine atom, a —CN group, or an alkyl, alkoxy, alkylcarbonyl, alkoxycarbonyl, or alkylcarbonyloxy group having 1 to 6 carbon atoms;

each Z is the same or different from one another and represents an —O— group, an —S— group, an —NH— group, a —CO— group, a —COO— group, an —COO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—OCO— group, an —OCO—CH=CH— group, or a direct bond; and n represents 0, 1, or 2.)

More specific examples thereof include any of compound represented by the following chemical formulae (9-1) to (9-5).

[Chem. 9]

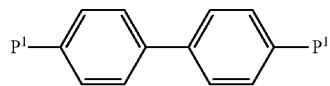
(9-1)

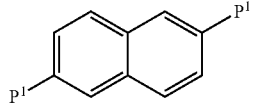
(9-2)

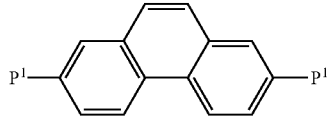
(9-3)

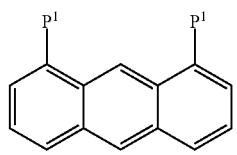
(9-4)

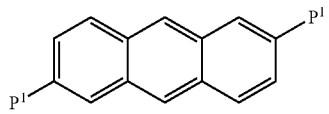
(9-5)

(In the formulae, each P$^1$ is the same as or different from one another and represents a polymerizable group; apart or all of hydrogen atoms included in a benzene ring may be substituted with a halogen atom or an alkyl or alkoxy group having 1 to 12 carbon atoms; and a part or all of hydrogen atoms included in the alkyl or alkoxy group having 1 to 12 carbon atoms may be substituted with a halogen atom.)

The monomers represented by the chemical formulae (9-1) to (9-5) are compounds which cause photocleavage to generate radicals when being irradiated with ultraviolet rays. Therefore, the polymerization can be performed without a polymerization initiator and thus deterioration in display quality such as image sticking, caused by a residual polymerization initiator after the PS process, can be prevented.

Examples of P$^1$ include an acryloyloxy group, a methacryloyloxy group, a vinyl group, a vinyloxy group, an acryloylamino group, and a methacryloylamino group.

Examples of other polymerizable monomers 133 which can be used in Embodiments 1 to 9 include any of compounds represented by the following chemical formulae (10-1) to (10-8).

[Chem. 10]

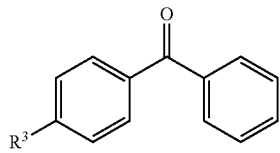
(10-1)

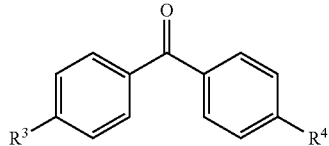
(10-2)

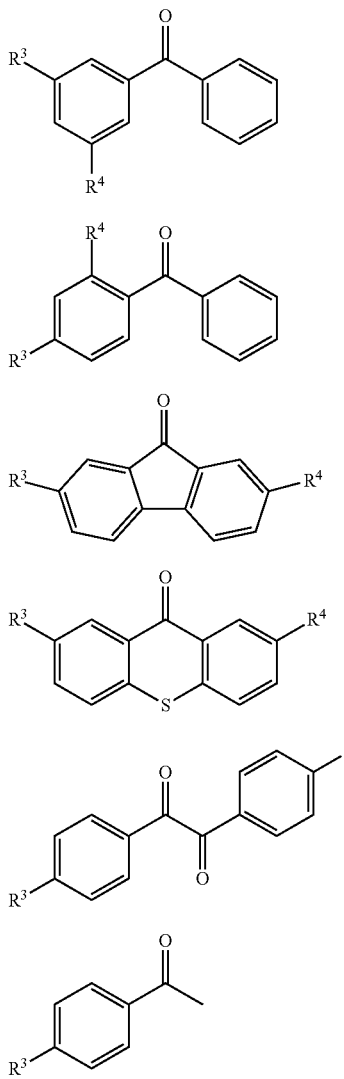

(In the formulae, R³ and R⁴ are the same as or different from each other and each independently represents an -Sp²-P² group, a hydrogen atom, a halogen atom, a —CN group, an —NO₂ group, an —NCO group, an —NCS group, an —OCN group, an —SCN group, an —SF₅ group, or a linear or branched alkyl, aralkyl, or phenyl group having 1 to 12 carbon atoms;

at least one of R³ and R⁴ includes an -Sp²-P² group;

P² represents a polymerizable group;

Sp² represents a linear, branched, or cyclic alkylene or alkyleneoxy group having 1 to 6 carbon atoms, or a direct bond;

when at least one of R³ and R⁴ represents a linear or branched alkyl, aralkyl, or phenyl group having 1 to 12 carbon atoms, a hydrogen atom included in at least one of R³ and R⁴ may be substituted with a fluorine atom, a chlorine atom, or an -Sp²-P² group;

as long as an oxygen atom, a sulfur atom, and a nitrogen atom are not adjacent to each other, a —CH₂— group included in R¹ and R² may be substituted with an —O— group, an —S— group, an —NH— group, a —CO— group, a —COO— group, an —COO— group, an —O—COO— group, an —OCH₂— group, a —CH₂O— group, an —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, an —SCF₂— group, an —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—OCO— group, or an —OCO—CH=CH— group;

a part or all of hydrogen atoms included in a benzene ring may be substituted with a halogen atom or an alkyl or alkoxy group having 1 to 12 carbon atoms; and apart or all of hydrogen atoms included in the alkyl or alkoxy group having 1 to 12 carbon atoms may be substituted with a halogen atom.)

Examples of P² include an acryloyloxy group, a methacryloyloxy group, a vinyl group, a vinyloxy group, an acryloylamino group, and a methacryloylamino group.

The monomers represented by the chemical formulae (10-1) to (10-8) are compounds in which hydrogen atoms are removed to generate radicals when being irradiated with visible light. Therefore, the polymerization can be performed without a polymerization initiator and thus deterioration in display quality such as image sticking, caused by a residual polymerization initiator after the PS process, can be prevented.

In the liquid crystal display device, the array substrate 110, the liquid crystal layer 130, and the color filter substrate 120 are laminated in the stated order from a back surface side to an observation surface side of the liquid crystal display device to form a liquid crystal cell. A polarizing plate is attached onto the back surface side of the array substrate 110 and the observation surface side of the color filter substrate 120. These polarizing plates may be provided with a retarder; and may be a circularly polarizing plate.

The liquid crystal display device may be any one of transmission type, reflection type, and transflective type devices. When the liquid crystal display device according to Embodiment 1 is a transmission type or transflective type device, a back light unit is further provided. The back light unit is arranged on the back surface side of the liquid crystal cell such that light passes through the array substrate 110, the liquid crystal layer 130, and the color filter substrate 120 in the stated order. When the liquid crystal display device is a reflection type or transflective type device, the array substrate 110 is provided with a reflector for reflecting outside light. In addition, at least in a region in which reflected light is used as display light, it is necessary that the polarizing plate on the color filter substrate 120 be a circularly polarized plate.

The liquid crystal display device may include a color filter on array configuration; that is, the array substrate 110 includes a color filter. The liquid crystal display device may also include a black matrix on array configuration; that is, the array substrate 110 includes a black matrix. The liquid crystal display device according to Embodiment 1 may be a monochrome display or a field sequential color display, and in this case, there is no need to arrange a color filter.

The liquid crystal layer 130 is filled with a liquid crystal material having the property of being aligned in a specific direction by applying a certain voltage thereto. The alignment of liquid crystal molecules in the liquid crystal layer 130 is controlled by the application of a threshold or higher voltage. Examples of the liquid crystal molecules include liquid crystal molecules including, as a core portion, a structure in which two ring structures of at least one kind selected from a benzene ring, cyclohexylene, and cyclohexene are linked to a para position by a direct bond or a linking group; and a structure in which at least one kind selected from a hydrocarbon group having 1 to 30 carbon atoms and a cyano group is bonded to both sides (para position) of the core portion. The core portion may include a substituent and may include an unsaturated bond.

The liquid crystal material filled into the liquid crystal layer is preferable to include liquid crystal molecules containing at least one molecular structure selected from a group consisting of the following chemical formulae (11-1) to (11-6). Among these, a molecular structure represented by the following chemical formula (11-4) is particularly preferable.

[Chem. 11]

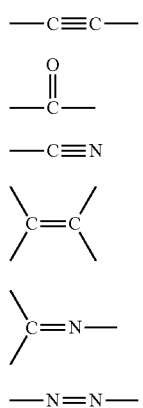

(11-1)
(11-2)
(11-3)
(11-4)
(11-5)
(11-6)

More specifically, the liquid crystal material is preferable to contain at least one liquid crystal molecule selected from a group consisting of the following chemical formulae (12) to (16).

[Chem. 12]

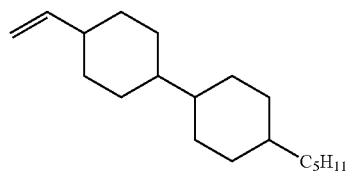

(12)

[Chem. 13]

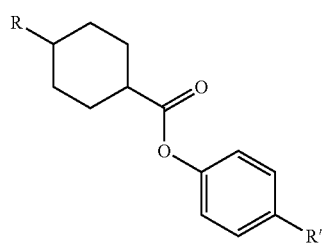

(13)

[Chem. 14]

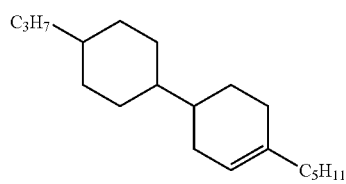

(14)

[Chem. 15]

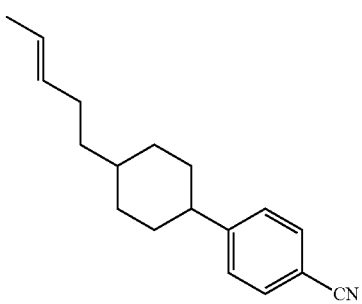

(15)

[Chem. 16]

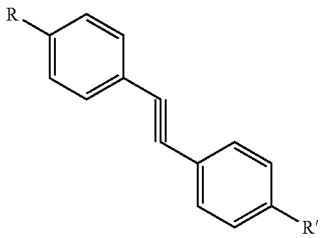

(16)

In the formulae (13) and (16), R and R' are the same as or different from each other and each independently represents a hydrocarbon group having 1 to 30 carbon atoms. The hydrocarbon group may include a substituent and may include an unsaturated bond.

Components of the alignment films, components of monomers included in the PS layers, and the like can be analyzed by decomposing the liquid crystal display device and chemically analyzing the respective components using gas chromatograph mass spectrometry (GC-MS) and time-of-fright secondary ion mass spectrometry (TOF-SIMS). In addition, the cross-sectional shape of a liquid crystal cell including the alignment films and the PS layers can be confirmed by microscopic observation using a scanning transmission electron microscope (STEM), a scanning electron microscope (SEM) or the like.

Hereinafter, an example of actually preparing a liquid crystal cell by the manufacturing method according to Embodiment 1 will be described.

EXAMPLE 1

Figure 42:
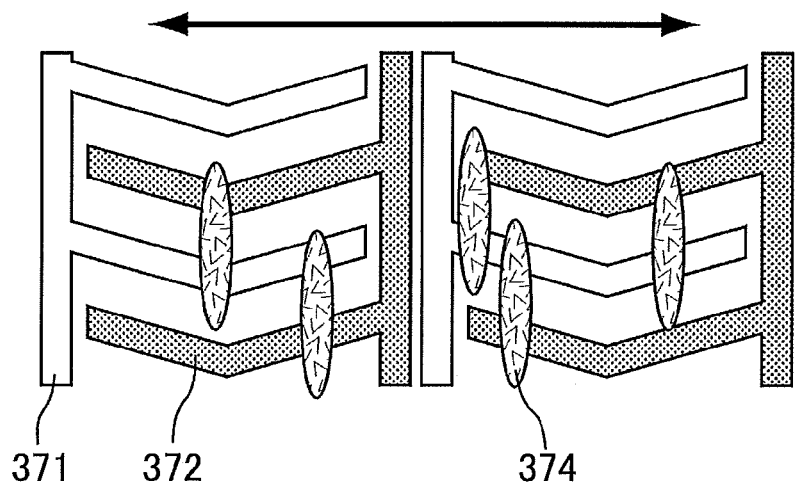
FIG. 42 is a plane view schematically illustrating an IPS substrate of Examples 1 to 4, 6, and 7.

Example 1 is a preparation example of a liquid crystal cell of the IPS mode. An IPS substrate including a pair of comb-teeth electrodes which are transparent electrodes (pixel electrode and common electrode) and TFT; and a bare glass substrate (counter substrate) were prepared. A polyvinyl cinnamate solution which was a material of a horizontal alignment film was applied on the respective substrates by a spin coating method. FIG. 42 is a plane view schematically illustrating an IPS substrate of Example 1. As the glass, #1737 (manufactured by Corning Inc.) was used. In the comb-teeth electrodes, as illustrated in FIG. 42, a pixel electrode 371 and a common electrode 372 extend substantially parallel to each other and are respectively formed in a zigzag shape. As a result, since the electric field vector during electric field application is substantially perpendicular to a lengthwise direction of the electrodes, a multidomain structure is formed and thus superior viewing angle characteristics can be obtained. A double-headed arrow in FIG. 42 indicates an irradiation polarization direction (in a case where negative type liquid crystal molecules are used). As a material of the comb-teeth electrodes, IZO was used. In addition, the width L of the comb-teeth electrodes was 3 µm, and the distance S between the electrodes was 9 µm. The polyvinyl cinnamate solution was prepared by dissolving 3% by weight of polyvinyl cinnamate with respect to the total weight in a solvent obtained by mixing the same amount of N-methyl-2-pyrollidone and ethylene glycol monobutyl ether.

After application by a spin coating method, provisional drying was performed at 90° C. for 1 minute, followed by baking at 200° C. for 60 minutes while purging nitrogen gas. The thickness of the alignment films after baking was 100 nm.

Next, as an alignment treatment, the surface of each substrate was irradiated with polarized ultraviolet rays having a wavelength of 313 nm and an intensity of 5 J/cm$^2$ from the normal direction of each substrate by using the method in Embodiment 3 (successive exposure). The width of the joining region was set to about 45 mm. At this time, an angle formed between the lengthwise direction of the comb-teeth electrodes and the polarization direction was set to ±15°. As a result, liquid crystal molecules 74 were aligned in a direction substantially perpendicular to the polarization direction of polarized ultraviolet rays during voltage non-application; and were aligned in a direction substantially perpendicular to the lengthwise direction of the comb-teeth electrodes during the application of a threshold or higher voltage.

Next a thermosetting seal material (HC 1413EP: manufactured by Mitsui Chemicals, Inc.) was printed on the IPS substrate using a screen plate. Furthermore, in order to obtain the liquid crystal layer having a thickness of 3.5 µm, beads (SP-2035, manufactured by Sekisui Chemical Co., Ltd.) having a diameter of 3.5 µm were dispersed on the counter substrate. These two kinds of substrates were aligned such that the polarization directions of ultraviolet rays irradiating the respective substrates match with each other, and then were bonded.

Next, the bonded substrates were heated at 200° C. for 60 minutes in a furnace in which nitrogen gas was purged while applying a pressure of 0.5 kgf/cm$^2$ thereto, and thereby the seal material was cured.

A liquid crystal composition containing a liquid crystal material and a monomer was injected into a cell prepared with the above-described method under vacuum. As the liquid crystal material, a negative type liquid crystal which includes liquid crystal molecules containing a multiple bond other than a benzene ring was used. As the monomer, biphenyl-4,4'-diylbis(2-methyl acrylate) was used. The amount of biphenyl-4,4'-diylbis(2-methyl acrylate) added is 1% by weight with respect to the total weight of the entire liquid crystal composition.

An inlet of a cell through which the liquid crystal composition was injected was blocked with an ultraviolet ray-curable resin (TB3026E, manufactured by ThreeBond Co., Ltd.) and was sealed by ultraviolet ray irradiation. The wavelength of ultraviolet rays applied for sealing was 365 nm, and light was blocked in pixel portions so as to remove the influence of ultraviolet rays as much as possible. At this time, electrodes were short-circuited and the charge of a surface of the glass substrate was eliminated such that the alignment of liquid crystal was not disordered by outside electric field.

Next, in order to remove the flow alignment of liquid crystal molecules, a realignment treatment of heating the liquid crystal cell at 130° C. for 40 minutes to make the liquid crystal molecules have isotropic phase was performed. As a result, a liquid crystal cell was obtained in which liquid crystal molecules were uniaxially aligned in the plane of the substrates in a direction perpendicular to the polarization direction of ultraviolet rays irradiating the alignment films.

Next, in order to subject this liquid crystal cell to the PS process, the liquid crystal cell was irradiated with ultraviolet rays having an intensity of 2 J/cm$^2$ using a black light unit (FHF32BLB, manufactured by TOSHIBA Corporation). As a result, biphenyl-4,4'-diylbis(2-methyl acrylate) was polymerized.

The reaction systems (pathways of generating acrylate radicals) of the PS process in Example 1 are as follows.
(Reaction System 1)

First, as illustrated in the following chemical reaction formula (18), a biphenyl bifunctional methacrylate monomer (biphenyl-4,4'-diylbis(2-methyl acrylate); compound represented by the following chemical formula (17), hereinafter abbreviated as "M") is excited by ultraviolet ray irradiation to form radicals (hereinafter, the excitation state will be indicated by the symbol *). That is, the monomer used in Example 1 is a monomer having function of a polymerization initiator for spontaneously starting polymerization without a polymerization initiator.

[Chem. 17]

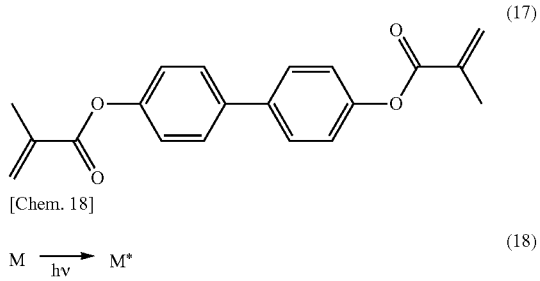

(17)

[Chem. 18]

(18)

(Reaction System 2)

On the other hand, as illustrated in the following chemical reaction formula (20), polyvinyl cinnamate (compound represented by the following chemical formula (19); hereinafter, abbreviated as "PVC") which is the photo-alignment film material is also excited by ultraviolet ray irradiation.

[Chem. 19]

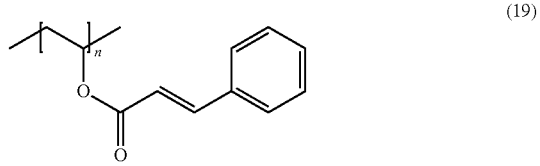

(19)

(n represents a natural number.)

[Chem. 20]

$$PVC \xrightarrow{hv} PVC^*$$ (20)

In addition, as illustrated in the following chemical reaction formula (21), biphenyl-4,4'-diylbis(2-methyl acrylate) which is the monomer is excited to form radicals by the energy transfer from excited polyvinyl cinnamate.

[Chem. 21]

$$M + PVC^* \rightarrow M^* + PVC \qquad (21)$$

The reason why the reactivity of the PS process is improved is considered to be as follows. In the process of polymerizing biphenyl-4,4'-diylbis(2-methyl acrylate) which is the monomer with ultraviolet rays, it is considered that an intermediate such as a radical serves an important function. The intermediate is generated by ultraviolet rays, but the amount of the monomer in the liquid crystal composition is only 1% by weight. Therefore, sufficient polymerization efficiency is not obtained only with the pathway of the chemical reaction formula (18). When the PS process is performed only with the pathway of the chemical reaction formula (18), it is necessary that excited monomer intermediates be adjacent to each other in the liquid crystal bulk and thus the polymerization efficiency is low. In addition, since it is necessary that the monomer intermediates in which polymerization has already started move to the vicinity of the alignment films after the polymerization, the rate of the PS process is slow. In this case, it is considered that the rate of the PS process highly depends on the temperature and the diffusion coefficient.

However, when the photo-alignment films are present, as illustrated in the chemical reaction formulae (20) and (21), the photo-alignment films contain a large amount of double bonds as a photofunctional group such as polyvinyl cinnamate in the present example. Therefore, it is considered that the photofunctional groups are easily excited by ultraviolet rays and the excitation energy is transferred to the monomer in liquid crystal. Furthermore, since this energy transfer occurs in the vicinity of the alignment films, the existence probability of the monomer intermediates in the vicinity of the alignment films is significantly increased, thereby remarkably increasing the polymerization probability and the rate of the PS process. Therefore, in this case, it is considered that the rate of the PS process is difficult to depend on the temperature and the diffusion coefficient.

In addition, in the photo-alignment films, electrons at a photoactive unit are excited by light irradiation. In addition, when the photo-alignment films are horizontal alignment films, the photoactive unit directly interacts with the liquid crystal layer to align liquid crystal. Therefore, the intermolecular distance between a photoactive unit and polymerizable monomers is shorter than that of a vertical alignment film and thus the probability of the transfer of excitation energy is significantly increased. When the photo-alignment films are a vertical alignment film, there is inevitably a hydrophobic group between a photoactive unit and polymerizable monomers. Therefore, the intermolecular distance is increased and the energy transfer is difficult to occur. Therefore, the PS process is particularly preferable for a horizontal alignment film.

When observed by using a polarizing microscope, liquid crystal molecules in a photo-aligned IPS cell (liquid crystal cell of Example 1), which was prepared with the above-described method and was subjected to the PS process, were uniaxially aligned in a favorable manner as was before the PS process. Furthermore, when liquid crystal was made to respond by applying a threshold or higher electric field thereto, the liquid crystal was aligned along zigzag-shaped comb-teeth electrodes and superior viewing angle characteristics were obtained by a multidomain structure.

Next, the liquid crystal cell of Example 1 was evaluated for image sticking. An evaluation method for image sticking is as follows. The liquid crystal cell of Example 1 was divided into regions X and Y to which two different voltages can be applied. A square wave voltage of 6 V and 30 Hz was applied to the region X and no voltage was applied to the region Y for 48 hours. Next, a square wave voltage of 2.4 V and 30 Hz was applied to the regions X and Y, respectively. Then, the luminance T(x) of the region X and the luminance T(y) of the region Y were measured, respectively. In order to measure the luminance, a digital camera (EOS Kiss Digital N EF-S18-55IIU, manufactured by Canon Inc.) was used. A value ΔT(x, y) (%) which is the index of image sticking was calculated according to the following expression.

$$\Delta T(x,y) = (|T(x) - T(y)|/T(y)) \times 100$$

As a result of the calculation, the image sticking ratio ΔT of the liquid crystal cell of Example 1 was only 24%.

As seen from Example 1, severe image sticking caused by a material of a photo-alignment film can be significantly reduced by performing the PS process without deterioration in alignment capability. Since image sticking is significantly reduced, the irradiation amount (time) of ultraviolet rays can be reduced in the PS process. When a liquid crystal panel is manufactured, the irradiation amount (time) of ultraviolet rays is reduced and thus the throughput is increased. In addition, the size of an ultraviolet ray irradiation device can be reduced, which leads to a reduction in investment value.

Reference Example 1

An IPS liquid crystal cell of Reference Example 1 was produced in the same manner as in Example 1, except that the monomer was not added to the liquid crystal composition; and the liquid crystal layer was not irradiated with ultraviolet rays using a black light unit.

As a result, the image sticking ratio was 800% or greater, and severe image sticking occurred.

That is, the only difference between the IPS liquid crystal cell of Reference Example 1 and the IPS liquid crystal cell of Example 1 was whether the PS process was performed or not. Image sticking occurs due to the interaction between liquid crystal molecules and photo-alignment film molecules. However, by forming the PS layer on the origin thereof as a buffer layer, image sticking can be prevented. It should be noted that image sticking caused by the photo-alignment film can be significantly suppressed while liquid crystal molecules can be aligned by the alignment capability of the photo-alignment film originating from the PS layer which is not subjected to an alignment treatment.

Reference Example 2

In Reference Example 2, a positive type liquid crystal of 4-cyano-4'-pentylbiphenyl including a triple bond was used as a liquid crystal material; and the monomer was not added to the liquid crystal composition. In addition, as a photo-alignment treatment, an angle formed between the lengthwise direction of the comb-teeth electrodes and the polarization direction of polarized ultraviolet rays was set to ±75°; and a black light unit was not used for the ultraviolet ray irradiation. Except for the above-described points, an IPS liquid crystal cell of Reference Example 2 was prepared in the same manner as in Example 1.

As a result, the image sticking ratio was 800% or greater, and severe image sticking occurred.

EXAMPLE 2

FIG. 42 is also a plane view schematically illustrating an IPS substrate of Example 2. An IPS liquid crystal cell of Example 2 was produced in the same manner as in Reference Example 2, except that 1% by weight of biphenyl-4,4'diylbis (2-methyl acrylate), as the monomer, with respect to the total weight of the entire liquid crystal composition was added to the positive type liquid crystal of 4-cyano-4'-pentylbiphenyl. When observed by using a polarizing microscope, liquid crystal molecules were uniaxially aligned in a favorable manner. Furthermore, when liquid crystal was made to respond by applying a threshold or higher electric field thereto, the liquid crystal was aligned along zigzag-shaped comb-teeth electrodes and superior viewing angle characteristics were obtained by a multidomain structure. In addition, the image sticking ratio was 11% when measured with the same manner as in Reference Example 2, and a significant improvement effect was obtained.

The reaction systems (pathways of generating acrylate radicals) of the PS process in Example 2 are as follows.
(Reaction System 1)

First, as illustrated in the following chemical reaction formula (22), biphenyl-4,4'-diylbis(2-methyl acrylate) which is the monomer is excited by ultraviolet ray irradiation to form radicals.

[Chem. 22]

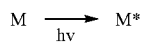
(22)

(Reaction System 2)

On the other hand, as illustrated in the following chemical reaction formula (23), polyvinyl cinnamate which is the photo-alignment film material is also excited by ultraviolet ray irradiation.

[Chem. 23]

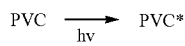
(23)

In addition, as illustrated in the following chemical reaction formula (24), biphenyl-4,4'-diylbis(2-methyl acrylate) which is the monomer is excited to form radicals by the energy transfer from excited polyvinyl cinnamate.
[Chem. 24]

M+PVC*→M*+PVC (24)

(Reaction System 3)

On the other hand, as illustrated in the following chemical reaction formula (26), 4-cyano-4'-pentylbiphenyl (compound represented by the following chemical formula (25); hereinafter, abbreviated as "CB") which is the liquid crystal material including a triple bond in the molecules is also excited by ultraviolet ray irradiation.

[Chem. 25]

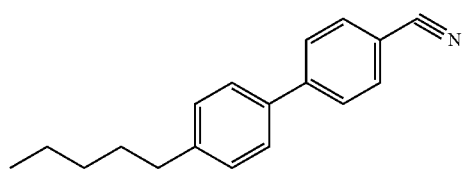
(25)

[Chem. 26]

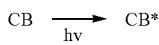
(26)

As illustrated in the following chemical reaction formula (27), biphenyl-4,4'-diylbis(2-methyl acrylate) which is the monomer is excited to form radicals by the energy transfer from excited 4-cyano-4'-pentylbiphenyl.
[Chem. 27]

M+CB*→M*+CB (27)

(Reaction System 4)

On the other hand, as illustrated in the following chemical reaction formula (28), polyvinyl cinnamate which is the photo-alignment film material is also excited by ultraviolet ray irradiation.

[Chem. 28]

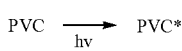
(28)

In addition, as illustrated in the following chemical reaction formula (29), a pathway is considered in which 4-cyano-4'-pentylbiphenyl which is the liquid crystal material including a triple bond in the molecules is excited by the energy transfer from excited polyvinyl cinnamate.
[Chem. 29]

CB+PVC*→CB*+PVC (29)

The difference between Example 2 and Example 1 is that the positive type liquid crystal of 4-cyano-4'-pentylbiphenyl was used as the liquid crystal material. When Example 1 and Example 2 are compared to each other, a higher improvement effect was obtained in Example 2. The reason is considered to be that the cyano group in the liquid crystal molecules contains a triple bond. A double bond of a benzene ring not containing a substituent does not contribute to the reaction. Therefore, it can be concluded that the triple bond of the cyano group serves an important function.

In this way, when liquid crystal molecules include a multiple bond, image sticking is reduced by the PS process. The reason is considered to be as follows. As illustrated in the chemical reaction formulae (20) and (21), the excited monomer intermediates of Example 1 are generated by the energy transfer from ultraviolet rays and the photo-alignment films. However, since 4-cyano-4'-pentylbiphenyl contains the triple bond of the cyano group in the molecules, the liquid crystal molecules are excited by radicals and the like. In addition, it is considered that the PS process is promoted through, for example, pathways illustrated in the chemical reaction formulae (26) and (27) as well as the reaction systems illustrated in the chemical reaction formulae (20) and (21). Furthermore, as illustrated in the chemical reaction formulae (28) and (29), a pathway is also considered in which the energy is transferred from the excited photo-alignment films to liquid crystal molecules and thus the liquid crystal molecules are excited. That is, since the monomer is excited through more pathways than that of Example 1, the PS process is further promoted.

EXAMPLE 3

FIG. 42 is also a plane view schematically illustrating an IPS substrate of Example 3. A cell was prepared in the same manner as in Example 2, except that 37% by weight of liquid crystalline molecules of trans-4-propyl-4'-vinyl-1,1'-bicyclohexane with respect to the total weight of the entire liquid crystal composition; and 1% by weight of biphenyl-4,4'-diylbis(2-methyl acrylate), as the monomer, with respect to the total weight of the entire liquid crystal composition were added to 4-cyano-4'-pentylbiphenyl which was the positive type liquid crystal material. That is, in the present example, as a liquid crystal component in the liquid crystal composition, mixed liquid crystal was used. When observed by using a polarizing microscope, liquid crystal molecules were uniaxially aligned in a favorable manner. Furthermore, when liquid crystal was made to respond by applying a threshold or higher electric field thereto, the liquid crystal was aligned along zigzag-shaped comb-teeth electrodes and superior viewing angle characteristics were obtained by a multidomain structure. In addition, the image sticking ratio was only 3% when measured in the same manner as in Example 2. Therefore, according to Example 3, it was found that image sticking was further reduced compared to Example 2.

The reaction systems (pathways of generating acrylate radicals) of the PS process in Example 3 are as follows.

First, as illustrated in the following chemical reaction formula (31), trans-4-propyl-4'-vinyl-1,1'-bicyclohexane (compound represented by the following chemical formula (30); hereinafter, referred to as "CC") which is the liquid crystal material is excited by ultraviolet ray irradiation.

[Chem. 30]

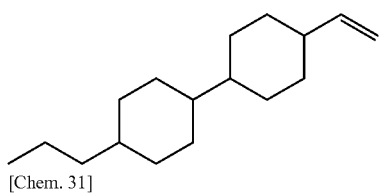

(30)

[Chem. 31]

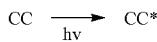

(31)

In addition, as illustrated in the following chemical reaction formula (32), biphenyl-4,4'-diylbis(2-methyl acrylate) which is the monomer is excited to form radicals by the energy transfer from excited trans-4-propyl-4'-vinyl-1,1'-bicyclohexane.
[Chem. 32]

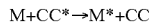 (32)

As illustrated in the chemical reaction formulae (31) and (32), when liquid crystal molecules including a multiple bond are used, image sticking is significantly reduced by the PS process. In particular, when liquid crystal molecules including a double bond are used, the effect thereof is high. That is, trans-4-propyl-4'-vinyl-1,1'-bicyclohexane has higher efficiency of excitation using ultraviolet rays; and higher efficiency of energy transfer with the photo-alignment films or liquid crystal molecules than those of 4-cyano-4'-pentylbiphenyl used in Examples 1 to 3. The difference in reactivity between two kinds of molecules is caused by whether the molecules include a triple bond of a cyano group or an alkenyl group. In the other words, a double bond has higher reaction efficiency than that of a triple bond.

EXAMPLE 4

FIG. 42 is also a plane view schematically illustrating an IPS substrate of Example 4. An IPS liquid crystal cell was prepared in the same manner as in Example 3, except that the time of the irradiation from a black light unit was set to be ⅙ that of Example 3; and the irradiation intensity was set to 350 mJ/cm². When observed by using a polarizing microscope, liquid crystal molecules were uniaxially aligned in a favorable manner. Furthermore, when liquid crystal was made to respond by applying a threshold or higher electric field thereto, the liquid crystal was aligned along zigzag-shaped comb-teeth electrodes and superior viewing angle characteristics were obtained by a multidomain structure. In addition, the image sticking ratio was only 8% when measured in the same manner as in Example 2. Therefore, it was found that a sufficient image sticking prevention effect can be obtained even when the energy and time of ultraviolet ray irradiation are reduced in the PS process.

When Examples 1 to 4 described above are investigated, common advantageous effects of these examples are as follows.

In an actual usage configuration, in the case visible light is exposed (for example, a liquid crystal TV), visible light should be avoided as light used for an alignment treatment of a photo-alignment film. However, in Examples 1 to 4, by performing the PS process, the surfaces of the alignment films are covered with the PS layers and the alignment is immobilized. Therefore, there is an advantageous effect in that a material of which the sensitivity wavelength includes a visible light wavelength range may be used as the material of the photo-alignment films.

In addition, when the sensitivity wavelength of the material of the photo-alignment films includes an ultraviolet ray wavelength range, it is necessary that an ultraviolet ray absorption layer be provided in order to cut weak ultraviolet rays emitted from a back light unit and the surrounding environment. In consideration of this point, there is an advantageous effect in that, by performing the PS process, it is not necessary that an ultraviolet ray absorption layer be provided.

In addition, when the PS process is performed using ultraviolet rays, there is a possibility that the voltage holding ratio (VHR) may deteriorate by liquid crystal being irradiated with ultraviolet rays. By efficiently performing the PS process as in the case of Examples 1 to 4, the ultraviolet ray irradiation time can be reduced and thus deterioration in voltage holding ratio can be avoided.

Furthermore, since image sticking is significantly reduced, the irradiation amount (time) for the PS process can also be reduced. When a liquid crystal panel is manufactured, the irradiation amount (time) is reduced and thus the throughput is increased. In addition, the size of an ultraviolet ray irradiation device can be reduced, which leads to a reduction in investment value.

EXAMPLE 5

Figure 43:
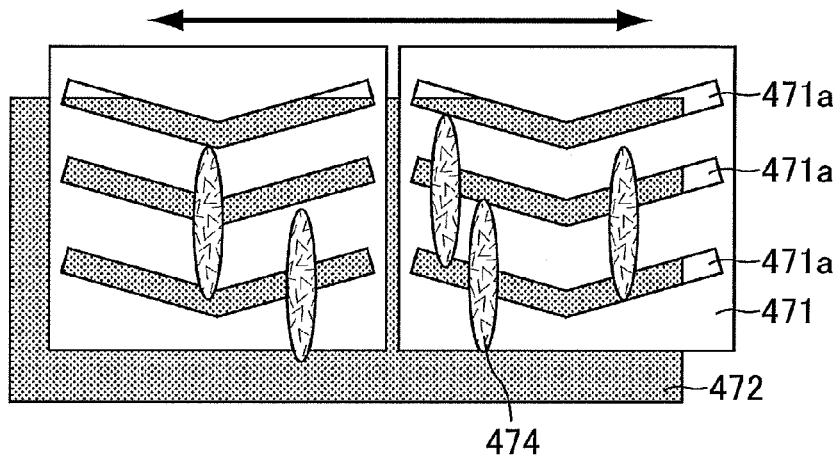
FIG. 43 is a plane view schematically illustrating an FFS substrate of Example 5.

Example 5 is a preparation example of a liquid crystal cell of the FFS mode. FIG. 43 is a plane view schematically illustrating an FFS substrate of Example 5. An FFS substrate including TFT, a slit-provided electrode (pixel electrode) 471 and a plate-like plate electrode (common electrode) 472; and a counter substrate including a color filter were prepared. A polyvinyl cinnamate solution which was a material of a horizontal alignment film was applied on the respective substrates by a spin coating method. As the glass, #1737 (manufactured by Corning Inc.) was used. As a material for the slit-provided electrode 471, ITO was used. The shape of the slit-provided electrode 471 was a V shape, the width L of slit 471a was 5 μm, and the distance S of slits 471a was 5 μm. The polyvinyl cinnamate solution was prepared by dissolving 3% by weight of polyvinyl cinnamate with respect to the total weight in a solvent obtained by mixing the same amount of N-methyl-2-pyrollidone and ethylene glycol monobutyl ether.

After application by a spin coating method, provisional drying was performed at 90° C. for 1 minute, followed by baking at 200° C. for 60 minutes while purging nitrogen gas. The thickness of the alignment films after baking was 100 nm.

Next, as an alignment treatment, the surface of each substrate was irradiated with polarized ultraviolet rays having a wavelength of 313 nm and an intensity of 100 J/cm$^2$ from the normal direction of each substrate by using the method in Embodiment 3 (successive exposure). The width of the joining region was set to about 45 mm. At this time, an angle formed between the lengthwise direction of the slits and the polarization direction was set to ±7°. As a result, liquid crystal molecules 474 were aligned in a direction substantially perpendicular to the polarization direction of polarized ultraviolet rays during voltage non-application; and were aligned in a direction substantially perpendicular to the lengthwise direction of the slits 471a of the slit-provided electrode 471 during the application of a threshold or higher voltage.

Next, a thermosetting seal material (HC1413EP, manufactured by Mitsui Chemicals, Inc.) was printed on the FFS substrate using a screen plate. Furthermore, in order to obtain the liquid crystal layer having a thickness of 3.5 μm, beads (SP-2035, manufactured by Sekisui Chemical Co., Ltd.) having a diameter of 3.5 μm were dispersed on the counter substrate. These two kinds of substrates were aligned such that the polarization directions of ultraviolet rays irradiating the respective substrates match with each other, and then were bonded.

Next, the bonded substrates were heated at 200° C. for 60 minutes in a furnace in which nitrogen gas is purged while applying a pressure of 0.5 kgf/cm$^2$ thereto, and thereby the seal material was cured.

A liquid crystal composition containing a liquid crystal material and a monomer was injected into a cell prepared with the above-described method under vacuum. In order to obtain the liquid crystal composition, 37% by weight of trans-4-propyl-4'-vinyl-1,1'-bicyclohexane with respect to the total weight of the entire liquid crystal composition; and 0.5% by weight of biphenyl-4,4'diylbis(2-methyl acrylate), as the monomer, with respect to the total weight of the entire liquid crystal composition were added to 4-cyano-4'-pentylbiphenyl which was the positive type liquid crystal material. That is, in the present example, as a liquid crystal component in the liquid crystal composition, mixed liquid crystal was used.

More specifically, as illustrated in the following chemical reaction formula (33-1) or (33-2), biphenyl-4,4'-diylbis(4-methyl acrylate) which is the monomer is excited to form radicals by irradiation with ultraviolet rays. That is, the monomer used in Example 5 is a monomer having function of a polymerization initiator to spontaneously start polymerization without a polymerization initiator.

[Chem. 33]

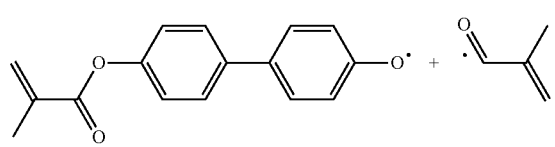

(33-1)

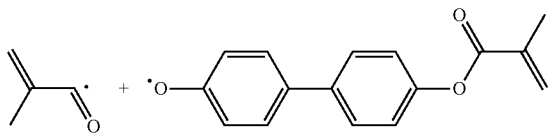

(33-2)

An inlet of a cell through which the liquid crystal composition was injected was blocked with an ultraviolet ray-curable resin (TB3026E, manufactured by ThreeBond Co., Ltd.) and was sealed by ultraviolet ray irradiation. The wavelength of ultraviolet rays applied for sealing was 365 nm, and light was blocked in pixel portions so as to remove the influence of ultraviolet rays as much as possible. At this time, electrodes were short-circuited and the charge of a surface of the glass substrate was eliminated such that the alignment of liquid crystal was not disordered by outside electric field.

Next, in order to remove the flow alignment of liquid crystal molecules, a realignment treatment of heating the liquid crystal panel at 130° C. for 40 minutes to make the liquid crystal molecules have isotropic phase was performed. As a result, a liquid crystal cell was obtained in which liquid crystal molecules were uniaxially aligned in the plane of the substrates in a direction perpendicular to the polarization direction of ultraviolet rays irradiating the alignment films.

Next, in order to subject this liquid crystal cell to the PS process, the liquid crystal cell was irradiated with ultraviolet rays having an intensity of 2 J/cm$^2$ using a black light unit (FHF32BLB, manufactured by TOSHIBA Corporation). As a result, biphenyl-4,4'-diylbis(2-methyl acrylate) was polymerized.

When a panel was manufactured using the liquid crystal cell of Example 5, alignment stability, particularly image sticking property could be improved without increasing driving voltage, lowering the contrast, and considerably lowering the voltage holding ratio.

EXAMPLE 6

FIG. 42 is also a plane view schematically illustrating an IPS substrate of Example 6. Example 6 is a preparation example of a liquid crystal cell of the IPS mode. An IPS substrate including a pair of ITO comb-teeth electrodes (pixel electrode and common electrode) and TFT; and a counter substrate were prepared, and a polyvinyl solution containing a cinnamate group as a photoreactive functional group, which was a material of an alignment film, was applied on the respective substrates by a spin coating method. As the photoreactive functional group, a chalcone group, a coumarin group, a stilbene group, and the like can be used other than this. Further, as the polymer to be a main chain, in addition to this, a partially or completely imidized polyimide or a polysiloxane can be used. As the glass substrate, #1737 (manufactured by Corning Inc.) was used. Subsequently, the respective substrates were left in condition of 90° C. for 1 minute to provisionally drying the applied solution. Next, the provisionally dried film was baked by leaving the respective substrates in condition of 200° C. for 40 minutes in a nitrogen atmosphere.

Next, as an alignment treatment, the surface of each substrate was irradiated with polarized ultraviolet rays (p polarized light) having a wavelength of 313 nm and an intensity of 100 J/cm² from the normal direction of each substrate by using the method in Embodiment 3 (successive exposure). The width of the joining region was set to about 45 mm. At this time, an angle formed between the lengthwise direction of the comb-teeth electrodes and the polarization direction was set to ±15°.

Next a thermosetting seal material (HC 1413EP: manufactured by Mitsui Chemicals, Inc.) was printed on one of the substrates using a screen plate. Furthermore, beads (SP-2035: manufactured by Sekisui Chemical Co., Ltd.) having a diameter of 3.5 μm were dispersed on the other substrate. The pair of substrates were aligned such that the polarization directions of ultraviolet rays irradiating the respective substrates become perpendicular to each other, and then were bonded.

Next, the bonded substrates were heated at 200° C. for 60 minutes in a furnace in which nitrogen gas was purged while applying a pressure of 0.5 kgf/cm² thereto, and thereby the seal material was cured.

A liquid crystal composition containing a positive type liquid crystal material and a monomer for PSA represented by the following chemical formula was injected into a cell prepared with the above-described method under vacuum. The mixing ratio of the monomer for PSA was set to 0.5% by weight with respect to the total weight of the entire liquid crystal composition.

An inlet of a cell through which the liquid crystal composition was injected was blocked with an ultraviolet ray-curable resin (TB3026E, manufactured by ThreeBond Co., Ltd.) and was sealed by ultraviolet ray irradiation. The wavelength of ultraviolet rays applied for sealing was 365 nm, and light was blocked in pixel portions so as to remove the influence of ultraviolet rays as much as possible.

Next, in order to remove the flow alignment of liquid crystal molecules, a realignment treatment of heating the liquid crystal cell at 130° C. for 40 minutes to make the liquid crystal layer have isotropic phase was performed.

Polarizing plates were attached respectively to the pair of substrates to complete a liquid crystal display panel of the IPS mode. The polarization axes of the polarizing plates in both substrates were adjusted so as to be perpendicular to each other.

Next, in order to carry out PSA polymerization process for the liquid crystal cell, liquid crystal layer was irradiated with back light for 100 hours through the polarizing plates in a no voltage application state to polymerize the monomer in the liquid crystal layer. The light applied from back light was visible light, and thus the light was not cut by the polarizing plates.

In Example 6, the monomers represented by the following chemical formulae (34) and (35) were mixed at 1:1 by weight and then used. A compound represented by the following chemical formula (34) is a benzyl-based bifunctional methacrylate monomer (4,4'-dimethacryloyloxybenzyl) and a compound represented by the following chemical formula (35) is a phenanthrene-based bifunctional methacrylate monomer (phenanthrene-2,7-diylbis(2-methyl acrylate)). The compound represented by the following chemical formula (35) scarcely shows polymerization even when visible light is applied, whereas the compound represented by the following chemical formula (34) includes a structure for generating radicals by visible light irradiation, and also functions as an initiator.

[Chem. 34]

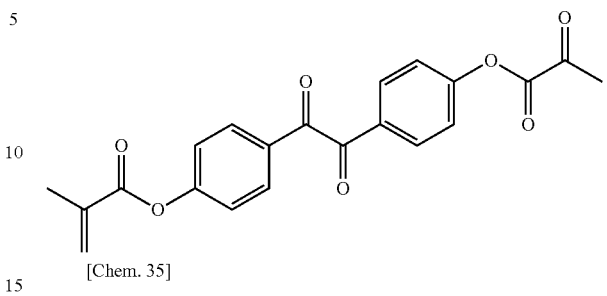

(34)

[Chem. 35]

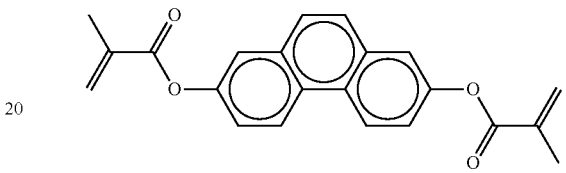

(35)

Figure 44:
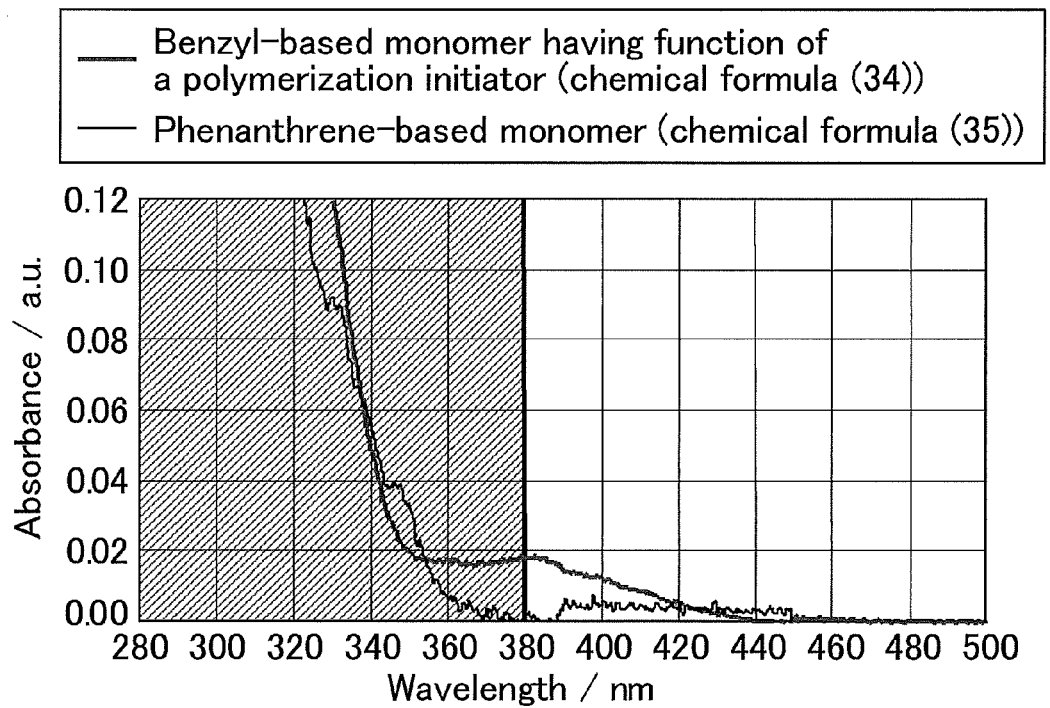
FIG. 44 is a graph illustrating absorption spectra of monomers represented by the chemical formulae (34) and (35) below.

FIG. 44 is a graph showing absorption spectra of monomers represented by the chemical formulae (34) and (35). In the present embodiment, the PSA polymerization process is carried out by back light which passes through the polarizing plates, and thus light with a short wavelength shorter than wavelength of 380 nm is cut by the polarizing plates (the portion left side of the boundary line of 380 nm in FIG. 44). As illustrated in FIG. 44, the benzyl-based monomer represented by the chemical formula (34) absorbs light with a wavelength of 380 nm or longer. On the other hand, the phenanthrene-based monomer represented by the chemical formula (35) scarcely absorbs light with a wavelength of 380 nm or longer. Even in such as case, the benzyl-based monomer represented by the chemical formula (34) generates radicals to be active species and the polymerization of the phenanthrene-based monomer represented by the chemical formula (35) proceeds in the present embodiment. Further the benzyl-based monomer represented by the chemical formula (34) itself is also polymerized by the radicals to form a portion of the PSA layer. That is, the monomer represented by the chemical formula (34) used in Example 6 is a monomer having function of a polymerization initiator to spontaneously start polymerization without a polymerization initiator.

When a panel was manufactured using the liquid crystal cell of Example 6, alignment stability, particularly image sticking property could be improved without increasing driving voltage, lowering the contrast, and considerably lowering the voltage holding ratio.

In Example 6, irradiation in the PS process was carried out with visible light. Accordingly, damages on the liquid crystal layer and the photo-alignment film can be suppressed as compared to those in the case of using ultraviolet rays. In the photo-alignment film of Example 6, polyvinyl cinnamate including a double bond was used, and thus it is supposed that the cinnamate group could further contribute to promotion of photopolymerization for the PS layer and uniform layer formation since the cinnamate group was subjected to light excitation to provide radicals.

In Example 6, the irradiation energy for photo-alignment treatment was set to 100 mJ/cm², but the alignment can be stabilized by the PS process even with irradiation energy of 100 mJ/cm² or lower, and thus there is no problem for practical application. Rather, lowering of the irradiation energy is desirable since the photodeterioration of other members can be suppressed. Specifically, even if the irradiation energy is lowered to 10 mJ/cm$^2$, it is supposed that the same effect can be obtained.

EXAMPLE 7

FIG. 42 is also a plane view schematically illustrating an IPS substrate of Example 7. Example 7 is a preparation example of a liquid crystal cell of the IPS mode. An IPS substrate including a pair of comb-teeth electrodes which are transparent electrodes (pixel electrode and common electrode) and TFT; and a bare glass substrate (counter substrate) were prepared. A polyimide solution including a cyclobutane skeleton, which was a material of a horizontal alignment film, was applied on the respective substrates by a spin coating method. As the glass, #1737 (manufactured by Corning Inc.) was used. In the comb-teeth electrodes, a common electrode and a pixel electrode extend substantially parallel to each other and are respectively formed in a zigzag shape as in Example 1. As a result, since the electric field vector during electric field application is substantially perpendicular to a lengthwise direction of the electrodes, a multidomain structure is formed and thus superior viewing angle characteristics can be obtained. As a material of the comb-teeth electrodes, IZO was used. The electrode width L of the comb-teeth electrodes was 3 μm and the distance S between the electrodes was 9 μm. The polyimide solution including a cyclobutane skeleton was prepared by equimolecular polymerization of 1,2,3,4-cyclobutane tetracarboxylic dianhydride and a diamine compound. In Example 7, the alignment principle was photodissociation of cyclobutane.

After application by a spin coating method, provisional drying was performed at 90° C. for 1 minute, followed by baking at 200° C. for 60 minutes while purging nitrogen gas. The thickness of the alignment films after baking was 100 nm.

Next, as an alignment treatment, the surface of each substrate was irradiated with polarized ultraviolet rays (p polarized light) having a wavelength of 254 nm and an intensity of 500 mJ/cm$^2$ from the normal direction of each substrate by using the method in Embodiment 3 (successive exposure). The width of the joining region was set to about 45 mm. At this time, an angle formed between the lengthwise direction of the comb-teeth electrodes and the polarization direction was set to ±15°.

Next, a thermosetting seal material (HC1413EP, manufactured by Mitsui Chemicals, Inc.) was printed on the IPS substrate using a screen plate. Furthermore, in order to obtain the liquid crystal layer having a thickness of 3.5 μm, beads (SP-2035, manufactured by Sekisui Chemical Co., Ltd.) having a diameter of 3.5 μm were dispersed on the counter substrate. These two kinds of substrates were aligned such that the polarization directions of ultraviolet rays irradiating the respective substrates match with each other, and then were bonded.

Next, the bonded substrates were heated at 200° C. for 60 minutes in a furnace in which nitrogen gas was purged while applying a pressure of 0.5 kgf/cm$^2$ thereto, and thereby the seal material was cured.

A liquid crystal composition containing a liquid crystal material and a monomer was injected into a cell prepared with the above-described method under vacuum. As the liquid crystal material, a negative type liquid crystal which contains liquid crystal molecules including a multiple bond other than a benzene ring was used. As the monomer, biphenyl-4,4'-diylbis(2-methyl acrylate) was used. The amount of biphenyl-4,4'-diylbis(2-methyl acrylate) added is 0.5% by weight with respect to the total weight of the entire liquid crystal composition.

An inlet of a cell through which the liquid crystal composition was injected was blocked with an ultraviolet ray-curable resin (TB3026E, manufactured by ThreeBond Co., Ltd.) and was sealed by ultraviolet ray irradiation. The wavelength of ultraviolet rays applied for sealing was 365 nm, and light was blocked in pixel portions so as to remove the influence of ultraviolet rays as much as possible. At this time, electrodes were short-circuited and the charge of a surface of the glass substrate was eliminated such that the alignment of liquid crystal was not disordered by outside electric field.

Next, in order to remove the flow alignment of liquid crystal molecules, a realignment treatment of heating the liquid crystal cell at 130° C. for 40 minutes to make the liquid crystal molecules have isotropic phase was performed. As a result, a liquid crystal cell was obtained in which liquid crystal molecules were uniaxially aligned in the plane of the substrates in a direction perpendicular to the polarization direction of ultraviolet rays irradiating the alignment films.

Next, in order to subject this liquid crystal cell to the PS process, the liquid crystal cell was irradiated with ultraviolet rays having an intensity of 2 J/cm$^2$ using a black light unit (FHF32BLB, manufactured by TOSHIBA Corporation). As a result, biphenyl-4,4'-diylbis(2-methyl acrylate) was polymerized.

When a panel was manufactured using the liquid crystal cell of Example 7, alignment stability, particularly image sticking property could be improved without increasing driving voltage, lowering the contrast, and considerably lowering the voltage holding ratio.

In Example 7, as the monomer, biphenyl-4,4'-diylbis(2-methyl acrylate) was used, but even if the respective monomers described in Example 6 were used, the same effect can be obtained.

In Example 7, the irradiation energy for photo-alignment was set to 500 mJ/cm$^2$, but the alignment can be stabilized by the PS process even with irradiation energy of 500 mJ/cm$^2$ or lower, and thus there is no problem for practical application. Rather, lowering of the irradiation energy is desirable since the photodeterioration of other members can be suppressed. Specifically, even if the irradiation energy is lowered to 100 mJ/cm$^2$, it is supposed that the same effect can be obtained.

Reference Example 3

A liquid crystal cell of Reference Example 3 was prepared in the same manner as in Example 7, except that no PS process was carried out. As a result, the alignment property was insufficient and the image sticking was observed.

Further investigations were performed to find that, in order to obtain sufficient alignment properties without executing the PS process, irradiation energy of about 2 J/cm$^2$ was necessary. However, high energy irradiation around 254 nm causes photodissociation of other parts in the alignment film and photodissociation of a color filter, and thus causes a problem on long time reliability. Consequently, it was found that the method employing the PS process as Example 7 could solve the problem on the reliability.

As a material for a semiconductor layer included in the TFT in Examples 1 to 7, an oxide semiconductor having high mobility such as indium-gallium-zinc-oxide (IGZO) is preferable. By using IGZO, the size of a TFT element can be reduced as compared to a case of using amorphous silicon, which is suitable for a high-resolution liquid crystal display. In the case of applying rubbing process to the substrate including a TFT element, highly precise and uniform rubbing in a pixel is difficult since the pile density of a rubbing cloth is limited, and there is a concern of inferiority of display quality. In this point, it can be said that a photo-alignment technique excellent in uniform alignment is useful for actual application of an oxide semiconductor such as IGZO. However, on the other hand, in the case of an oxide semiconductor such as IGZO, there is a concern of shift of semiconductor threshold properties by ultraviolet ray irradiation during photo-alignment treatment. This shift of properties results in change of the TFT element properties of a pixel and may affect the display quality. Further, a monolithic driver element formed on such an oxide semiconductor substrate with high mobility may possibly be affected more significantly. In contrast, it can be said that the irradiation amount of ultraviolet rays with short wavelength needed for the photo-alignment can be lowered to the minimum according to Examples 1 to 7, and the method is therefore particularly useful for the case of using an oxide semiconductor such as IGZO.

The present application claims priority to Patent Application No. 2011-186446 filed in Japan on Aug. 29, 2011 under the Paris Convention and provisions of national law in a designated State, the entire contents of which are hereby incorporated by reference.

Reference Sign List

11: light source
12: polarizing plate
13: illuminance adjustment plate
14: substrate
21: scanning signal line
22: data signal line
23: TFT
24: pixel electrode
26: black matrix
27: color filter
27R: color filter (red)
27G: color filter (green)
27B: color filter (blue)
30, 130: liquid crystal layer
32, 42: alignment film
33a, 43a: polymerizable monomer (non-excited)
33b, 43b: polymerizable monomer (excited state)
52: photoactive group (vertical alignment film molecules)
53, 63: polymerizable monomer
54, 64: liquid crystal molecules
55: hydrophobic group
62: photoactive group (horizontal alignment film molecules)
70, 70a, 70b: photo mask
71, 71a, 71b: light transmission part
72, 72a, 72b: light shielding part
73, 73a, 73b: main region
74, 74a, 74b: sub region
75: region corresponding to shape of light transmission part
76: joining region
77a, 77b: exposure region
80: substrate
81: exposure head
82: exposure stage
83: table
84: light source
101: first region
102: second region
103: third region
104: fourth region
105: fifth region
106: sixth region
110: array substrate
111, 121: transparent substrate
120: color filter substrate
112, 122: alignment film
113, 123: PS layer (polymer layer)
133: polymerizable monomer
371, 471: pixel electrode
372, 472: common electrode
374, 474: liquid crystal molecules
471a: slit

The invention claimed is:

1. A method for manufacturing a liquid crystal display device comprising:
a step of forming a horizontal alignment film by carrying out a photo-alignment treatment of irradiating a photo-alignment film material applied to at least one substrate of a pair of substrates with polarized light, wherein
the photo-alignment treatment is carried out by exposing a plurality of regions of one substrate surface of the at least one substrate of the pair of substrates,
two neighboring regions among the plurality of regions which are exposed include an overlapping portion,
an irradiation amount of the polarized light applied to the overlapping portion is gradually lowered in one of the two neighboring regions in a direction toward another one of the two neighboring regions,
the overlapping portion of the two neighboring regions has a width of 20 mm or wider,
the liquid crystal display device has an In-Plane Switching alignment mode or a Fringe Field Switching alignment mode, and
an entirety of each of the plurality of regions is exposed through one light transmission portion of a photo mask.

2. The method for manufacturing a liquid crystal display device according to claim 1,
wherein a variation of the irradiation amount in the overlapping portion of the two neighboring regions satisfies a sine function.

3. The method for manufacturing a liquid crystal display device according to claim 1,
wherein a variation of the irradiation amount in the overlapping portion of the two neighboring regions satisfies a linear function.

4. The method for manufacturing a liquid crystal display device according to claim 1,
wherein the overlapping portion of the two neighboring regions has a width of 65 mm or narrower.

5. The method for manufacturing a liquid crystal display device according to claim 1,
wherein the method further comprises a step of forming a polymer layer configured to control alignment of liquid crystal molecules adjacent thereto on the horizontal alignment film by irradiating a liquid crystal composition containing a liquid crystal material and a monomer and being injected between the pair of substrates with light to polymerize the monomer.

6. The method for manufacturing a liquid crystal display device according to claim 5,
wherein the liquid crystal material contains liquid crystal molecules including, in a molecular structure thereof, a multiple bond other than conjugated double bonds of a benzene ring.

7. The method for manufacturing a liquid crystal display device according to claim 1, wherein the photo-alignment film material includes either or both of a photoisomerizable functional group and a photodimerizable functional group.

\* \* \* \* \*